(12) United States Patent
Okada et al.

(10) Patent No.: US 8,774,025 B2
(45) Date of Patent: Jul. 8, 2014

(54) PUSH SIGNAL DELIVERY STATUS JUDGING APPARATUS AND METHOD

(75) Inventors: Sumiyo Okada, Kawasaki (JP);
Noriyuki Fukuyama, Kawasaki (JP);
Masanobu Morinaga, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 570 days.

(21) Appl. No.: 13/033,900

(22) Filed: Feb. 24, 2011

(65) Prior Publication Data
US 2011/0216664 A1    Sep. 8, 2011

(30) Foreign Application Priority Data
Mar. 8, 2010 (JP) .................................. 2010-050907

(51) Int. Cl.
*H04L 12/26*    (2006.01)

(52) U.S. Cl.
USPC ............ 370/252; 370/389; 370/466; 370/493

(58) Field of Classification Search
USPC ......... 370/252, 352–356, 389, 412, 466, 493;
379/22.02, 28, 35, 67.1, 93, 418, 283;
714/776; 704/214; 455/343
See application file for complete search history.

(56) References Cited

U.S. PATENT DOCUMENTS

| | | | | | |
|---|---|---|---|---|---|
| 4,807,274 | A * | 2/1989 | Kousa | ........................ | 379/22.02 |
| 5,862,514 | A * | 1/1999 | Nomura et al. | ................ | 704/214 |
| 6,035,179 | A * | 3/2000 | Virtanen | ....................... | 455/63.1 |
| 6,683,944 | B2 | 1/2004 | Fushimi | | |
| 6,961,424 | B1 * | 11/2005 | Vialle et al. | .................... | 379/418 |
| 7,233,605 | B1 * | 6/2007 | Oran | .............................. | 370/526 |
| 7,388,947 | B2 * | 6/2008 | Smith et al. | ...................... | 379/35 |
| 2001/0014597 | A1 * | 8/2001 | Takiguchi et al. | ............ | 455/343 |
| 2002/0141552 | A1 * | 10/2002 | Fushimi | ..................... | 379/93.28 |
| 2004/0161098 | A1 * | 8/2004 | Suzuki et al. | ................. | 379/283 |
| 2005/0044471 | A1 * | 2/2005 | Chia et al. | ..................... | 714/776 |
| 2005/0243811 | A1 * | 11/2005 | Jagadeesan | .................... | 370/356 |
| 2006/0182233 | A1 * | 8/2006 | Nakazawa et al. | ........... | 379/67.1 |
| 2007/0177620 | A1 * | 8/2007 | Ohmuro et al. | ............... | 370/412 |
| 2007/0189327 | A1 * | 8/2007 | Konda | .......................... | 370/466 |
| 2008/0144608 | A1 * | 6/2008 | Dusch et al. | ................... | 370/352 |
| 2008/0151769 | A1 * | 6/2008 | El-Hennawey et al. | ...... | 370/252 |
| 2008/0212567 | A1 * | 9/2008 | El-Hennawey et al. | ...... | 370/352 |
| 2009/0168769 | A1 * | 7/2009 | Lu et al. | ........................ | 370/389 |

FOREIGN PATENT DOCUMENTS

| | | |
|---|---|---|
| JP | 9-326772 | 12/1997 |
| JP | 11-259099 | 9/1999 |
| JP | 2002-252644 | 9/2002 |
| JP | 2005-159807 | 6/2005 |

* cited by examiner

*Primary Examiner* — Michael Thier
*Assistant Examiner* — Vincelas Louis
(74) *Attorney, Agent, or Firm* — Staas & Halsey LLP

(57) ABSTRACT

A method for judging delivery status of a push signal includes: receiving packets flowing in a specific session between a transmission source and transmission destination at an arbitrary point on a route of the specific session, and storing the received packets into a storage device, wherein the packets include voice packets and non-voice packets representing the push signal; judging based on sequence numbers included in the received packets stored in the storage device, whether or not packet loss has occurred in the specific session; and upon detecting that the packet loss has occurred, judging, according to status of the packet loss and predetermined characteristic of the non-voice packets, whether or not loss of the push signal has occurred.

11 Claims, 67 Drawing Sheets

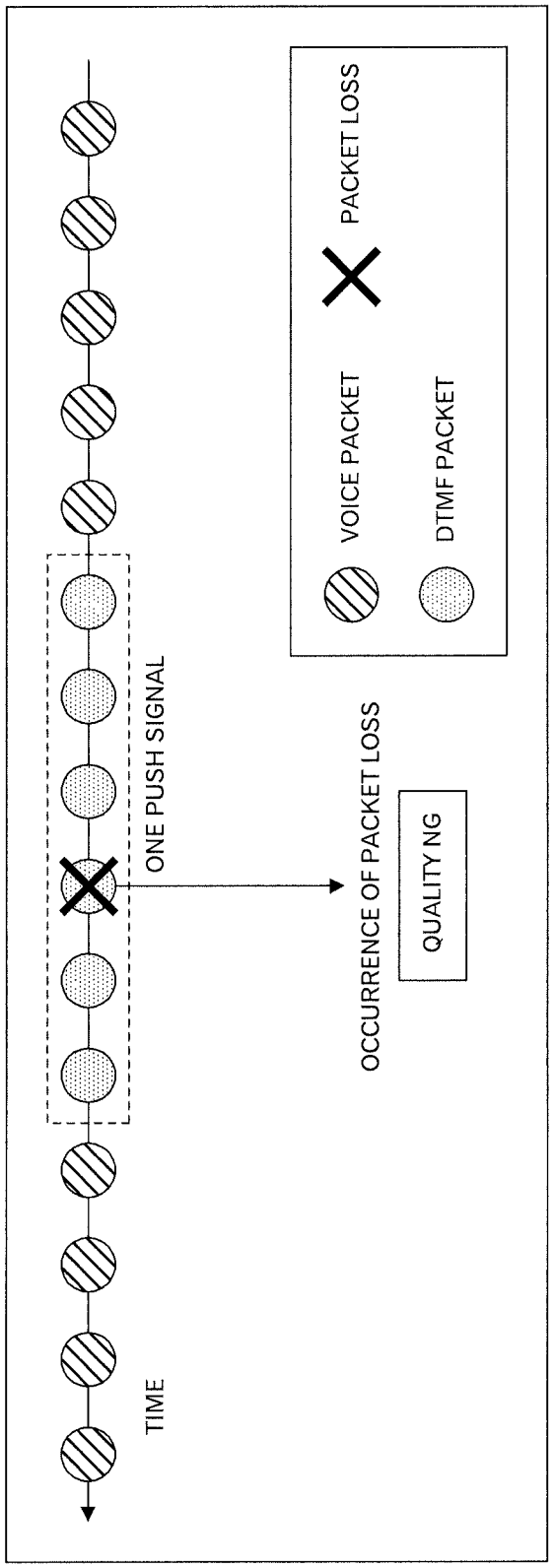

FIG.7

| M (MARKER) BIT | PAYLOAD TYPE | SEQUENCE NO. | TIME STAMP | EVENT NO. | E (END) BIT | DURATION |
|---|---|---|---|---|---|---|
| | RTP HEADER | | | | RTP PAYLOAD | |

FIG.9

| M (MARKER) BIT | PAYLOAD TYPE | SEQUENCE NO. | TIME STAMP | DURATION | LOW FREQUENCIES | HIGH FREQUENCIES |
|---|---|---|---|---|---|---|
| | RTP HEADER | | | | RTP PAYLOAD | |

| PROCESSING | CONTENTS | APPLICATION CONDITION 1 (LOSS PATTERN) | APPLICATION CONDITION 2 (TYPE) | APPLICATION CONDITION 3 (OTHER) |
|---|---|---|---|---|
| PROCESSING P1 | CALCULATE NO. OF DTMF PACKETS AND NO. OF VOICE PACKETS AMONG LOST PACKETS | NO CONDITION | ONLY TONE | ONLY CASE WHERE TRANSMISSION INTERVALS ARE DIFFERENT BETWEEN DTMF AND VOICE |
| PROCESSING P2 | CALCULATE NO. OF RESENT DTMF PACKETS AND NO. OF OTHER PACKETS AMONG LOST PACKETS | NO CONDITION | ONLY EVENT | ONLY CASE WHERE TRANSMISSION INTERVALS OF DTMF AND VOICE ARE SAME |
| PROCESSING Q | CALCULATE SEQUENCE NO. OF LAST PACKET IN DTMF PACKETS RELATING TO PUSH SIGNAL IMMEDIATELY BEFORE LOSS | PACKET IMMEDIATELY BEFORE LOSS IS DTMF PACKET | ONLY EVENT | |
| PROCESSING R | CALCULATE SEQUENCE NO. OF FIRST PACKET IN DTMF PACKETS RELATING TO PUSH SIGNAL IMMEDIATELY AFTER LOSS | PACKET IMMEDIATELY AFTER LOSS IS DTMF PACKET | ONLY EVENT | |
| PROCESSING S | CALCULATE NO. OF PACKETS BETWEEN LAST PACKET IN DTMF PACKETS RELATING TO PUSH SIGNAL IMMEDIATELY BEFORE LOSS AND FIRST PACKET IN DTMF PACKETS RELATING TO PUSH SIGNAL IMMEDIATELY AFTER LOSS | AT LEAST ONE OF PACKETS BEFORE AND AFTER LOSS IS DTMF PACKET | ONLY EVENT | |

| TRANSMISSION INTERVAL | TYPE (EVENT/TONE) | PACKET BEFORE OR AFTER LOSS | | PROCESSING | BASIC JUDGMENT METHOD | DETAILED JUDGMENT METHOD |
|---|---|---|---|---|---|---|
| | | IMMEDIATELY BEFORE | IMMEDIATELY AFTER | | | |
| TRANSMISSION INTERVALS OF VOICE PACKET AND DTMF PACKET ARE DIFFERENT | EVENT | D | D | QUALITY JUDGMENT PROCESSING 1 | METHOD 2 | METHOD 4, 6 |
| | | D | VOICE | QUALITY JUDGMENT PROCESSING 2 | METHOD 2 | — |
| | | VOICE | D | QUALITY JUDGMENT PROCESSING 3 | METHOD 2 | — |
| | | VOICE | VOICE | QUALITY JUDGMENT PROCESSING 4 | METHOD 2 | — |
| | TONE | D | D | QUALITY JUDGMENT PROCESSING 5 | METHOD 1→2 | METHOD 5→4, 6 |
| | | D | VOICE | QUALITY JUDGMENT PROCESSING 6 | METHOD 1→2 | — |
| | | VOICE | D | QUALITY JUDGMENT PROCESSING 7 | METHOD 1→2 | — |
| | | VOICE | VOICE | QUALITY JUDGMENT PROCESSING 8 | METHOD 3 | — |
| SAME | EVENT | D | D | QUALITY JUDGMENT PROCESSING 9 | METHOD 2 | METHOD 4, 6, 7 |
| | | D | VOICE | QUALITY JUDGMENT PROCESSING 10 | METHOD 2 | — |
| | | VOICE | D | QUALITY JUDGMENT PROCESSING 11 | METHOD 2 | — |
| | | VOICE | VOICE | QUALITY JUDGMENT PROCESSING 12 | METHOD 2 | — |
| | TONE | D | D | QUALITY JUDGMENT PROCESSING 13 | METHOD 2 | METHOD 4, 6 |
| | | D | VOICE | QUALITY JUDGMENT PROCESSING 14 | METHOD 2 | — |
| | | VOICE | D | QUALITY JUDGMENT PROCESSING 15 | METHOD 2 | — |
| | | VOICE | VOICE | QUALITY JUDGMENT PROCESSING 16 | METHOD 2 | — |

D:DTMF PACKET
VOICE:VOICE PACKET

PUSH SIGNAL DELIVERY STATUS JUDGING APPARATUS AND METHOD

CROSS-REFERENCE TO RELATED APPLICATIONS

This application is based upon and claims the benefit of priority of the prior Japanese Patent Application No. 2010-050907, filed on Mar. 8, 2010, the entire contents of which are incorporated herein by reference.

FIELD

This technique relates to a technique for determining the delivery status of a push signal.

BACKGROUND

Recently, with the development of information communication technology, bi-directional communication via a packet communication network is actively being performed. Particularly, IP telephones to perform telephone calls via an IP (Internet Protocol) network such as the Internet, by using VoIP (Voice over Internet Protocol) to transmit and receive voice data packets via a packet communication network are becoming popular.

On the other hand, services such as telephone reservation services in transportation organizations or medical institutions, or telephone banking services in financial organizations that use push signals (also called tone signals or DTMF (Dial Tone Multi Frequency) signals) have recently become known. In providing such services, it is becoming necessary for service providers to monitor and manage service quality.

For example, there is a following technique that is used as a technique for measuring the voice quality of an IP telephone. More specifically, the number of received packets and the number of lost packets are counted during a preset period of time for each RTP (Real-time Transport Protocol) session, and the packet loss ratio is calculated. Incidentally, whether or not packet loss has occurred can be determined from sequence numbers, for example, that are included in the packets.

Incidentally, when using services as described above with the IP telephone, voice packet and DTMF packets (in other words, non-voice packets) are mixed and flow in the same RTP session. Moreover, one push signal is expressed by plural DTMF packets. Therefore, even though a part of the DTMF packets are lost, as long as other part of the DTMF packets arrive at the transmission destination, the push signal can be recognized at the transmission destination.

However, when measuring the voice quality in the technique described above, analysis is not performed such that the voice packets and non-voice packets are separated. In addition, in the conventional art, there is no technique of determining whether or not loss of the push signal has occurred, when packet loss occurs. Therefore, in the conventional art, the delivery status of a push signal cannot be determined accurately.

SUMMARY

According to one aspect of this technique, a method for judging delivery status of a push signal includes: receiving packets flowing in a specific session between a transmission source and transmission destination at an arbitrary point on a route of the specific session, and storing the received packets into a storage device, wherein the packets include voice packets and non-voice packets representing the push signal; first judging based on sequence numbers included in the received packets stored in the storage device, whether or not packet loss has occurred in the specific session; and upon detecting that the packet loss has occurred, second judging, according to status of the packet loss and predetermined characteristics of the non-voice packets, whether or not loss of the push signal has occurred.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of judgment of network quality in case where packet loss has occurred;

FIG. 3 is a diagram depicting an example of judgment results of the network quality and DTMF service quality in this embodiment;

FIG. 7 is a diagram depicting a format example of the DTMF packet (event type);

FIG. 9 is a diagram depicting a format example of the DTMF packet (tone type);

FIG. 30 is a diagram depicting processing contents and application conditions of processing P1, P2, Q, R and S;

FIG. 32 is a diagram depicting application conditions of quality judgment processing 1 to 16;

DESCRIPTION OF EMBODIMENTS

Figure 1:
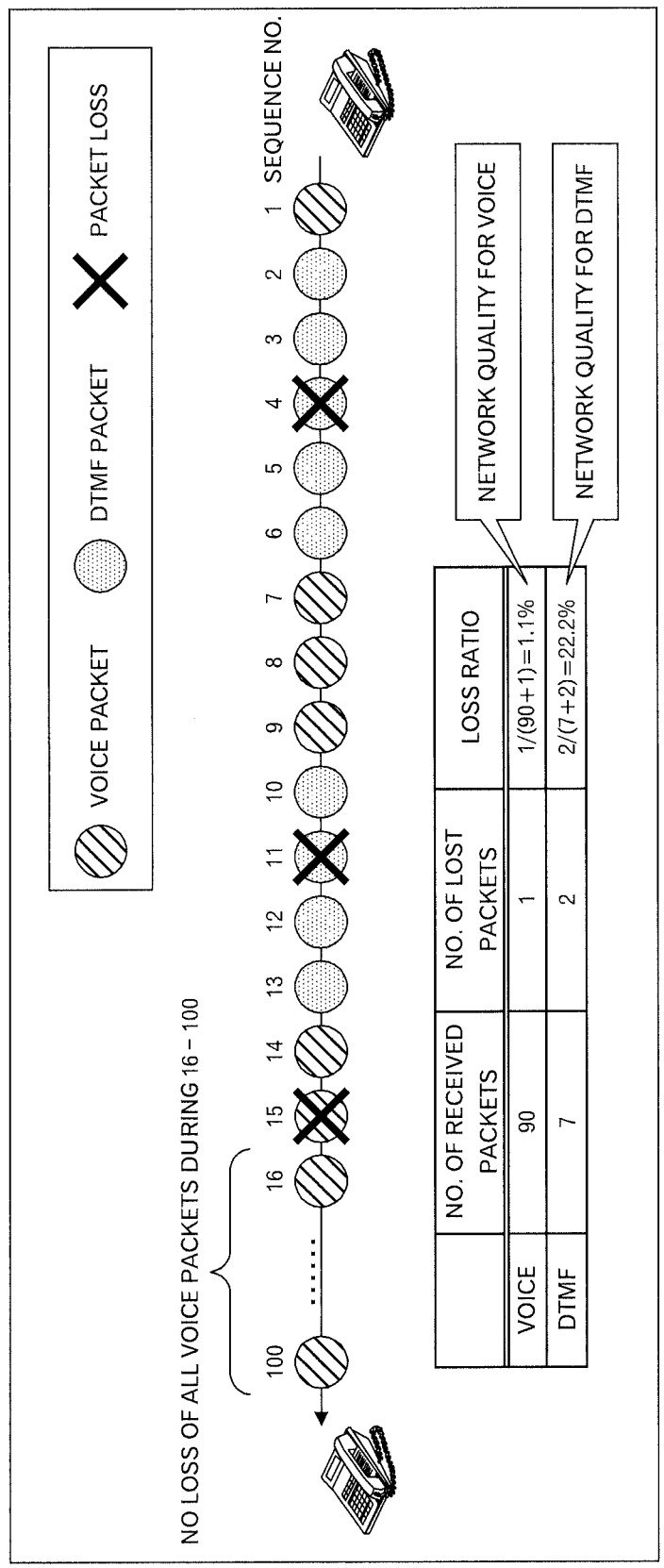
FIG. 1 is a diagram depicting an example of a case a voice packet and DTMF packet are mixed in the same session.

For example, FIG. 1 illustrates an example of a situation in which voice packets and DTMF packets (non-voice packets) are mixed and flow in the same RTP session. FIG. 1 illustrates an example in which three packets (packets having sequence numbers 4, 11 and 15) from among 100 packets that are transmitted from an IP telephone are lost, where one of the three lost packets is a voice packet, and two are DTMF packets. In FIG. 1, circles with diagonal lines and a solid outline represent voice packets, circles with shading (gray) and a solid outline represent DTMF packets, and "x" marks represent that the packet is a lost packet (hereafter, this will be the same). Here, the method described below is considered as a method for accurately measuring voice quality when voice packets and DTMF packets are mixed and flow in the same RTP session.

More specifically, packets flowing in an RTP session are captured, and whether or not packet loss has occurred is determined, and when it is detected that packet loss has occurred, determination of what kind of packets were lost is carried out according to the characteristics of DTMF packets and the like. Then, the number of received packets and the number of lost packets are counted for each of the voice packet and DTMF packet, and an index value, such as the packet loss ratio or packet arrival ratio, that represents the network quality is calculated. In the example in FIG. 1, the loss ratio of voice packets is $1/(90+1) \approx 1.1\%$, and the loss ratio of DTMF packets is $2/(7+2) \approx 22.2\%$. According to this method, voice packets are separated from DTMF packets to carry out analysis, so the network quality of the voice packets (in other words, voice quality) can be known. Incidentally, as illustrated in FIG. 1, because consecutive sequence numbers are given to the packets that flow in an RTP session, whether or not the packet loss has occurred can be determined from the sequence numbers included in the packets.

On the other hand, in order to monitor and manage the service quality of a service that uses a push signal, for example, it is necessary that the delivery status of the push signal be known. Incidentally, one push signal is made up of plural DTMF packets, and the same push number is set for each of the plural DTMF packets. Therefore, as long as at least part of the DTMF packets of the push signal arrives at the transmission destination, that push signal can be recognized at the transmission destination. That is, even though a DTMF packet may have been lost, the push signal may be delivered to the transmission destination. However, in the method described above, when the packet loss occurs as illustrated in FIG. 2, it is not possible to know whether or not the push signal has been delivered to the transmission destination, and only it can be judged that the DTMF packet loss (NG) occurred. FIG. 2 illustrates a case in which of the six DTMF packets that make up one push signal, only one is lost, and the remaining five packets could be received.

Figure 4:
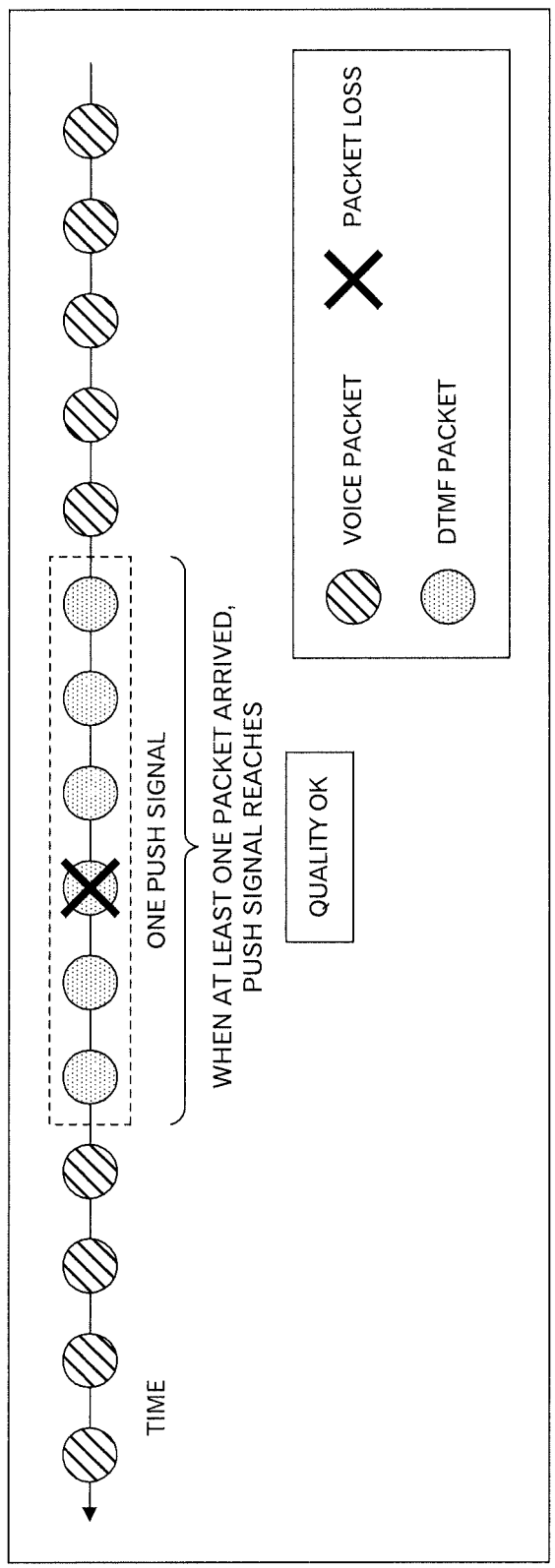
FIG. 4 is a diagram depicting an example of judgment of the DTMF service quality in case where the packet loss has occurred.

Therefore, in an embodiment of this technique, whether or not loss of the push signal occurred is determined by carrying out a processing as described below, when packet loss occurred. Then, for example, the quality of a DTMF service (in other words, service using the push signal) is judged according to the delivery status of the push signal. Therefore, in this embodiment of this technique, when packet loss occurred, the quality of the DTMF service is determined to be "OK", "NG" or "Unknown" as illustrated in FIG. 3. For example, when it is ascertained that push signal loss did not occur, the quality of the DTMF service is determined to be "OK". For example, as illustrated in FIG. 4, even though a DTP/IF packet is lost, as long as it is ascertained that at least one DTMF packet of the DTMF packets of the push signal arrived, the push signal has been delivered, so the quality of the DTMF service is determined to be "OK". Moreover, when the push signal loss occurred, the quality of the DTMF service is determined to be "NG". In addition, when it is not ascertained whether or not push signal loss occurred, the quality of the DTMF service is determined to be "Unknown". Incidentally, the number of delivered push signals and the number of lost (undelivered) push signals may be counted, and the loss ratio of the push signals may be calculated as the quality of DTMF service. In the following, this embodiment of this technique will be explained below.

Figure 5:
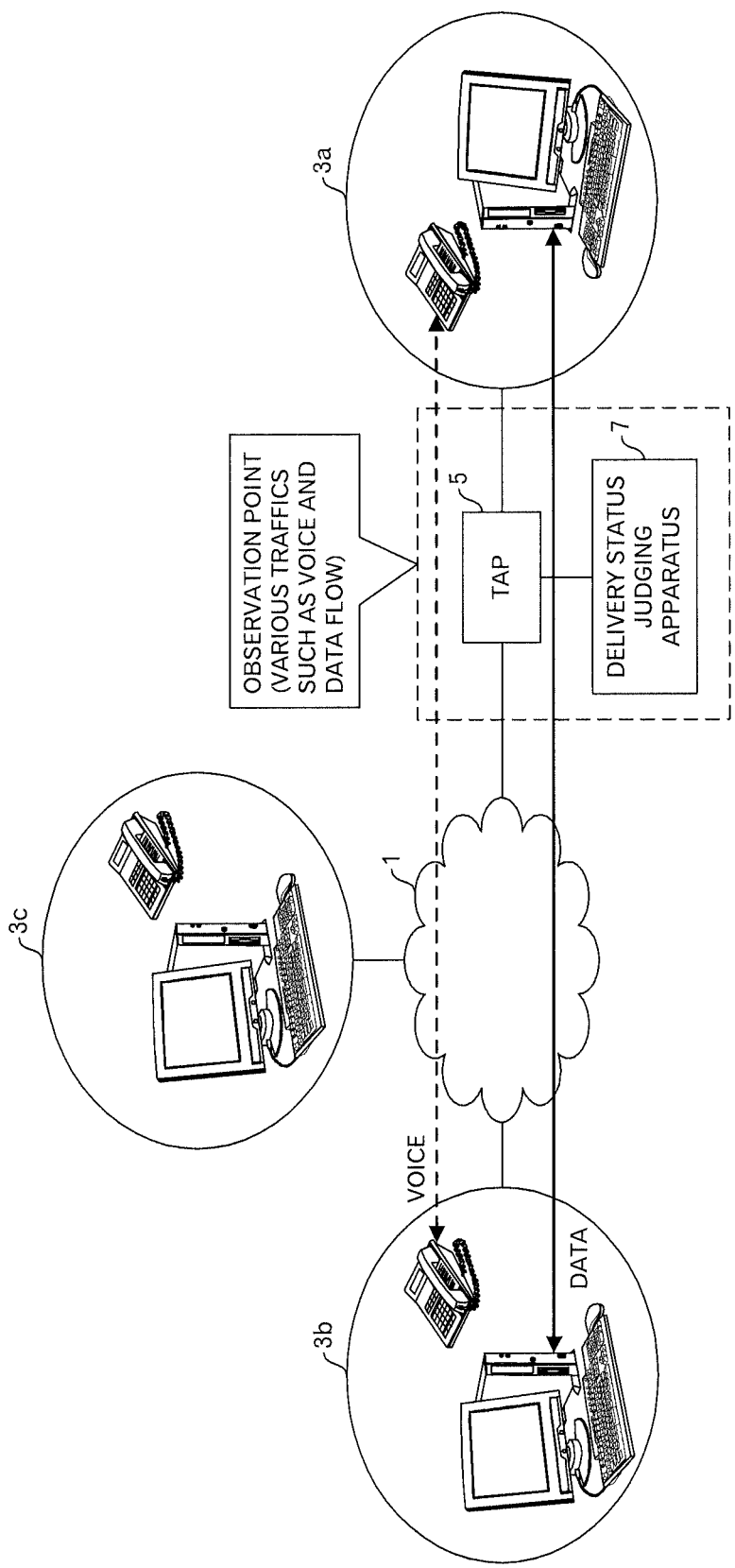
FIG. 5 is a system configuration diagram relating to this embodiment of this technique.

FIG. 5 illustrates a system configuration diagram relating to the embodiment of this technique. In FIG. 5, a network 3a, network 3b and network 3c are connected to a packet communication network 1. In addition, an IP telephone and personal computer (PC) are also connected to each of networks 3. For example, sending and receiving telephone calls and push signals between IP telephones and data communication between PCs are possible through the networks 3 and packet communication network 1. In addition, in FIG. 5, an observation point is provided between the packet communication network 1 and the network 3a, and the packet communication network 1 and the network 3a are connected via a TAP 5 that is provided in the observation point. Moreover, a delivery status judging apparatus 7 is also provided in the observation point, and captures packets passing through the observation point via the TAP 5. In FIG. 5, an example is illustrated in which there is an observation point at one location, however, there could also be observation points at two or more locations.

Figure 6:
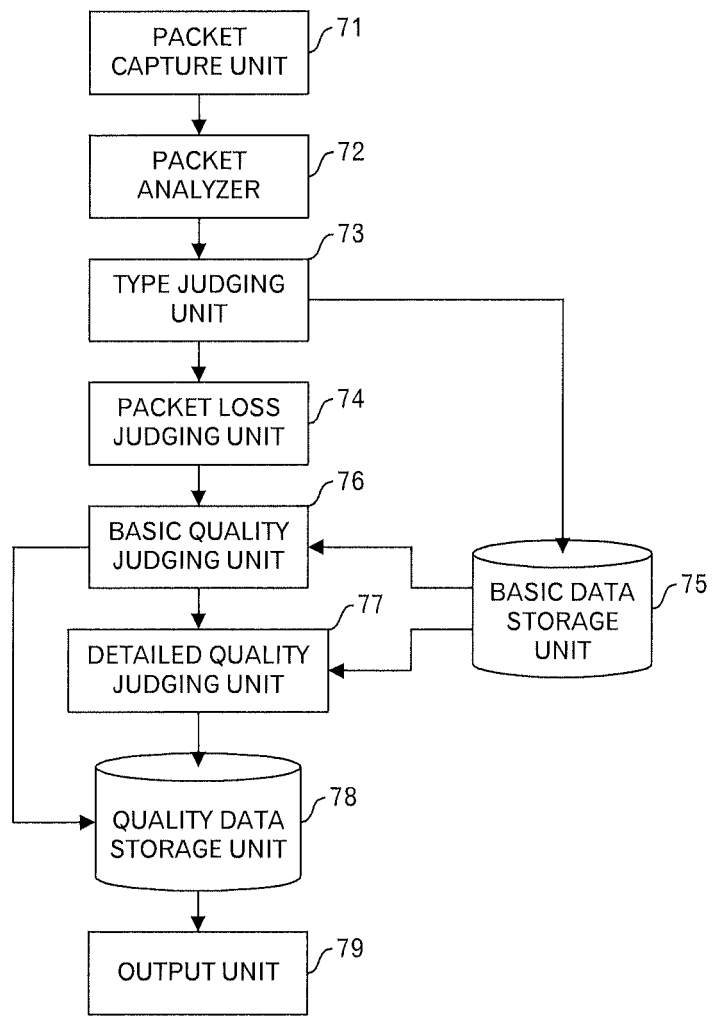
FIG. 6 is a functional block diagram of a delivery status judging apparatus relating to the embodiment of this technique.

FIG. 6 illustrates a functional block diagram of the delivery status judging apparatus 7 that is illustrated in FIG. 5. The delivery status judging apparatus 7 has a packet capture unit 71; a packet analyzer 72; a type judging unit 73; a packet loss judging unit 74; a basic data storage unit 75; a basic quality judging unit 76; a detailed quality judging unit 77; a quality data storage unit 78; and an output unit 79.

The packet capture unit 71 captures packets flowing through the observation point via the TAP 5 and outputs the captured packets to the packet analyzer 72. When the packet analyzer 72 receives the packets from the packet capture unit 71, the packet analyzer 72 judges, by analyzing the header of the packets, whether or not a packet is an RTP packet, and when the packet is the RTP packet, the packet analyzer 72 stores that packet into a storage device. In addition, the packet analyzer 72 also instructs the type judging unit 73 to determine whether or not the captured packet is a voice packet or DTMF packet. When the type judging unit 73 receives the instruction from the packet analyzer 72, the type judging unit 73 determines the type (voice packet or DTMF packet) of the respective packets stored in the storage device, according to the payload type that is included in the packet header, and outputs the determination results to the packet loss judging unit 74. Furthermore, by analyzing the packets stored in the storage device, the type judging unit 73 also acquires data such as the DTMF packet type (event or tone), transmission interval between voice packets, transmission interval between non-voice packets, transmission interval between resent packets and the like, and stores the acquired data into the basic data storage unit 75. Incidentally, information such as the DTMF packet type, transmission interval between voice packets, transmission interval between DTMF packets and transmission interval between resent packets may be given to the delivery status judging apparatus 7 beforehand. The packet loss judging unit 74 judges periodically or at arbitrary timing, whether or not packet loss occurred, and when it is detected that the packet loss occurred, the packet loss judging unit 74 uses the judgment result of the type judging unit 73 to identify the loss pattern, and notifies the basic quality judging unit 76 of the identified loss pattern. The basic quality judging unit 76 uses the loss pattern notified from the packet loss judging unit 74, data stored in the basic data storage unit 75 and packets stored in the storage device to carry out basic quality judgment that will be explained later, and stores the judgment results into the quality data storage unit 78. The basic quality judging unit 76 also, as necessary, instructs the detailed quality judging unit 77 to carry out a detailed quality judgment processing. The detailed quality judging unit 77 receives the instruction from the basic quality judging unit 76, and using the data stored in the basic data storage unit 75 and the packets stored in the storage device, the detailed quality judging unit 77 carries out the detailed quality judgment processing as will be described later, and then stores the judgment results into the quality data storage unit 78. The output unit 79 uses the data stored in the quality data storage unit 78 to display the quality judgment results of the DTMF service onto a display device.

Before explaining this embodiment in detail, the characteristics of the DTMF packet will be explained. There are two types of DTMF packets, event type and tone type, with each having different characteristics.

First, the characteristics of the event-type DTMF packet, which is related to this embodiment will be explained using FIG. 7 and FIG. 8. An example of the format of a DTMF packet (event type) is illustrated in FIG. 7. Incidentally, FIG. 7 illustrates only the main parameters. An RTP header and RTP payload are included in the DTMF packet (event type). Moreover, an M (marker) bit, payload type, sequence number and time stamp are included in the RTP header, and an event number, E (End) bit and duration are included in the RTP payload.

Figure 8:
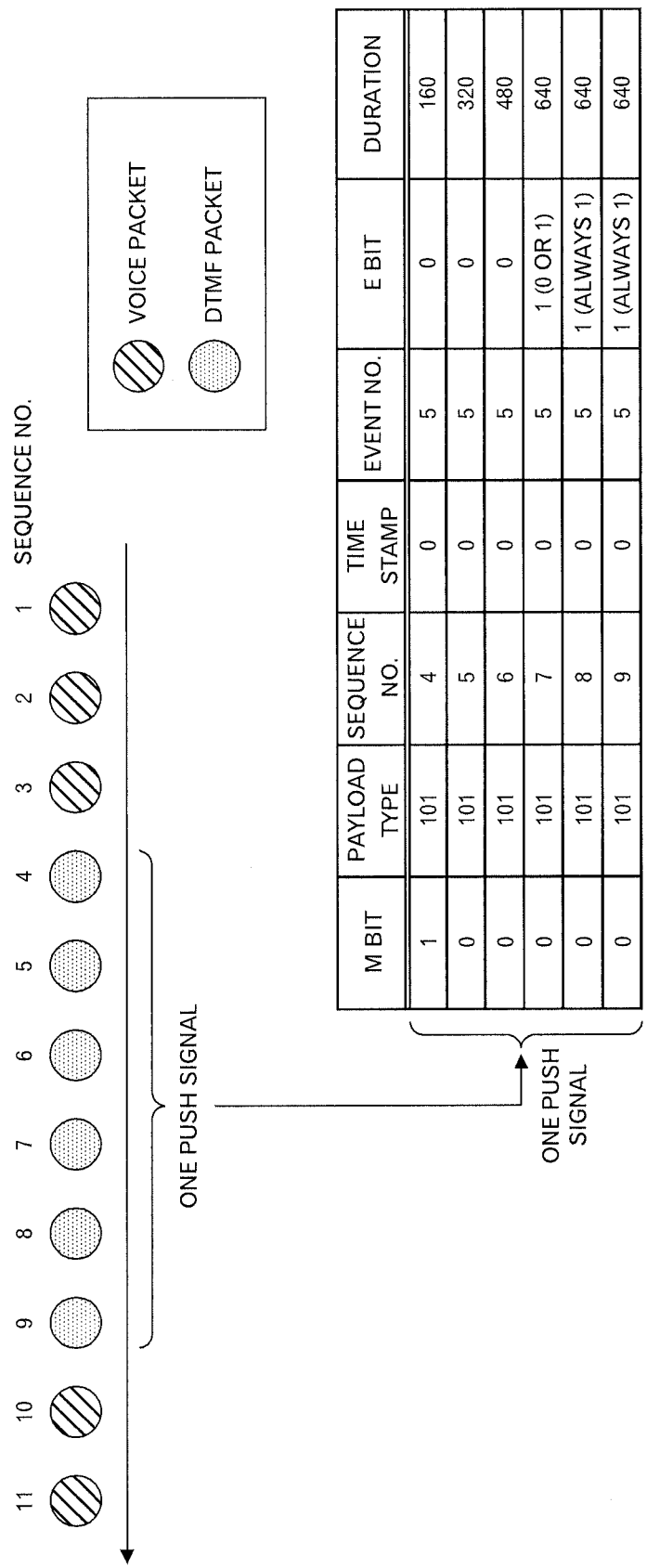
FIG. 8 is a diagram depicting a setting example of the DTMF packet (event type) in case where push button "5" is pressed.

For example, FIG. 8 illustrates setting examples for the DTMF packet (event type) when push button "5" is pressed. In FIG. 8, the packets having sequence numbers 4 to 9 among the series of packets (sequence numbers 1 to 11) are DTMF packets (event type). As for the M bit, "1" is set when the DTMF packet is the first packet of the DTMF packets, and "0" is set when it is not the first packet of the DTMF packets. For example, in FIG. 8, "1" is set to the M bit of the packet having sequence number 4, and "0" is set to the M bits of the packets having sequence numbers 5 to 9. In addition, information that represents the packet type (voice packet or DTMF packet) is set to the payload type. The push number is set for the event number. FIG. 8 is an example of when push button "5" is pressed, so "5" is set for the event number. In the case of an event-type DTMF packet, two resent packets with the E bit for which "1" is set are transmitted. Incidentally, as for the end packet that is a packet just before the resent packets, there is a case where the end packet is transmitted with the E bit for which "1" is set, and there is a case where the end packet is transmitted with the E bit for which "0" is set. In either case, there are at least two packets with the E bit for which "1" is set in the last portion of the series of DTMF packets. In addition, the duration is the time from when the push button is pressed, and is expressed by the time stamp. In the example in FIG. 8, the duration of the packet having sequence number 4 is 160, and after that, the duration is increased 160 every times. Incidentally, the duration of the resent packets is set to the same value as the duration of the end packet.

Next, the characteristics of a tone-type DTMF packet will be explained using FIG. 9 to FIG. 11. An example of the format of a DTMF packet (tone type) is illustrated in FIG. 9. FIG. 9 illustrates only the main parameters. An RTP header and RTP payload are included in the DTMF packet (tone type). Moreover, an M bit, payload type, sequence number and time stamp are included in the RTP header, and the duration, low frequencies and high frequencies are included in the RTP payload. In other words, when compared with the event-type DTMF packet, the structure of the RTP payload is different.

Figure 10:
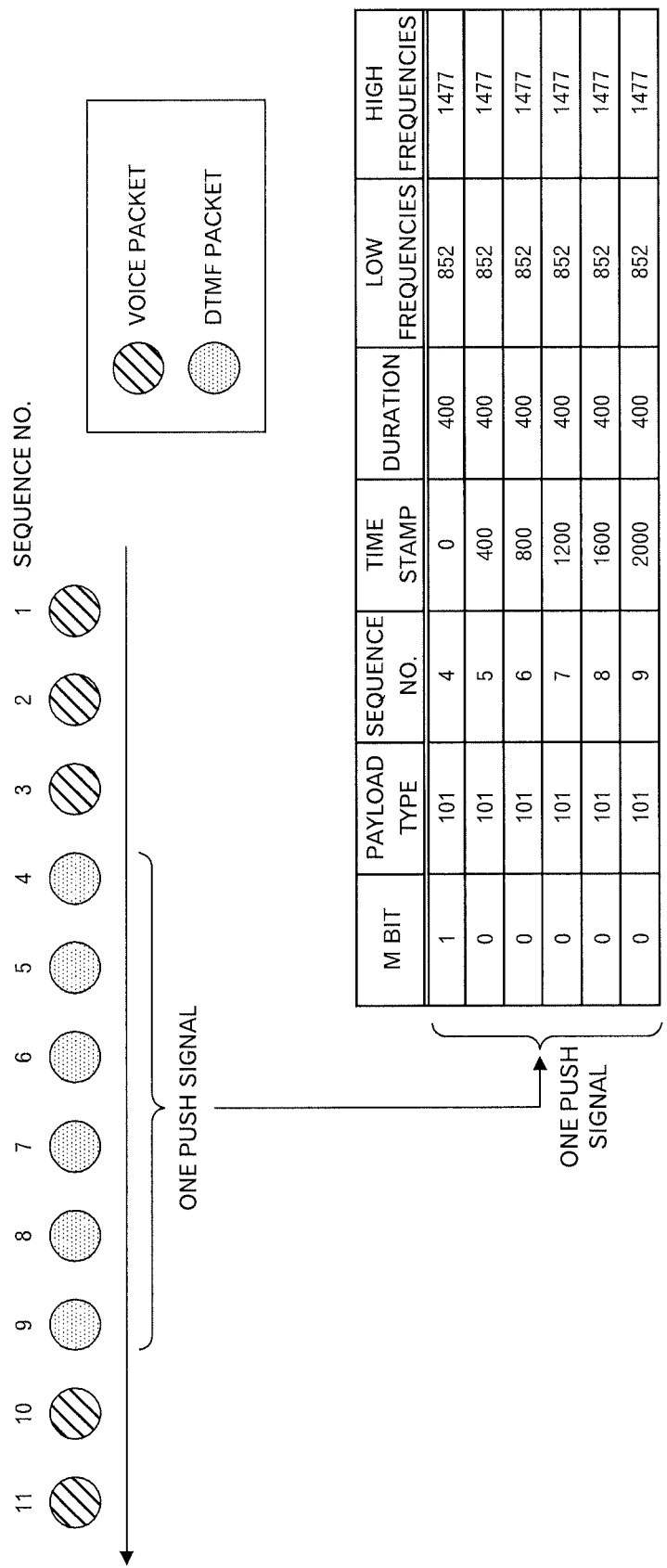
FIG. 10 is a diagram depicting a setting example of the DTMF packet (tone type) in case where push button "9" is pressed.

For example, FIG. 10 illustrates an example of settings of the DTMF packet (tone type) when pushbutton "9" is pressed. As in the example illustrated in FIG. 8, packets having sequence numbers 4 to 9 among the series of packets (sequence numbers 1 to 11) are DTMF packets (tone type). The M bit, payload type and sequence numbers are the same as in the example in FIG. 8. In the case of the tone-type DTMF packet, the duration expresses the unit of the time stamp, and the time stamp of the RTP header increases every time by a value set for the duration. In the example in FIG. 10, the duration is 400, and when "0" is set to the time stamp for the packet having the sequence number 4, the time stamp increases after that by 400 at a time. Moreover, in the case of the tone-type DTMF packet, push number (including symbols such as *, #, A, B, C and D) are expressed by a combination of low frequencies and high frequencies. FIG. 11 illustrates the correlation between combinations of low frequency and high frequency and the push numbers. For example, in FIG. 10, the low frequency is 852 and the high frequency is 1477, and as illustrated in FIG. 11, this combination expresses the push number "9".

Presuming characteristics such as described above, an outline of this embodiment will be explained. In this embodiment, the delivery status of a push signal is determined by carrying out the judgment processing (methods 1 to 7) explained below. Incidentally, methods 1 to 3 are methods for judging whether or not push signal loss occurred. Moreover, in the case where push signal loss has not occurred and the packets before and after the loss are DTMF packets, methods 4 to 7 are methods for judging whether or not the push signal immediately before the packet loss (hereafter, referred to as immediately before the loss) and the push signal immediately after packet loss (hereafter, referred to as immediately after the loss) are different signals. Incidentally, here, the judgment of the methods 1 to 3 is called "basic quality judgment", and the judgment of methods 4 to 7 is called "detailed quality judgment". Each method will be explained below.

[Method 1]

Figure 13:
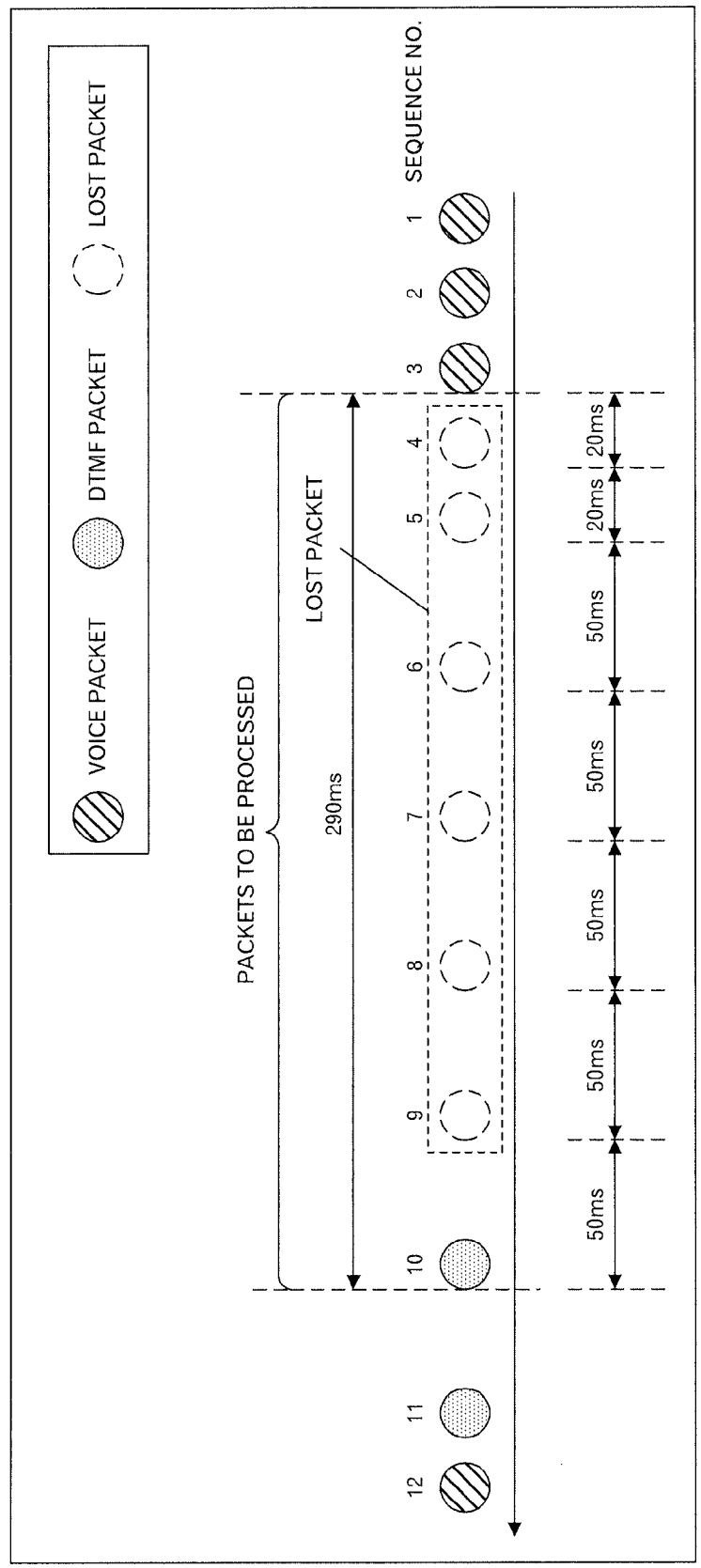
FIG. 13 is a diagram to explain method 1 (basic quality judgment)

Method 1 will be explained using FIG. 12 and FIG. 13. First, the assumptions of method 1 will be presented.

(Assumptions of Method 1)

(A) The transmission interval between voice packets and the transmission interval between DTMF packets are different.

(B) The DTMF packets are tone type.

In method 1, under such assumptions, the breakdown of lost packets is calculated using the difference in transmission intervals, and when there are no DTMF packets among the lost packets, it is determined that the push signal loss did not occur (OK).

Figures 11, 12:
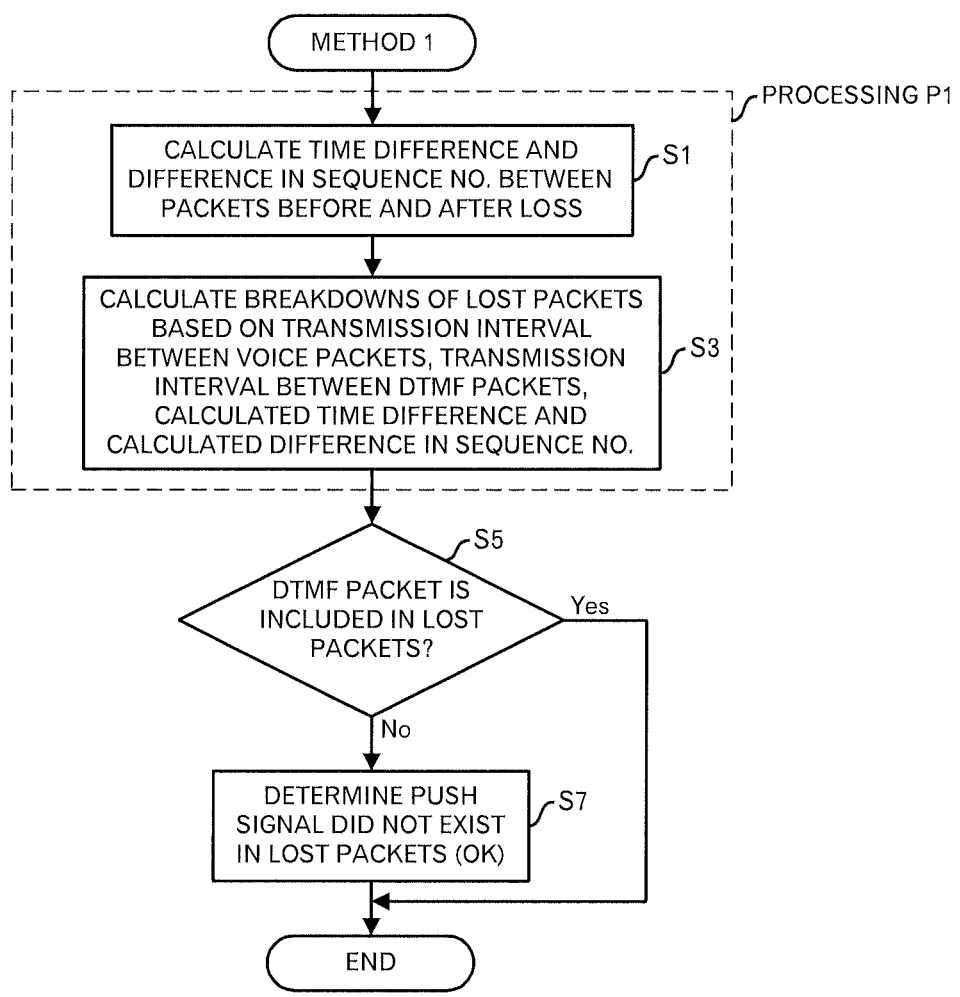
FIG. 11 is a diagram depicting a correlation between a combination of low frequency, high frequency and a push number.
FIG. 12 is a diagram depicting a processing flow of method 1 (basic quality judgment)

More specifically, the basic quality judging unit 76 carries out a processing as illustrated in FIG. 12. First, the basic quality judging unit 76 uses packets stored in the storage device to calculate the time difference and difference in sequence numbers between packets before and after packet loss (hereafter, referred to as before and after the loss) (FIG. 12: Step S1). Incidentally, the processing illustrated in FIG. 12 is explained in more detail using FIG. 13. FIG. 13 illustrates an example of a case in which the packet loss occurred when the transmission interval between voice packets and the transmission interval between DTMF packets are different, and the DTMF packets are tone type. Incidentally, in FIG. 13, white circles with a dashed outline represent lost packets (this is the same, hereafter). In the example in FIG. 13, the transmission interval between voice packets is 20 ms, and the transmission interval between DTMF packets is 50 ms. In the example in FIG. 13, the time difference between the packets before and after the loss is 290 ms, and the difference in sequence number between the packets before and after the loss is 7 (=10−3).

The basic quality judging unit 76 also acquires the transmission interval between voice packets and the transmission interval between DTMF packets from the basic data storage unit 75. The basic quality judging unit 76 then calculates the breakdown of lost packets based on the transmission interval between voice packets, the transmission interval between DTMF packets, and the time difference and difference in sequence numbers, which were calculated at the step S1 (step S3). More specifically, calculation is carried out using the simultaneous equations below.

$$20x+50y=290 \qquad (1)$$

$$x+y=7 \qquad (2)$$

Incidentally, in equation (1), "20" is the transmission interval between voice packets and "50" is the transmission interval between DTMF packets. Also, in equation (1), "290" is the time difference between packets before and after the loss, which was calculated at the step S1. Furthermore, in equation (2), "7" is the difference in sequence numbers between the packets before and after the loss, which was calculated at the step S1. The variable "x" in equations (1) and (2) represents the number of voice packets among the packets to be processed (calculation target packets), which include the lost packets and packet immediately after the loss (in the example in FIG. 13, packets having sequence numbers 4 to 10), and the variable "y" represents the number of DTMF packets among the packets to be processed. In equation (2), "7" is also the number of packets to be processed.

In solving the simultaneous equations, "x=2" and "y=5" are obtained. Here, the packet immediately after the loss is included in the packets to be processed, so in order to calculate the breakdown of lost packets, it is necessary to subtract "1" from the variable "x" or "y". In the example in FIG. 13, the packet immediately after the loss is a DTMF packet, so "1" is subtracted from the value of variable "y". Therefore, the lost packets (6 packets) include two voice packets and four (=5−1) DTMF packets.

Incidentally, equations (1) and (2) can be transformed to equations (3) and (4) as follows:

$$20x+50(y+1)=290 \quad (3)$$

$$x+(y+1)=7 \quad (4)$$

In equations (3) and (4), variable "x" represents the number of lost voice packets, and the variable "y" represents the number of lost DTMF packets. In solving these simultaneous equations, "x=2" and "y=4" are obtained. In other words, there is no need to subtract "1" from the variable "x" or "y". Incidentally, the reason for the term "y+1", is that packet (DTMF packet) immediately after the loss is included in the packets to be processed. In the case that the packet immediately after the loss were a voice packet, the term "x+1" is used.

After that, the basic quality judging unit 76 determines whether or not there are DTMF packets among the lost packets, based on the processing results of the step S3 (step S5). When there is no DTMF packet among the lost packets, it is inevitable that there are also no push signals among the lost packets. Therefore, when there is no DTMF packet among the lost packets (step S5: NO route), the basic quality judging unit 76 determines that there is no push signal among the lost packets (step S7). In this case, the push signal loss has not occurred, and the quality of the DTMF service is determined to be "OK". Incidentally, the judgment result is stored into the quality data storage unit 78. The processing then ends.

On the other hand, when there were DTMF packets among the lost packets (step S5: YES route), the processing of the step S7 is skipped, and processing ends. In this case, at this point, it is unknown whether or not the push signal loss occurred, so as necessary, judgment according to method 2 is further carried out.

Thus, by calculating the breakdown of lost packets using the difference in transmission intervals of the voice packets and DTMF packets, it becomes possible to recognize that the push signal loss did not occur. In the following, the processing of the step S1 and step S3 is called "Processing P1".

[Method 2]

Next, method 2 will be explained using FIG. 14 to FIG. 19. In method 2, the minimum number of DTMF packets required for expressing one push signal (hereafter, this is called the minimum configuration number) is compared with the number of lost packets (or unknown packets among the lost packets), and when the number of lost packets (or unknown packets among the lost packets) is less than the minimum configuration number, it is determined that the push signal loss did not occur.

Figure 14:
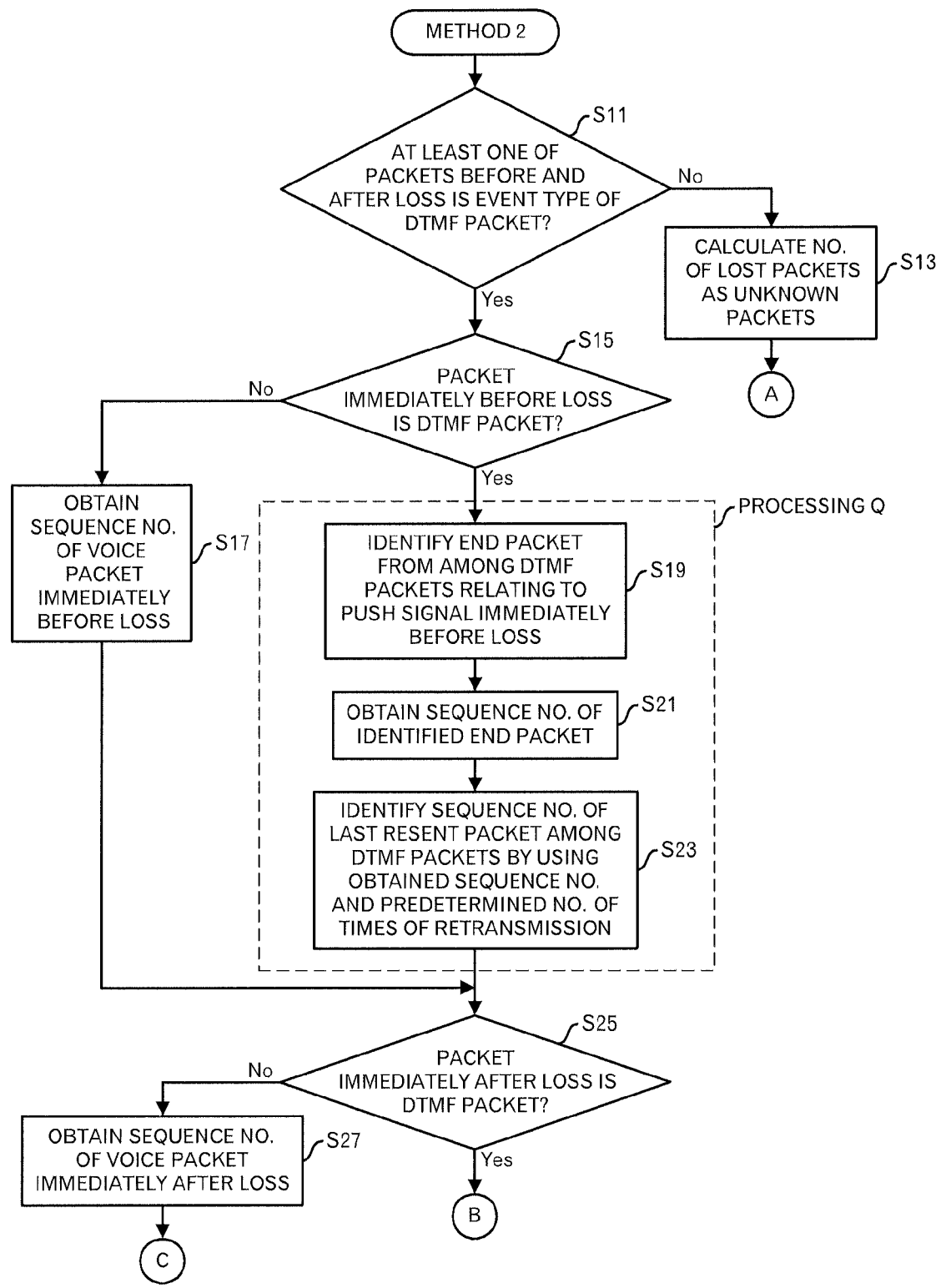
FIG. 14 is a diagram depicting a processing flow (first portion) of method 2 (basic quality judgment)
Figure 15:
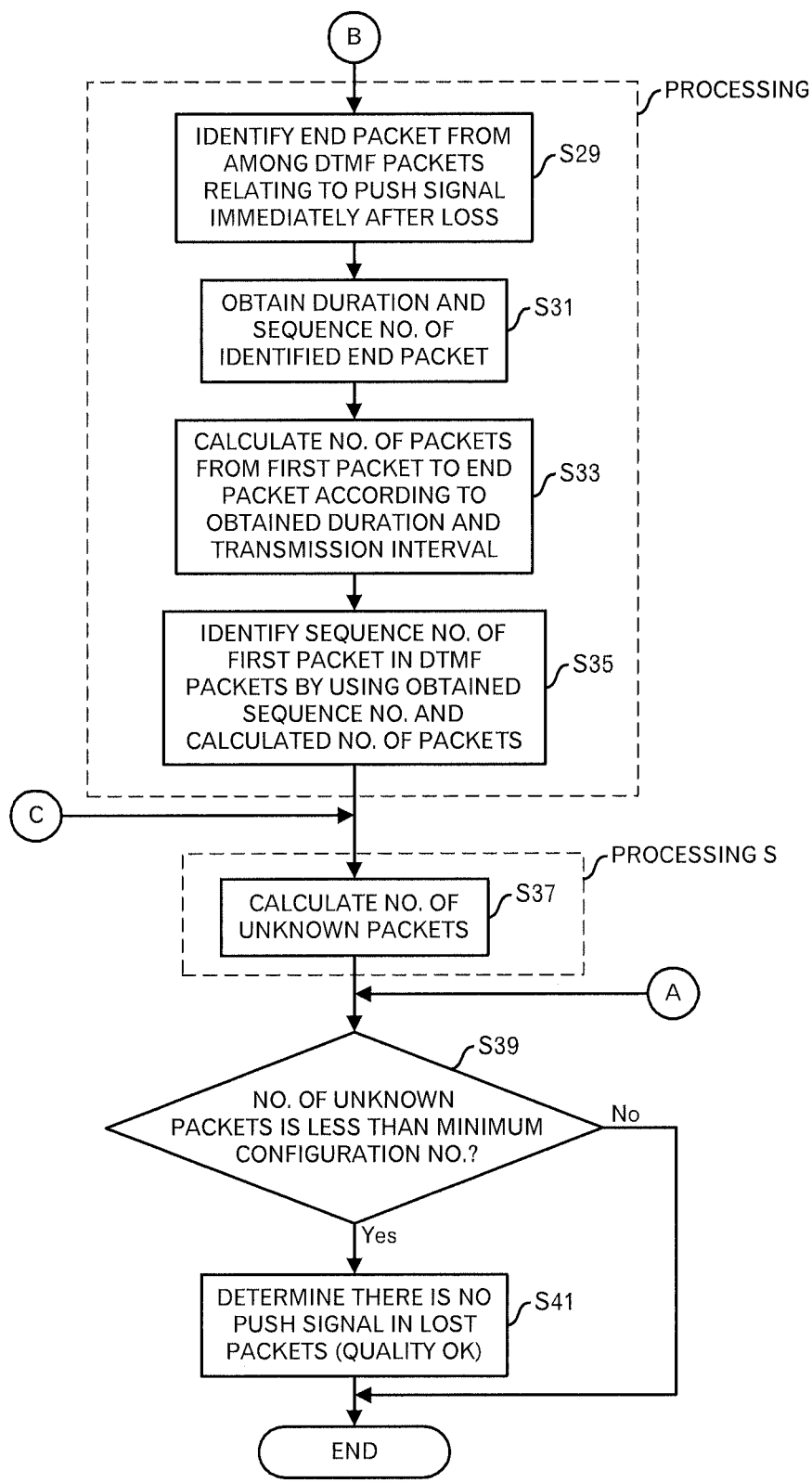
FIG. 15 is a diagram depicting a processing flow (second portion) of method 2 (basic quality judgment)

More specifically, the basic quality judging unit 76 carries out a processing such as illustrated in FIG. 14 and FIG. 15. First, the basic quality judging unit 76 uses packets stored in the storage device to determine whether or not at least one of the packets before and after the loss is a DTMF packet and whether or not the DTMF packet is an event-type DTMF packet when the packet is the DTMF packet (FIG. 14: step S11). When both packets before and after the loss are voice packets or when the DTMF packets are tone-type DTMF packets (step S11: NO route), the basic quality judging unit 76 uses the packets stored in the storage device to calculate the number of lost packets as the number of unknown packets, and temporarily stores the calculated value into the storage device (step S13). The processing then moves via a terminal A to the processing of step S39 (FIG. 15).

On the other hand, when at least one of the packets before and after the loss is a DTMF packet and the DTMF packet is an event-type DTMF packet (step S11: YES route), the basic quality judging unit 76 uses the packets stored in the storage device to determine whether or not the packet immediately before the loss is a DTMF packet (step S15). Incidentally, the processing from this step to the step S37 (FIG. 15) is carried out only when the DTMF packets are event-type DTMF packets. When the packet immediately before the loss is not a DTMF packet (step S15: NO route), in other words, when the packet immediately before the loss is a voice packet, the basic quality judging unit 76 acquires the sequence number of the voice packet immediately before the loss and stores the obtained number into the storage device (step S17). After that, the processing moves to a processing of step S25.

Figure 16:
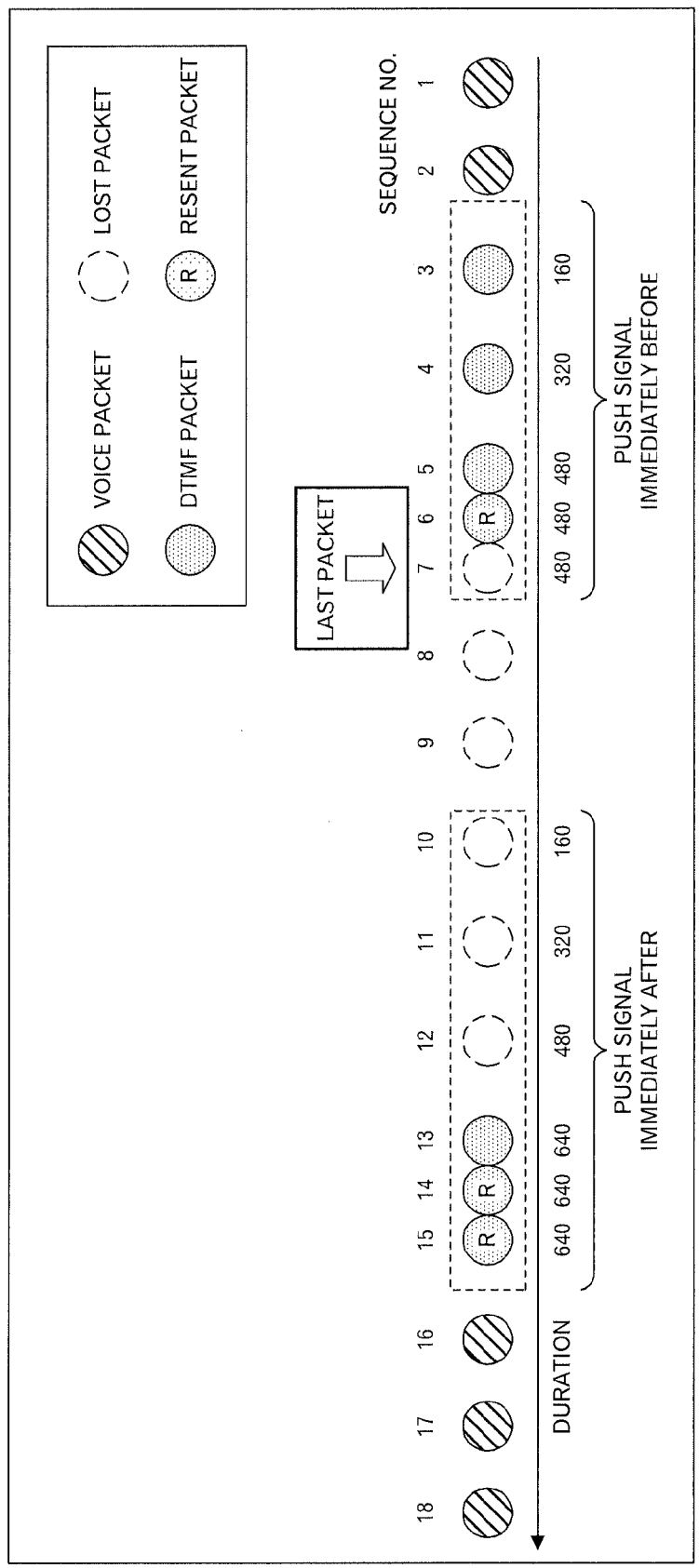
FIG. 16 is a diagram to explain a processing Q.

On the other hand, when the packet immediately before the loss is a DTMF packet (step S15: YES route), the basic quality judging unit 76 identifies the end packet from among the DTMF packets relating to the push signal immediately before the loss (step S19). This processing will be explained using FIG. 16. Incidentally, FIG. 16 illustrates an example of a case in which the packet loss occurred. In FIG. 16, the packets having the sequence numbers 7 to 12 are lost. In FIG. 16, the circles with the character "R" inside among the circles with shading (gray) and solid outlines represent resent packets (in other words, the E bit=1) (this is the same, hereafter). As explained above, when the DTMF packets are event-type DTMF packets, the resent packet with the E bit for which "1" is set is transmitted two times. In addition, the same value as the duration of the end packet is set to the duration of the resent packet. For example, in FIG. 16, the packet with sequence number 6 is the resent packet, and "1" is set to the E bit. Moreover, the same value (480) is set to the duration of the DTMF packets having the sequence numbers 5 and 6. Therefore, the DTMF packet having sequence number 5 is identified as the end packet.

Then, the basic quality judging unit 76 acquires the sequence number of the identified end packet (step S21). In FIG. 16, "5" is acquired as the sequence number of the end packet. The basic quality judging unit 76 then uses the sequence number acquired at the step S21 and the predetermined number of times of resent to identify the sequence number of the last resent packet (hereafter, called the last packet) in the DTMF packets, and stores the identified number into the storage device (step S23). More specifically, the sequence number of the last packet is calculated by adding the number of times of resent to the sequence number acquired at the step S21. In the example in FIG. 16, 7 (=5+2) is calculated, so it is found that the packet having sequence number 7 is the last packet. In this way, it is found that the packet having sequence number 7 among the lost packets was a DTMF packet.

The basic quality judging unit 76 then determines whether or not the packet immediately after the loss is a DTMF packet (step S25). When the packet immediately after the loss is a DTMF packet (step S25: YES route), the processing moves via a terminal B to a processing of step S29 (FIG. 15).

On the other hand, when the packet immediately after the loss is not a DTMF packet (step S25: NO route), in other words, when the packet immediately after the loss is a voice packet, the basic quality judging unit 76 acquires the sequence number of the voice packet immediately after the loss, and temporarily stores the acquired value into the storage device (step S27). The processing then moves via a terminal C to a processing of step S37 (FIG. 15).

Figure 17:
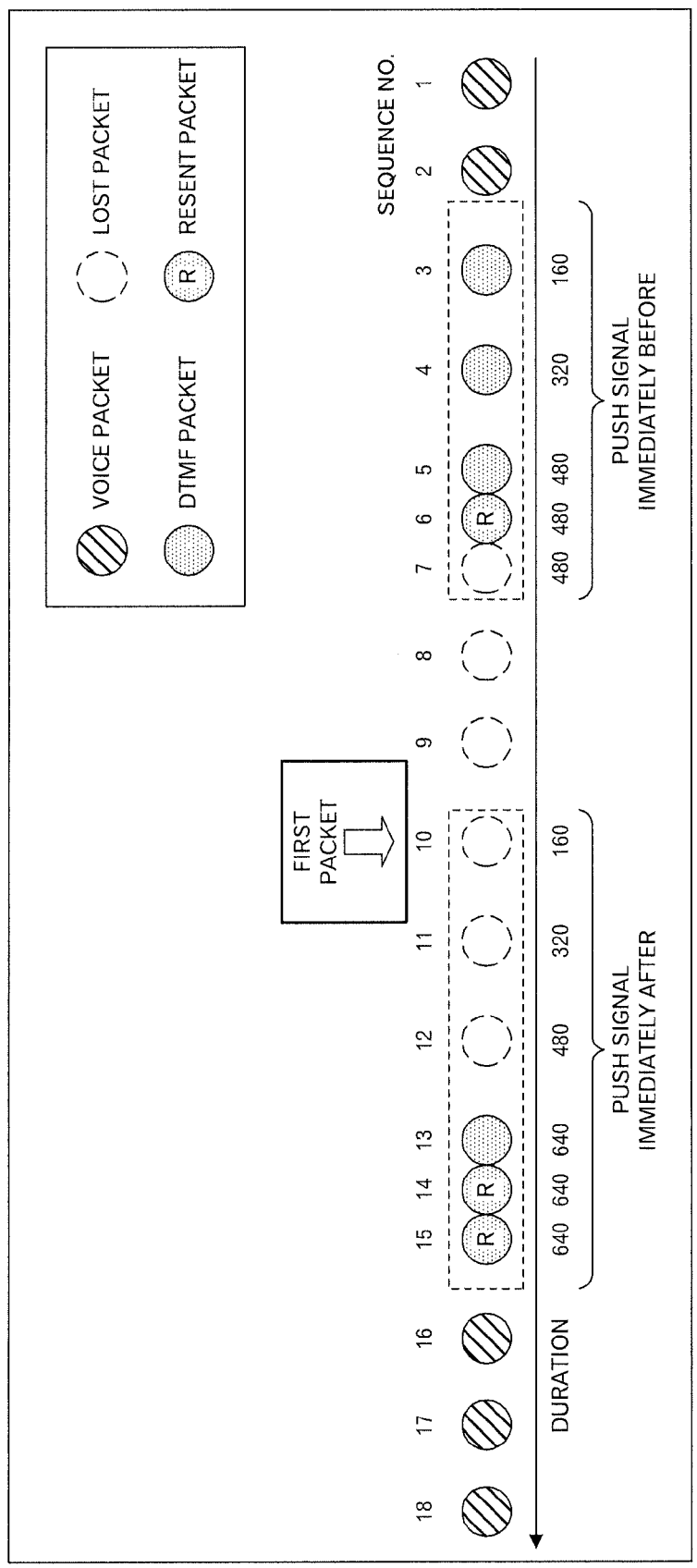
FIG. 17 is a diagram to explain a processing R.

Moving to an explanation of FIG. 15, after the terminal B, the basic quality judging unit 76 identifies the end packet from among the DTMF packets relating to the push signal immediately after the loss (FIG. 15: step S29). This process will be explained using FIG. 17. Incidentally, FIG. 17 illustrates an example of a case in which the packet loss occurred, and the lost status of packets is the same as in FIG. 16. In the example in FIG. 17, there are three DTMF packets immediately after the loss, however, the last two packets are resent packets. Therefore, the DTMF packet having sequence number 13 is identified as the end packet.

Then, the basic quality judging unit 76 acquires the duration and sequence number of the identified end packet (step S31). In the example in FIG. 17, "640" was acquired as the duration of the end packet, and "13" was acquired as the sequence number.

Then, the basic quality judging unit 76 calculates the number of packets from the first packet to the end packet according to the acquired duration and the transmission interval of the DTMF packets (step S33). More specifically, the number of packets from the first packet to the end packet is calculated by dividing the duration by the transmission interval. In the example in FIG. 17, 160 (for example, 20 ms) is the transmission interval, and the number of packets from the first packet to the end packet is 4 (=640/160).

The basic quality judging unit 76 then uses the sequence number acquired at the step S31 and the number of packets calculated at the step S33 to identify the sequence number of the first packet among the DTMF packets, and temporarily stores the calculated number into the storage device (step S35). In the example in FIG. 17, the sequence number of the end packet is 13 and the number of packets from the first packet to the end packet is 4, so 10 (=13−4+1) is obtained, and it is found that the packet having the sequence number 10 is the first packet. In this way, it is found that the packets having sequence numbers 10 to 12 among the lost packets were DTMF packets. After that, the processing moves to a processing of the step S37.

Figure 18:
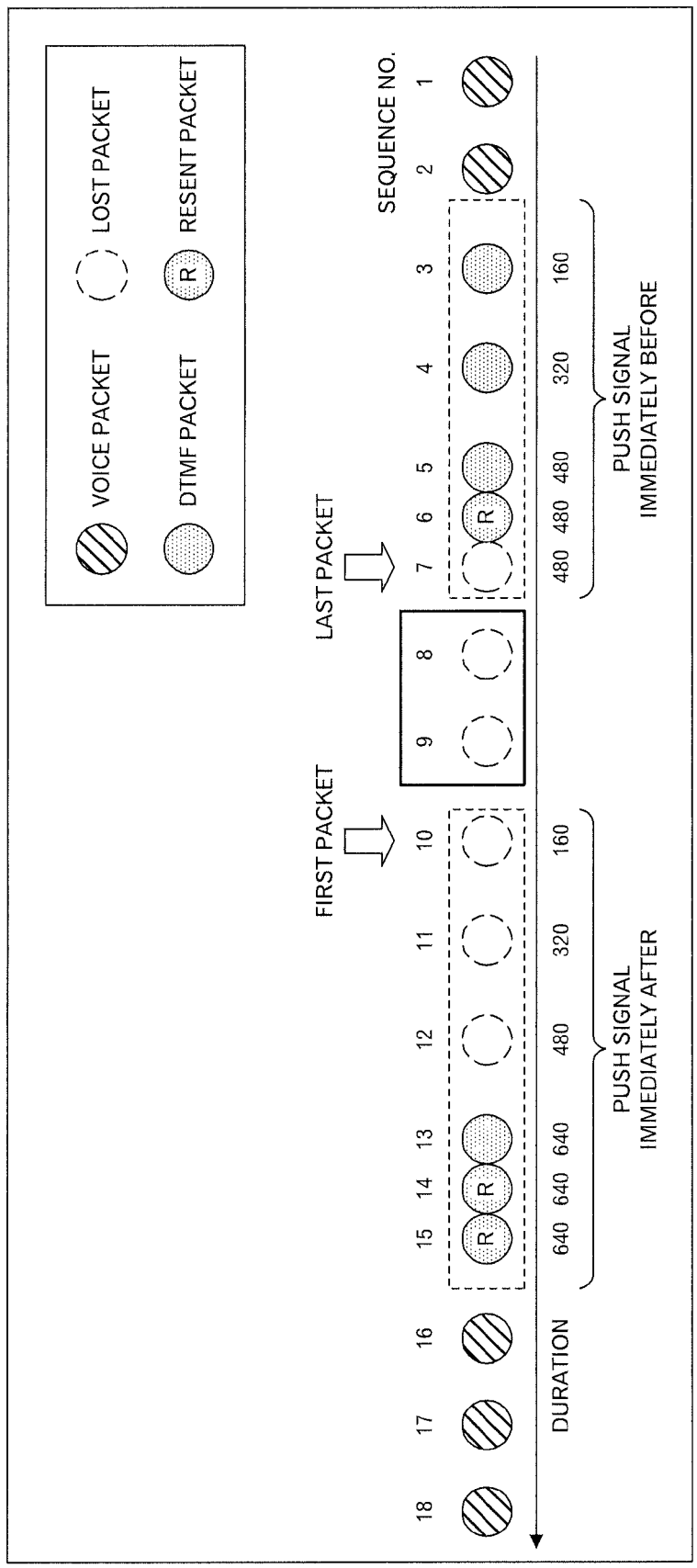
FIG. 18 is a diagram to explain a processing S.

After the processing of the step S35, or after the terminal C, the basic quality judging unit 76 uses the processing results at the step S17 or step S23, and the processing results at the step S27 or step S35 to calculate the number of unknown packets (step S37). This processing is explained using FIG. 18. Incidentally, FIG. 18 illustrates an example of a case in which the packet loss occurred, where the status of the packet loss is the same as in FIG. 16 and FIG. 17. Here, when the processing of the step S23 is carried out, the sequence number of the last packet among the DTMF packets relating to the push signal immediately before the loss is identified. Therefore, it is found that the packets having the sequence numbers up to that sequence number were DTMF packets. In the example above, it is found that the packets having the sequence numbers up to sequence number 7 were DTMF packets. Moreover, when the processing of the step S35 is carried out, the sequence number of the first packet among the DTMF packets relating to the push signal immediately after the loss is identified. Therefore, it is found that the packets having that sequence number and subsequent sequence numbers were DTMF packets. In the example above, it is found that the packets having sequence number 10 and subsequent sequence numbers were DTMF packets. Therefore, in the example above, the packets for which it is unknown whether the packets are voice packets or DTMF packets are packets having sequence numbers 8 and 9. Accordingly, the number of unknown packets can be found by subtracting 1 from the difference between the sequence number of the last packet among the DTMF packets relating to the push signal immediately before the loss and the sequence number of the first packet among the DTMF packets relating to the push signal immediately after the loss. In the example in FIG. 18, the number of unknown packets is 2 (=10−7−1). Incidentally, when it is not possible to identify the last packet among the DTMF packets relating to the push signal immediately before the loss, the sequence number of the packet immediately before the loss, which was acquired at the step S17, is used instead. Likewise, when it is not possible to identify the first packet among the DTMF packets relating to the push signal immediately after the loss, the sequence number of the packet immediately after the loss, which was acquired in step S27, is used instead. Incidentally, when it is not possible to identify both of the last packet and first packet, the number of lost packets becomes the number of unknown packets. After that, the processing moves to the processing of step S39.

Figure 19:
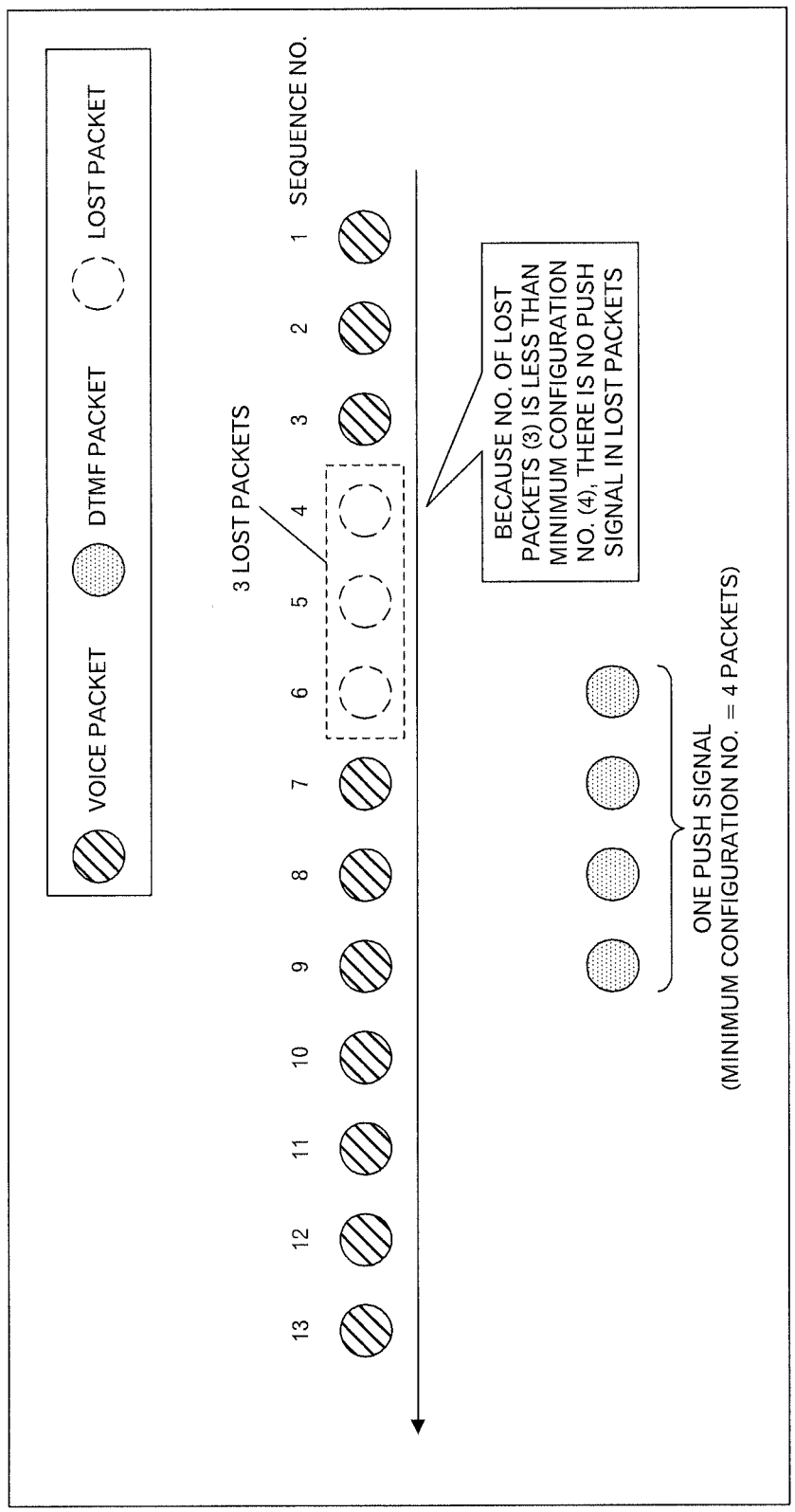
FIG. 19 is a diagram to explain method 2 (basic quality judgment)

After the processing of the step S37, or after the terminal A, the basic quality judging unit 76 determines whether the number of unknown packets is less than the minimum configuration number (step S39). The minimum configuration number is preset in advance, for example, to the minimum number of DTMF packets that are transmitted per one push signal, and data representing the minimum configuration number is stored beforehand in the basic data storage unit 75. For example, as illustrated in FIG. 19, when the number of unknown packets (lost packets) (=3 packets) is less than the minimum configuration number (=4 packets), it is inevitable that there is no push signal among the unknown packets. Therefore, when the number of unknown packet is less than the minimum configuration number (step S39: YES route), the basic quality judging unit 76 determines that there is no push signal among the unknown packets (step S41). In this case, there is no push signal loss, and the quality of the DTMF service is determined to be "OK". Incidentally, the judgment result is stored into the quality data storage unit 78. The processing then ends.

On the other hand, when the number of unknown packets is equal to or greater than the minimum configuration number (step S39: NO route), the processing skips the step S41, and the processing ends. In this case, it is unclear whether or not the push signal loss occurred.

Thus, by using for the minimum configuration number DTMF packets generated per one push signal, it becomes possible to recognize the push signal loss did not occur. Incidentally, in the following, the processing of the step S19 to step S23 is called "Processing Q", the processing of the step S29 to step S35 is called "Processing R", and the processing of the step S37 is called "Processing S".

[Method 3]

Next, method 3 will be explained using FIG. 20 and FIG. 21. First, the assumptions of method 3 will be presented.

(Assumptions of Method 3)

(A) The transmission interval between voice packets and the transmission interval between DTMF packets are different.

(B) The DTMF packets are tone-type DTMF packets.

(C) Both of the packets before and after the loss are voice packets.

In method 3, under such assumptions, the breakdown of the lost packets is calculated using the difference in transmission intervals, and when there are DTMF packets among the lost packets, it is determined that the push signal loss has occurred (NG).

Figure 20:
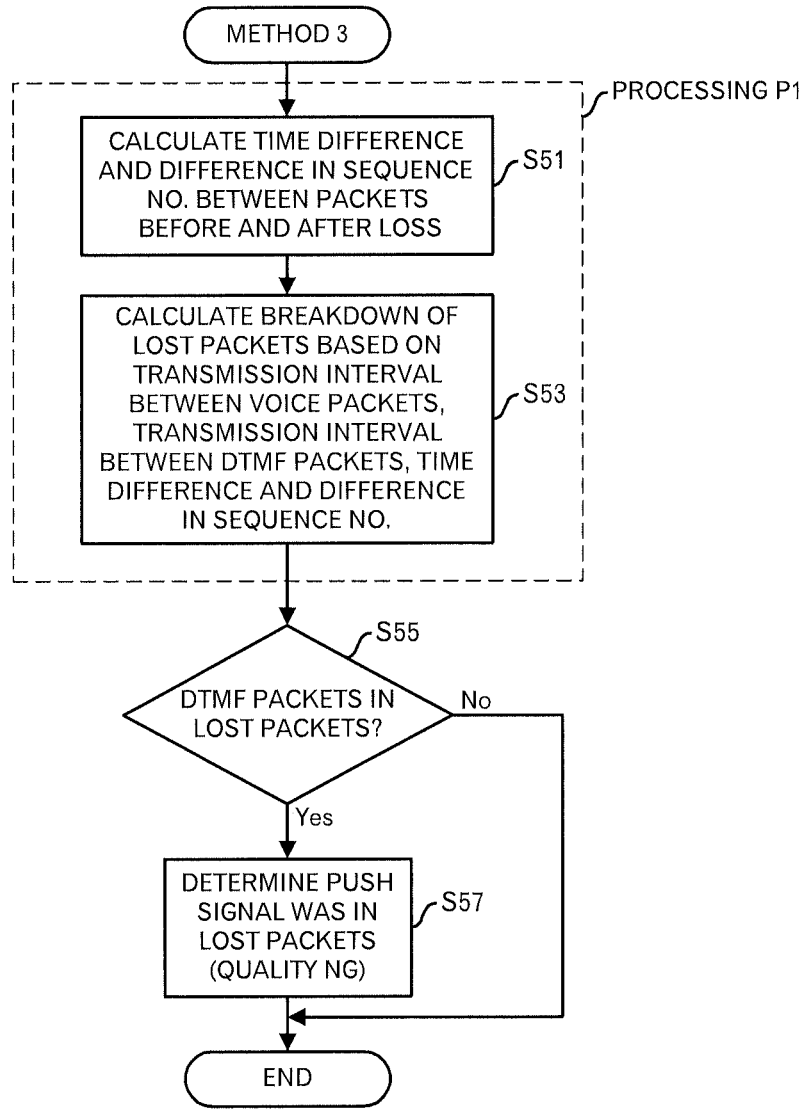
FIG. 20 is a diagram depicting a processing flow of method 3 (basic quality judgment)
Figure 21:
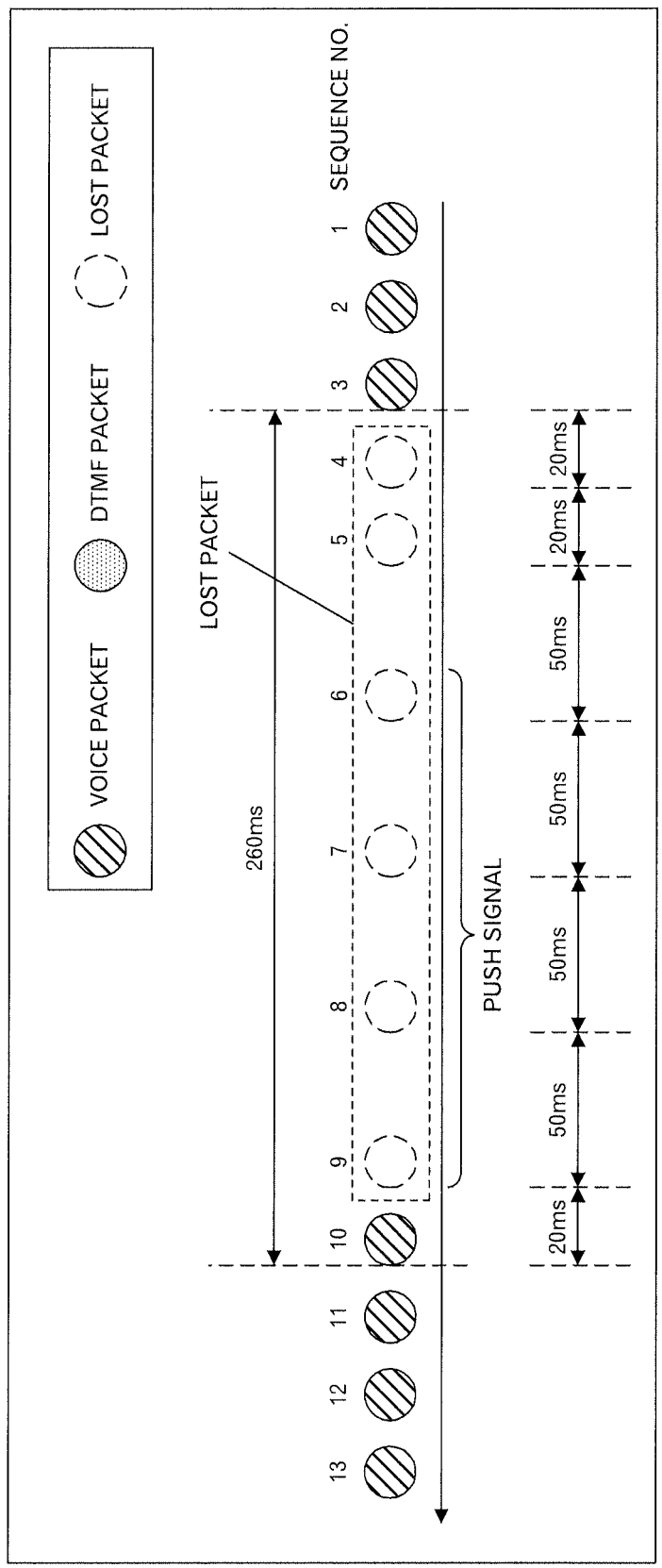
FIG. 21 is a diagram to explain method 3 (basic quality judgment)

More specifically, the basic quality judging unit 76 carries out a processing such as illustrated in FIG. 20. First, the basic quality judging unit 76 uses the packets stored in the storage device to calculate the time difference and difference in sequence numbers between the packet before the loss and the packet after the loss (FIG. 20: step S51). The basic quality judging unit 76 also acquires the transmission interval between voice packets and the transmission interval between DTMF packets from the basic data storage unit 75. The basic quality judging unit 76 then calculates the breakdown of the lost packets based on the transmission interval between voice packets, the transmission interval between DTMF packets, and the time difference and difference in sequence numbers, which were calculated at the step S51 (step S53). Incidentally, the processing of the step S51 and step S53 is the same as the processing of the step S1 and step S3 explained above (in other words, processing P1). Therefore, a detailed explanation is omitted, here.

After that, the basic quality judging unit 76 determines whether or not there are DTMF packets among the lost packets, based on the processing results of the step S53 (step S55). For example, FIG. 21 illustrates an example in which, when the packet loss occurred, both the packets before and after the loss are voice packets. In the example in FIG. 21, all four DTMF packets (packets having sequence numbers 6 to 9) of one push signal are lost. Thus, when both of the packets before and after the loss are voice packets, there are DTMF packets among the lost packets. Then, inevitably, it means that all of the DTMF packets of at least one push signal are lost. Therefore, when there are DTMF packets among the lost packets (step S55: YES route), the basic quality judging unit 76 determines that there is a push signal among the lost packets (step S57). In this case, the push signal loss occurred, and the quality of the DTMF service is determined to be "NG". Incidentally, the judgment result is stored into the quality data storage unit 78. Then, the processing ends.

On the other hand, when there are no DTMF packets among the lost packets (step S55: NO route), the processing skips the step S57, and ends. Incidentally, in this case, as in method 1 explained above, it is determined that lost packets did not occur (OK).

In this way, according to method 3, it is possible to recognize that the push signal loss occurs.

[Method 4]

Next, method 4 will be explained using FIG. 22 and FIG. 23. First, the assumptions of method 4 will be presented.

(Assumptions of Method 4)

(A) Both of the packets before and after the loss are DTMF packets.

(B) The judgment result in the basic quality judgment represents "OK".

In method 4, under such assumptions, when the push number relating to the push signal immediately before the loss and the push number relating to the push signal immediately after the loss are different, it is determined that the push signal before the loss and the push signal after the loss are different signals.

Figure 22:
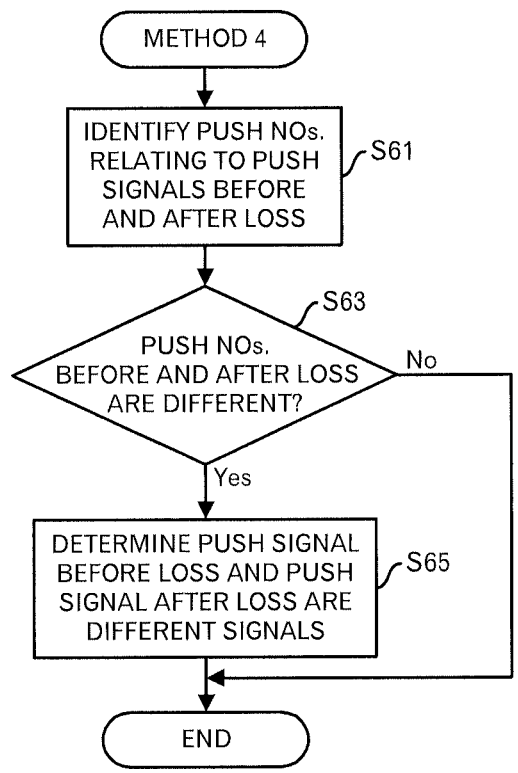
FIG. 22 is a diagram depicting a processing flow of method 4 (basic quality judgment)
Figure 23:
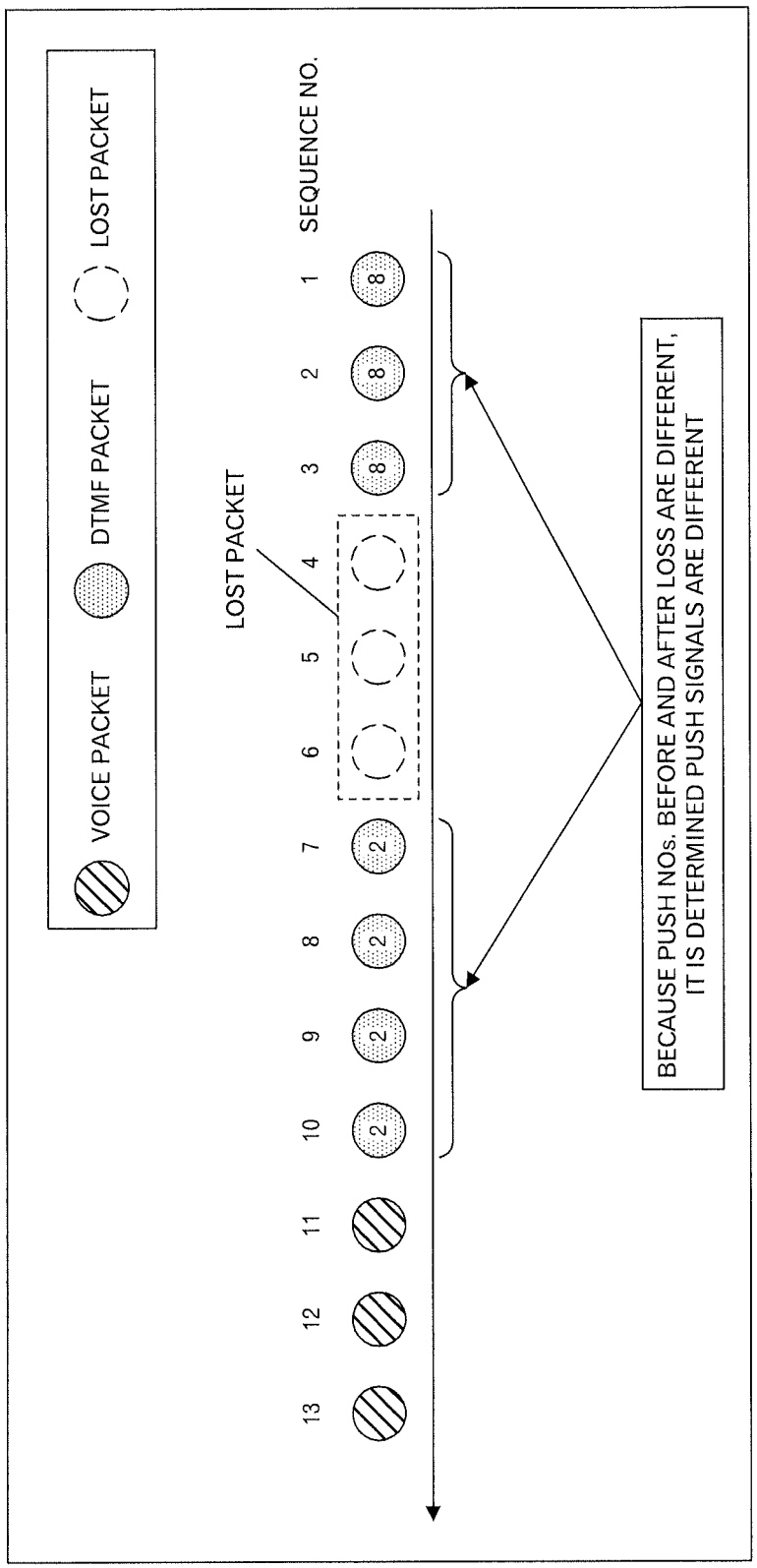
FIG. 23 is a diagram to explain method 4 (basic quality judgment)

More specifically, the detailed quality judging unit 77 carries out a processing such as illustrated in FIG. 22. First, the detailed quality judging unit 77 determines the push numbers relating to the push signals before and after the loss based on the packets stored in the storage device (FIG. 22: step S61). For example, when the DTMF packets are event-type DTMF packets, the push number relating to the push signal immediately before the loss is identified from the event number included in the RTP payload of the DTMF packet immediately before the loss, and the push number relating to the push signal immediately after the loss is identified from the event number included in the RTP payload of the DTMF packet immediately after the loss. On the other hand, when the DTMF packets are tone-type DTMF packets, the push number relating to the push signal immediately before the loss is identified from the low frequencies and high frequencies, which are included in the RTP payload of the DTMF packet immediately before the loss, and the push number relating to the push signal immediately after the loss is identified from the low frequencies and high frequencies, which are included in the RTP payload of the DTMF packet immediately after the loss.

The detailed quality judging unit 77 then determines whether or not the push numbers before and after the loss are different (step S63). Incidentally, as illustrated in FIG. 23, the push numbers before and after the loss are different. Then, inevitably, it means that the push signal immediately before the loss and the push signal immediately after the loss are different signals. In FIG. 23, numbers in circles with shading (gray), solid outlines represent push numbers (this is the same hereafter). In the example in FIG. 23, the push number relating to the push signal immediately before the loss is "8", and the push number relating to the push signal immediately after the loss is "2". Therefore, when the push numbers before and after the loss are different (step S63: YES route), the detailed quality judging unit 77 determines that the push signal immediately before the loss and the push signal immediately after the loss are different signals (step S65). Incidentally, the judgment result is stored into the quality data storage unit 78. The processing then ends.

On the other hand, when the push numbers before and after the loss are the same (step S63: NO route), the processing skips the step S65 and ends. Incidentally, when the push numbers before and after the loss are the same, there is a possibility that the push signals before and after the loss are different signals, and there is also a possibility that those signals are the same signal. In this case, as necessary, the detailed quality judgment is carried out using another method to determine whether or not the push signals before and after the loss are different signals.

Thus, according to method 4, it becomes possible to recognize that a push signal immediately before the loss and a push signal immediately after the loss are different signals.

[Method 5]

Next, method 5 will be explained using FIG. 24 and FIG. 25. First, the assumptions of method 5 are presented.

(Assumptions of Method 5)

(A) The transmission interval between voice packets and the transmission interval between DTMF packets are different.

(B) The DTMF packets are tone-type DTMF packets.

(C) Both of the packets before and after the loss are DTMF packets.

(D) The judgment result in the basic quality judgment is "OK".

In method 5, under such assumptions, the difference in transmission interval is used to calculate the breakdown of lost packets, and when there are voice packets among the lost packets, it is determined that the push signal immediately before the loss and the push signal immediately after the loss are different signals.

Figure 24:
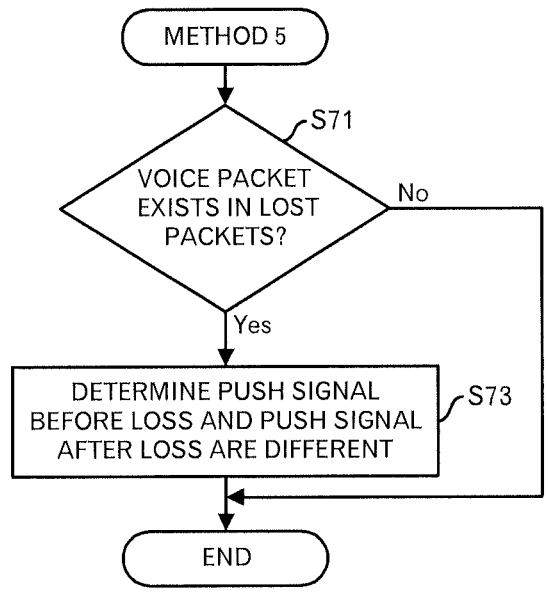
FIG. 24 is a diagram depicting a processing flow of method 5 (basic quality judgment)
Figure 25:
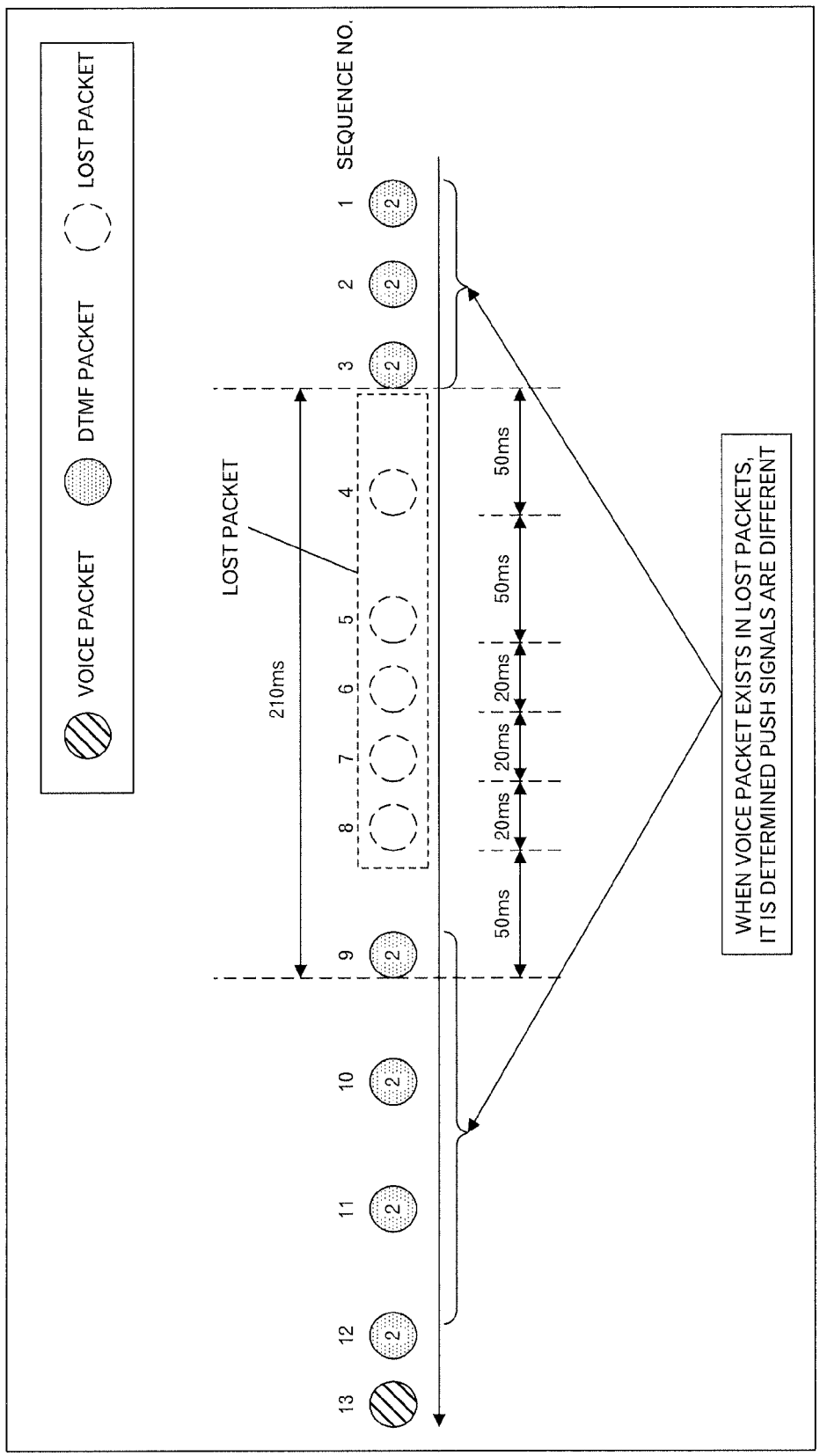
FIG. 25 is a diagram to explain method 5 (basic quality judgment)

More specifically, the detailed quality judging unit 77 carries out a processing such as illustrated in FIG. 24. Incidentally, here, it is assumed that the processing P1 explained above was carried out, and that the breakdown of the lost packets was calculated. First, the detailed quality judging unit 77 determines whether or not there are voice packets among the lost packets (FIG. 24: step S71). Incidentally, as illustrated in FIG. 25, when there is a voice packet among the lost packets, it means that the push signal in front of that voice packet and the push signal after the voice packet are different signals. Therefore, when there is a voice packet among the lost packets (step S71: YES route), the detailed quality judging unit 77 determines that the push signal immediately before the loss and the push signal immediately after the loss are different signals (step S73). Incidentally, the judgment result is stored into the quality data storage unit 78. In the example in FIG. 25, by solving the simultaneous equations: $20x+50y=210$ and $x+y=6$, it is found that $x=3$ and $y=3$ are satisfied, and because the packet immediately before the loss is a DTMF packet, "1" is subtracted from the variable y. In other words, the breakdown of lost packets (5 packets) represents 3 voice packets and 2 ($=3-1$) DTMF packets, and it is found that there is a voice packet among the lost packets. After that, the processing ends.

On the other hand, when there is no voice packet among the lost packets (step S71: NO route), the processing skips the step S73, and ends. Incidentally, when there is no voice packet among the lost packets, there is a possibility that the push signals before and after the loss are different signals, and there is also a possibility that they are the same signal. In this case, as necessary, detailed quality judgment is carries out by another method to determine whether or not the push signals before and after the loss are different signals.

In this way, according to method 5, it becomes possible to recognize that a push signal immediately before the loss and a push signal immediately after the loss are different signals, even when the push numbers before and after the loss are the same.

[Method 6]

Next, method 6 will be explained using FIG. 26 and FIG. 27. First, the assumptions of method 6 will be presented.

(Assumptions of Method 6)

(A) Both of the packets before and after the loss are DTMF packets.

(B) The judgment result of the basic quality judgment is "OK".

In method 6, under such assumptions, when the M bit included in the RTP header of the packet immediately after the loss is "1", or when there is a packet whose M bit is "1" among the lost packets, it is determined that the push signal immediately before the loss and the push signal immediately after the loss are different signals.

Figure 26:
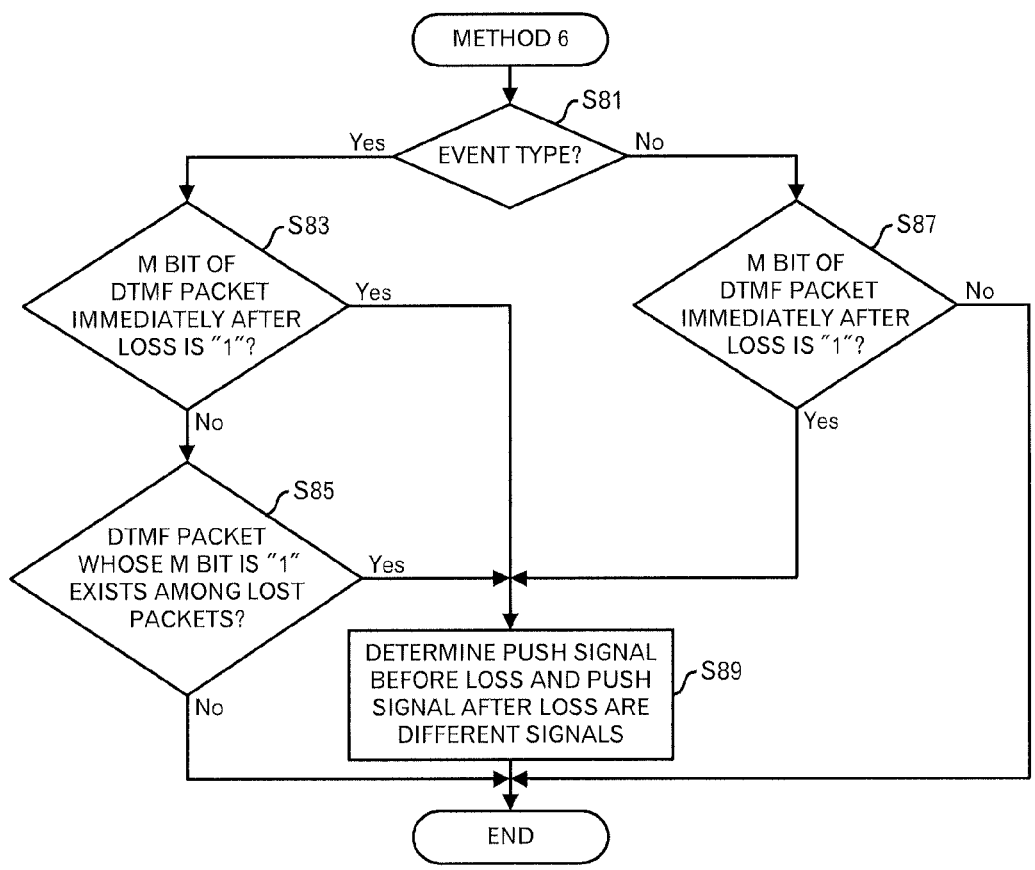
FIG. 26 is a diagram depicting a processing flow of method 6 (basic quality judgment)
Figure 27:
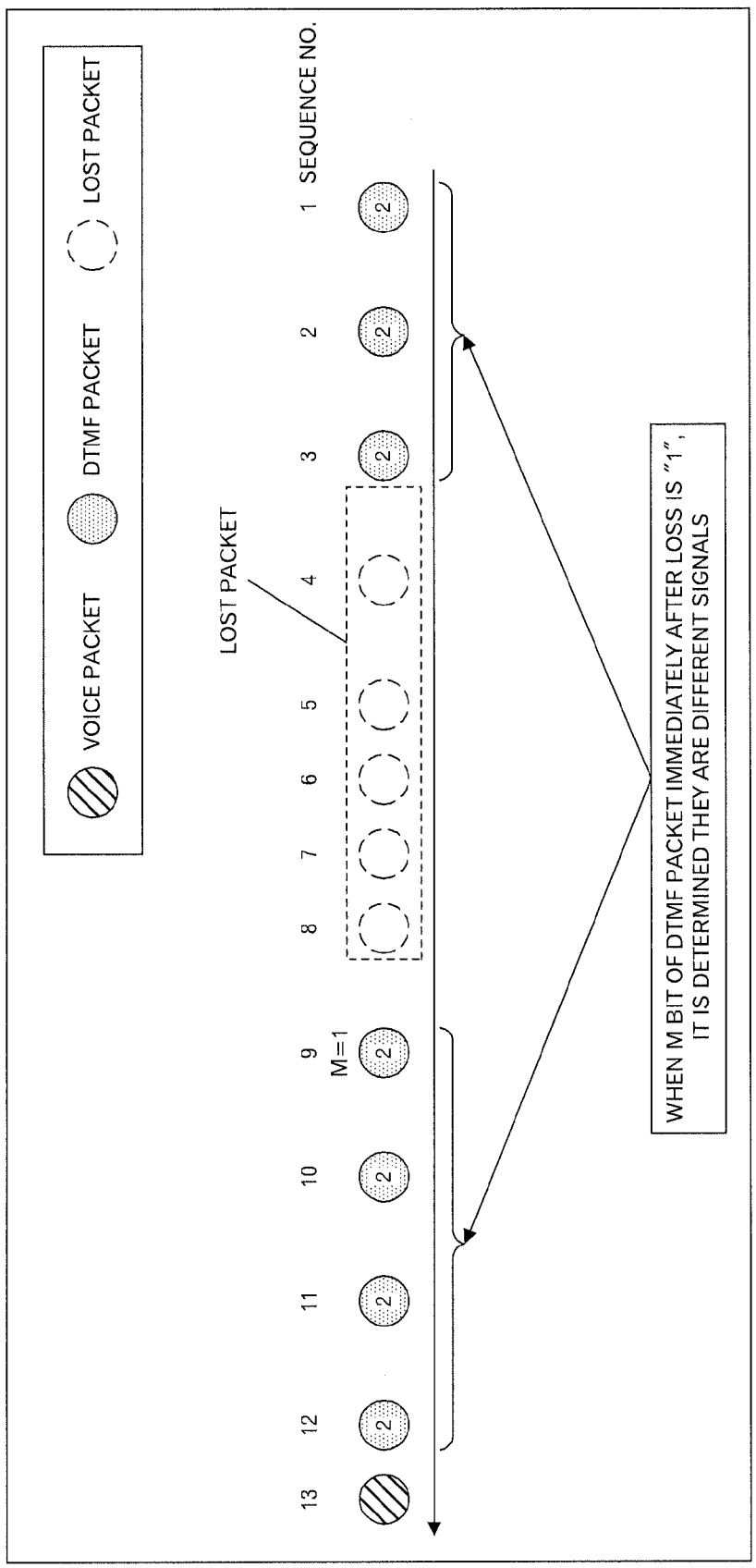
FIG. 27 is a diagram to explain method 6 (basic quality judgment)

More specifically, the detailed quality judging unit 77 carries out a processing such as illustrated in FIG. 26. First, the detailed quality judging unit 77 uses the packets stored in the storage device to determine whether or not the DTMF packets are event-type DTMF packets (FIG. 26: step S81). When the DTMF packets are event-type DTMF packets (step S81: YES route), the detailed quality judging unit 77 uses the packets stored in the storage device to determine whether or not the M bit included in the RTP header of the DTMF packet immediately after the loss is "1" (step S83). As illustrated in FIG. 27, when the M bit that is included in the RTP header of the DTMF packet immediately after the loss is "1", it means that the DTMF packet immediately after the loss is the start of the packets of the push signal immediately after the loss. Therefore, the push signal immediately after the loss is different from the push signal immediately before the loss. Incidentally, in the example in FIG. 27, the push signal immediately after the loss is made up of DTMF packets having sequence numbers 9 to 12. When the M bit included in the RTP header of the DTMF packet immediately after the loss is "1" (step S83: YES route), the processing moves to step S89.

On the other hand, when the M bit included in the RTP header of the DTMF packet immediately after the loss is not "1" (step S83: NO route), the detailed quality judging unit 77 uses the packets stored in the storage device to determine whether or not there is a DTMF packet whose M bit is "1" (step S85). More specifically, the detailed quality judging unit 77 identifies the first packet (in other words, the packet whose M bit is "1") in the DTMF packets relating to the push signal immediately after the loss, and determines whether or not the identified first packet exists among the lost packets. Here, when the DTMF packet whose M bit is "1" exists among the lost packets, it means the push signal immediately after the loss and the push signal immediately before the loss are different signals. Incidentally, by carrying out the processing R explained above, it is possible to acquire the sequence number of the first packet among the DTMF packets relating to the push signal immediately after the loss. When there is a DTMF packet whose M bit is "1" among the lost packets (step S85: YES route), the processing moves to the processing of the step S89.

On the other hand, when there is no DTMF packet whose M bit is "1" among the lost packets (step S85: NO route), the processing ends. Incidentally, when the M bit included in the RTP header of the DTMF immediately after the loss is not "1" and there is no DTMF packet whose M bit is "1" among the lost packets, it means the push signal immediately before the loss and the push signal immediately after the loss are the same signal (in other words, one signal).

On the other hand, when the DTMF packets are determined at the step S81 to be tone-type DTMF packets (step S81: NO route), the detailed quality judging unit 77 uses the packets stored in the storage device to determine whether or not the M bit included in the RTP header of the DTMF packet immediately after the loss is "1" (step S87). When the M bit included in the RTP header of the DTMF packet immediately after the loss is "1" (step S87: YES route), the processing moves to the step S89. However, when the M bit included in the RTP header of the DTMF packet immediately after the loss is not "1" (step S87: NO route), the processing ends.

Then, when the M bit of the DTMF packet immediately after the loss is "1", or when there is a DTMF packet whose M bit is "1" among the lost packets, the detailed quality judging unit 77 determines that the push signal immediately before the loss and the push signal immediately after the loss are different signals (step S89). Incidentally, the judgment result is stored into the quality data storage unit 78. The processing then ends.

In this way, according to method 6, even when the push signal before and after the loss are the same, or even when there are no voice packets among the lost packets, it is possible to recognize whether the push signal immediately before the loss and the push signal immediately after the loss are different signals, or the same signal.

[Method 7]

Next, method 7 will be explained using FIG. 28 and FIG. 29. First, the assumptions of method 7 will be presented.

(Assumptions of Method 7)

(A) The transmission interval between voice packets and the transmission interval between DTMF packets other than resent packets (hereafter, referred to as "normal DTMF packets" in order to distinguish them from resent packets) are the same.

(B) The DTMF packets are event-type DTMF packets.

(C) The transmission interval between normal DTMF packets and the transmission interval between resent packets are different.

(D) Both of the packets before and after the loss are DTMF packets.

(E) The judgment result of the basic quality judgment is "OK".

In method 7, under such assumptions, when it is determined whether or not there is a resent packet among the lost packets and it is determined that there is a resent packet among the lost packets, it is then determined that the push signal immediately before the loss and the push signal immediately after the loss are different signals.

Figure 28:
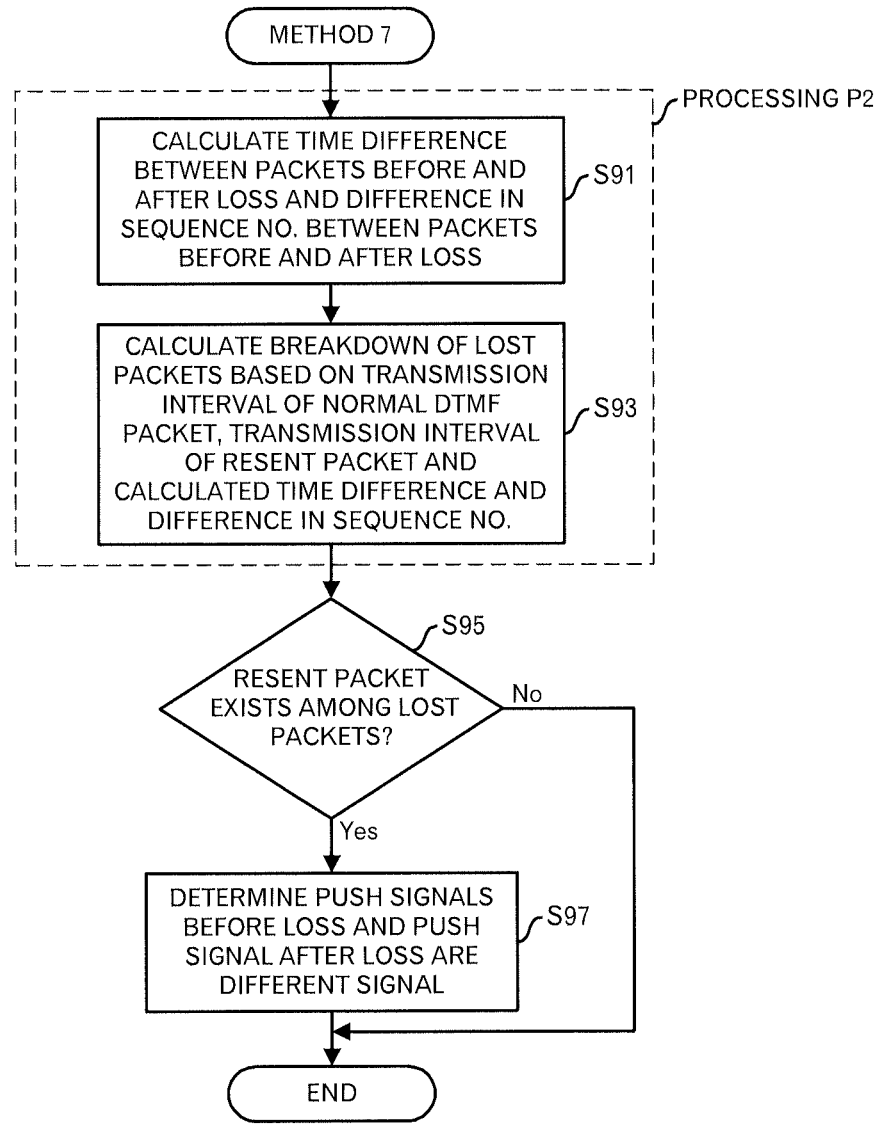
FIG. 28 is a diagram depicting a processing flow of method 7 (basic quality judgment)
Figure 29:
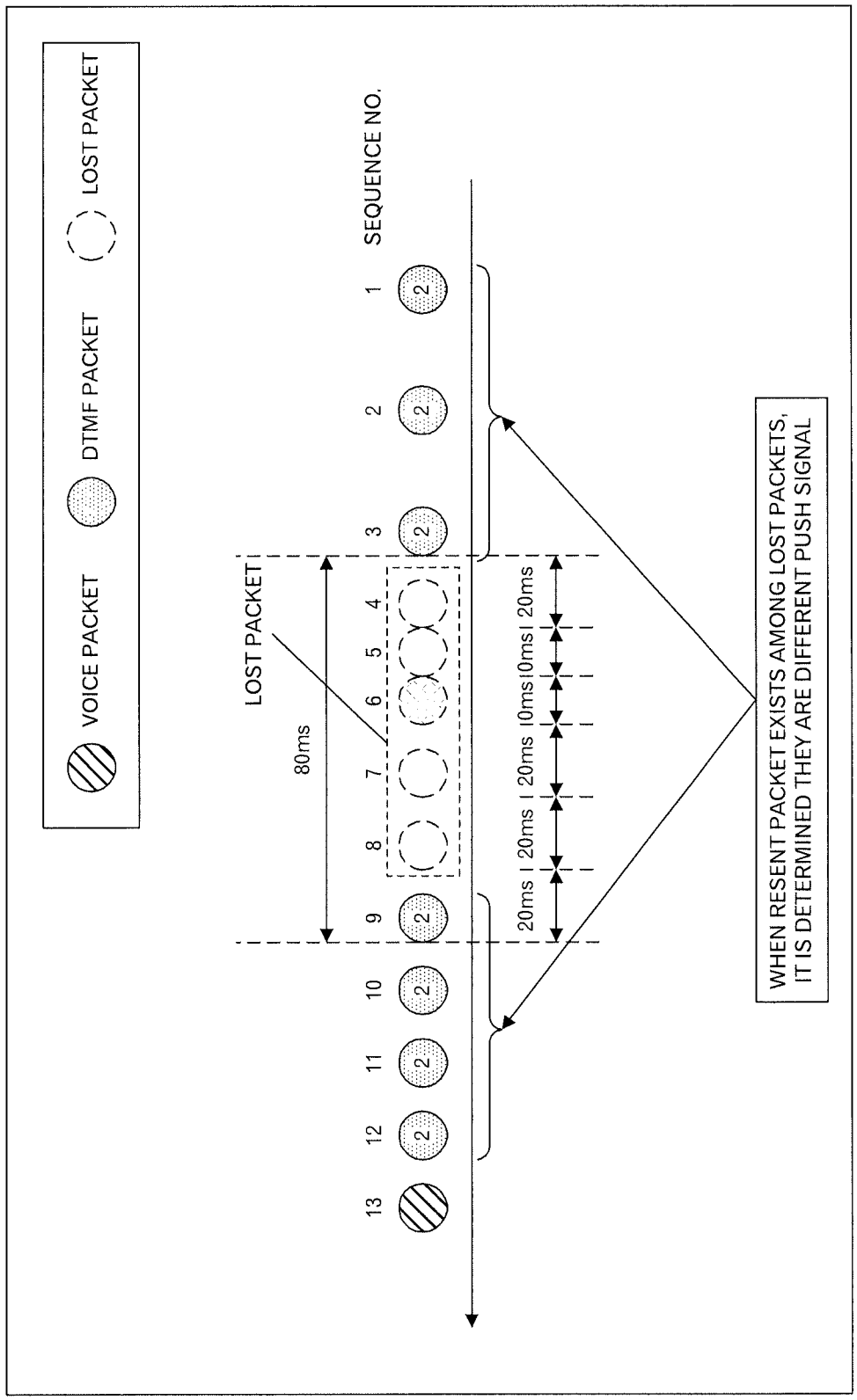
FIG. 29 is a diagram to explain method 7 (basic quality judgment)

More specifically, the detailed quality judging unit 77 carries out a processing such as illustrated in FIG. 28. First, the detailed quality judging unit 77 uses the packets stored in the storage device to calculate the time difference and difference in sequence numbers between the packets before and after the loss (FIG. 28: step S91). Incidentally, this processing is the same as the processing of the step S1, so a detailed explanation here is omitted.

The detailed quality judging unit 77 then acquires the time interval between resent packets and the time interval between packets (voice packets and normal DTMF packets) other than the resent packets from the basic data storage unit 75. The detailed quality judging unit 77 then calculates the breakdown of the lost packets based on the transmission interval between resent packets, the transmission interval between packets other than the resent packets and the time difference and difference in sequence numbers, which were calculated at the step S91 (step S93). This processing will be explained using FIG. 29. FIG. 29 illustrates an example of a case in which the packet loss occurred. In the example in FIG. 29, it is assumed that the transmission interval between the resent packets is 0 ms, and the transmission interval between packets other than the resent packets is 20 ms. In this case, the following simultaneous equations are used to calculate the breakdown of the lost packets.

$$0a + 20b = 80 \quad (5)$$

$$a + b = 6 \quad (6)$$

Incidentally, in the equation (5), "0" is the transmission interval between the resent packets, and "20" is the transmission interval between packets other than resent packets. Moreover, "80" in the equation (5) is the time difference between the packets before and after the loss, which was calculated at the step S91. Furthermore, "6" in the equation 6 is the difference in sequence numbers between the packets before and after the loss, which was calculated at the step S91. The variable "a" in the equations (5) and (6) represents the number of resent packets among the packets to be processed (calculation target packets) (in the example in FIG. 29, packets having sequence numbers 4 to 9), and the variable "b" represents the number of packets other than the resent packets among the packets to be processed.

Solving the aforementioned simultaneous equations, it is found that a=2 and b=4 are satisfied. Here, because the packets to be processed include the packet immediately after the loss, "1" must be subtracted from the value of the variable "a" or "b" in order to calculate the breakdown of lost packets. In the example in FIG. 29, because the packet immediately after the loss is the normal DTMF packet, "1" is subtracted from the value of the variable "b". Therefore, the breakdown of lost packets (5 packets) represents 2 resent packets and 3 packets other than the resent packets. Incidentally, as for the equations (5) and (6), it is also possible to carry out the transformation as explained for method 1.

After that, the detailed quality judging unit 77 determines whether or not there is a resent packet among the lost packets, based on the judgment result of the step S93 (step S95). Incidentally, when there is a resent packet among the lost packets, it means that the push signal immediately before the loss and the push signal immediately after the loss are different signals. Therefore, when there is a resent packet among the lost packets (step S95: YES route), the detailed quality judging unit 77 determines that the push signal immediately before the loss and the push signal immediately after the loss are different signals (step S97). Incidentally, the judgment result is stored into the quality data storage unit 78. The processing then ends.

On the other hand, when there was no resent packet among the lost packets (step S95: NO route), the processing skips the step S97 and ends. Incidentally, when there is no resent packet among the lost packets, it means that the push signal immediately before the loss and the push signal immediately after the loss are the same signal (in other words, one signal).

By calculating the breakdown of the lost packets using the difference in transmission intervals between resent packets and packets other than resent packets in this way, it is possible to recognize whether the push signal immediately before the loss and the push signal immediately after the loss are different signals or the same signal. The processing of the step S91 and step S93 will be called "Processing P2" below.

Incidentally, a summary of the processing contents and application conditions of the processing P1, processing P2, processing Q, processing R and processing S explained above is depicted in FIG. 30. In FIG. 30, the processing contents, application condition 1 (loss pattern), application condition 2 (type) and application condition 3 (other) are given for each processing. For example, the processing P1 is a processing for calculating the number of voice packets and the number of DTMF packets among the lost packets. Incidentally the processing P1 can be applied when the DTMF packets are tone-type DTMF packets and the transmission intervals between voice packets and between DTMF packets are different. In addition, the processing P2 is a processing for calculating the number of resent packets and the number of packets other than the resent packets among the lost packets. Incidentally, the processing P2 can be applied when the DTMF packets are event-type DTMF packets and the transmission intervals between voice packets and between DTMF packets are the same. Furthermore, the processing Q is a processing for calculating the sequence number of the last packet among the DTMF packets relating to the push signal immediately before the loss. Incidentally, the processing Q can be applied when the packet immediately before the loss is a DTMF packet, and the DTMF packet is event-type DTMF packet. Moreover, the processing R is a processing for calculating the sequence number of the first packet among the DTMF packets relating to the push signal immediately after the loss. Incidentally, the processing R can be applied when the packet immediately after the loss is a DTMF packet, and the DTMF packet is event-type DTMF packet. Furthermore, the processing S is a processing for calculating the number of packets between the last packet among the DTMF packets relating to the push signal immediately before the loss (or the packet immediately before the loss) and the first packet among the DTMF packets relating to the push signal immediately after the loss (or the packet immediately after the loss). Incidentally, the processing S can be applied when at least one of the packets before and after the loss is a DTMF packet and the DTMF packet is event-type DTMF packet.

[Specific Example of Operations of the Delivery Status Judging Apparatus]

Figure 31:
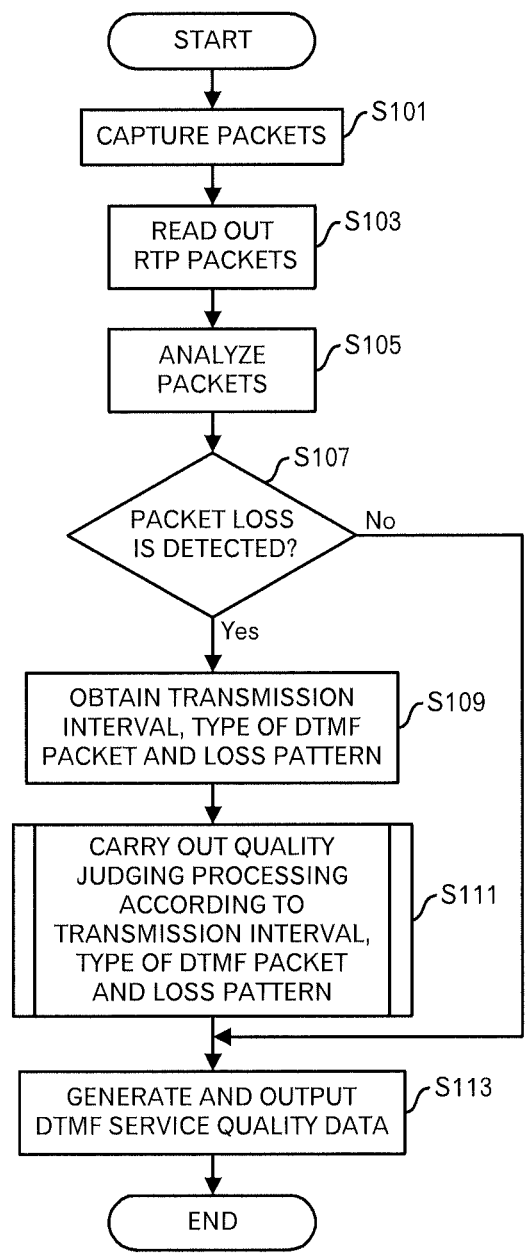
FIG. 31 is a diagram depicting an entire processing flow of a processing executed by the delivery status judging apparatus 7.

Next, a processing flow of a processing executed by the delivery status judging apparatus 7 will be explained using FIG. 31 to FIG. 69. FIG. 31 illustrates an overall processing flow of the processing executed by the delivery status judging apparatus 7. First, the packet capture unit 71 captures packets flowing over the network via the TAP 5, and outputs the packets to the packet analyzer 72 (FIG. 31: step S101).

Then, when the packet analyzer 72 receives the packets from the packet capture unit 71, the packet analyzer 72 determines whether or not the packets are RTP packets, and when the packets are RTP packets, the packet capture unit 71 stores the packets into the storage device (step S103). The packet analyzer 72 also, periodically or at arbitrary timing, instructs the type judging unit 73 to determine whether the captured packet is a voice packet or a DTMF packet. For example, when a predetermined interval is set as timing when the processing is carried out, the packet analyzer 72 outputs an instruction at that interval.

Then, when the type judging unit 73 receives the instruction from the packet analyzer 72, the type judging unit 73 analyzes the RTP packets stored in the storage device (step S105). More specifically, the type judging unit 73 determines the type of the packet for each RTP packet stored in the storage device according to the payload type in the RTP header, and outputs the judgment results to the packet loss judging unit 74. Moreover, by analyzing the RTF packets, data such as the type (event or tone) of the DTMF packets flowing in the RTP session, the transmission interval between voice packets, the transmission interval between DTMF packets, the transmission interval between resent packets and the like is acquired, and stored into the basic data storage unit 75. Incidentally, information such as the transmission intervals and type of DTMF packets may also be provided beforehand.

Then, the packet loss judging unit 74, periodically or at arbitrary timing, determines whether or not the packet loss occurred (step S107). For example, the packet loss judging unit 74 checks the sequence numbers of a series of RTP packets stored in the storage device, and when there is a missing sequence number, the packet loss judging unit 74 determines that the packet loss has occurred. When the packet loss has not occurred (step S107: NO route), the processing skips the step S109 and step S111 explained below, and moves to the processing of step S113.

On the other hand, when the occurrence of lost packets was detected (step S107: YES route), the processing moves to a processing of step S109. Then, the packet loss judging unit 74 acquires the transmission intervals between voice packets and between DTMF packets, the DTMF packet type and the loss pattern according to data stored in the basic data storage unit 75 and the judgment result by the type judging unit 73 (step S109). Incidentally, the loss patterns includes four patterns: 1) a pattern in which both of the packets before and after the loss are DTMF packets; 2) a pattern in which the packet immediately before the loss is a DTMF packet, and the packet immediately after the loss is a voice packet; 3) a pattern in which the packet immediately before the loss is a voice packet, and the packet immediately after the loss is a DTMF packet; and 4) a pattern in which both of the packets before and after the loss are voice packets. For example, the packet loss judging unit 74 uses the judgment results from the type judging unit 73 to determine the corresponding pattern. Moreover, the transmission intervals between voice packets and between DTMF packets and DTMF packet type are acquired from the basic data storage unit 75. The packet loss judging unit 74 then outputs the acquired transmission intervals between voice packets and between DTMF packets, the DTMF packet type and the loss pattern to the basic quality judging unit 76.

Then, when the basic quality judging unit 76 receives the data from the packet loss judging unit 74, the basic quality judging unit 76 cooperates with the detailed quality judging unit 77 to carry out a quality judgment processing according to the transmission intervals between voice packets and between DTMF packets, the DTMF packet type and the loss pattern (step S111). More specifically, one of the quality judgment processing 1 to 16 explained in detail later will be carried out. Incidentally, as illustrated in FIG. 32, a processing to be carried out is determined according to the transmission intervals between voice packets and between DTMF packets, the DTMF packet type and the loss pattern. For example, as for the transmission intervals, there are two cases, including a case in which the transmission interval between voice packets and the transmission interval between DTMF packets are different, and a case in which the transmission intervals are the same. In addition, there are two types of DTMF packets, which include an event type and tone type. Furthermore, there are four patterns including packet patterns before and after the loss (in other words, the loss patterns) as described above. Therefore, there are 16 (=2*2*4) possible combinations. As illustrated in FIG. 32, for example, when the transmission interval between voice packets and the transmission interval between DTMF packets are different, and the DTMF packets are event-type DTMF pockets, and both of the packets before and after the loss are DTMF packets, the quality judgment processing 1 is carried out at the step S111. Incidentally, the processing will be explained in detail later, however, in the quality judgment processing 1 to 16, it is determined whether or not the push signal loss occurred. Incidentally, the quality judgment processing 1, 5, 9 and 13 are processing for a case in which both of the packets before and after the loss are DTMF packets. Therefore, when the push signal loss did not occur, it is further determined whether or not the push signals before and after the loss are different signals. Incidentally, the processing result of the quality judgment processing is stored into the quality data storage unit 78. FIG. 32 illustrates the basic quality judgment method and the detailed quality judgment method that are used in the quality judgment processing for each quality judgment processing. For example, in the quality judgment processing 1, the basic quality judgment is carried out by method 2, and the detailed quality judgment is carried out by methods 4 and 6.

Then, after carrying out the quality judgment processing (after the processing of the step S111) the output unit 79 uses the data stored in the quality data storage unit 78 to generate quality judgment result screen data of the DTMF service, and outputs the generated data to the display device (step S113), and the processing ends. Incidentally, for example, in a telephone reservation service in transportation organizations, medical institutions or the like, or telephone banking services in financial organizations, when even one push signal is missing, it is not possible to carry out a normal processing. Therefore, when even one push signal is lost, "NG" is displayed as the quality judgment result of the DTMF service, and "OK" is displayed as the quality judgment result of the DTMF service when all of the push signals are delivered. Incidentally, the displayed content of the quality judgment result of the DTMF service is not limited to this. For example, a method may be employed in which the number of delivered push signals and the number of lost push signals are respectively counted, and the loss rate of the push signals (=the number of delivered push signals/(the number of delivered push signals+the number of lost push signals)) is calculated and displayed. For example, when it is determined that the push signal immediately before the loss and the push signal immediately after the loss are different signals, "2" is added to the number of delivered push signals, and when it is determined that the push signals are the same, "1" is added to the number of delivered push signals.

[Quality Judgment Processing 1]

Figure 33:
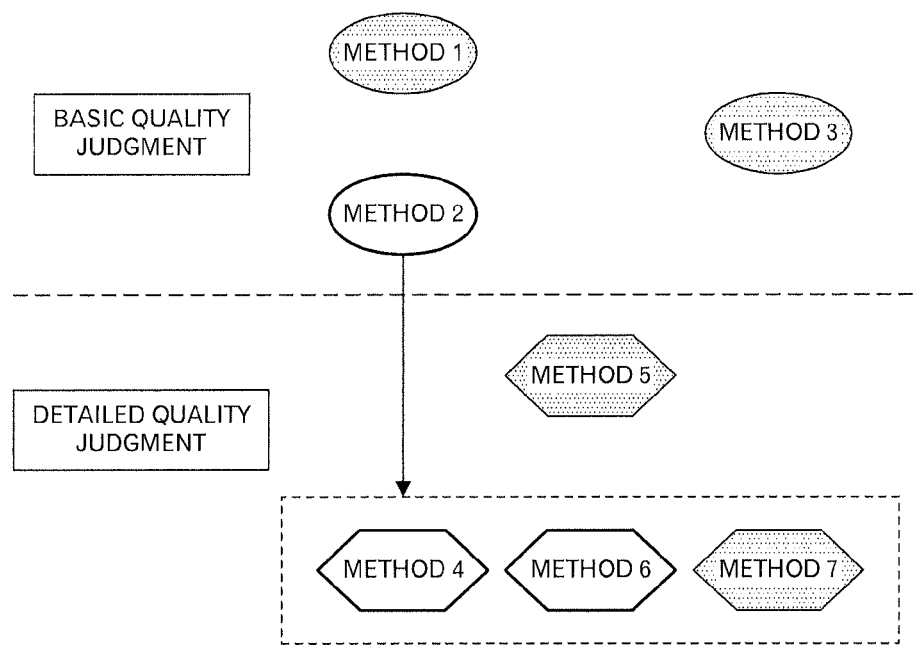
FIG. 33 is a diagram depicting an outline of the quality judgment processing 1.

Next, the quality judgment processing 1 to 16 will be explained. First, the quality judgment processing 1 will be explained using FIG. 33 to FIG. 36. FIG. 33 illustrates a summary of the quality judgment processing 1. As illustrated in FIG. 33, the quality judgment process 1 is a processing that is applied when the transmission intervals of voice packets and between DTMF packets are different, the DTMF packets are event-type DTMF packets and both of the packets before and after the loss are DTMF packets. In addition, in the quality judgment processing 1, the basic quality judgment is carried out according to method 2, and after that, as necessary, the detailed quality judgment is carried out according to methods 4 and 6. Incidentally, FIG. 33 illustrates all of the methods from methods 1 to method 7, however, it means that the shaded (gray) methods (in FIG. 33, methods 1, 3, 5 and 7) are methods that are not used in that quality judgment processing (this is the same hereafter).

Figure 34:
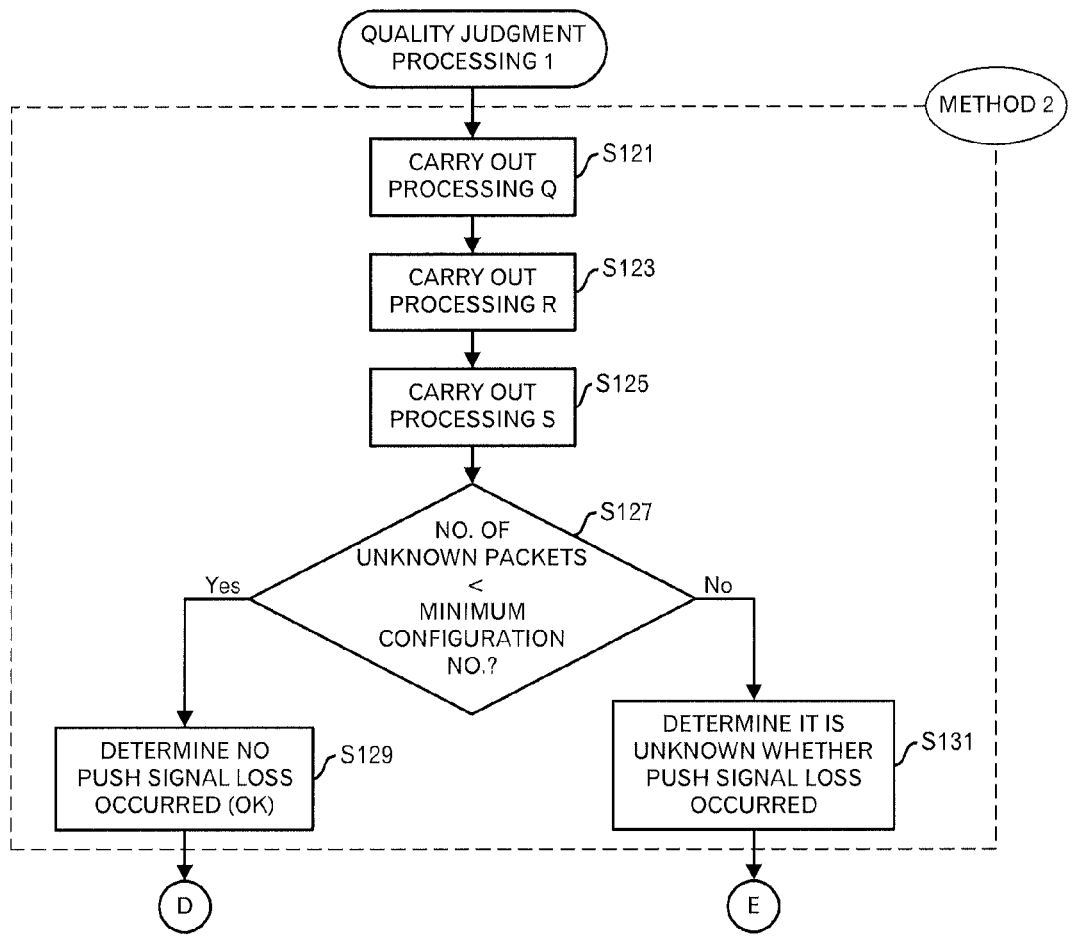
FIG. 34 is a diagram depicting a processing flow (first portion) of the quality judgment processing 1.
Figure 35:
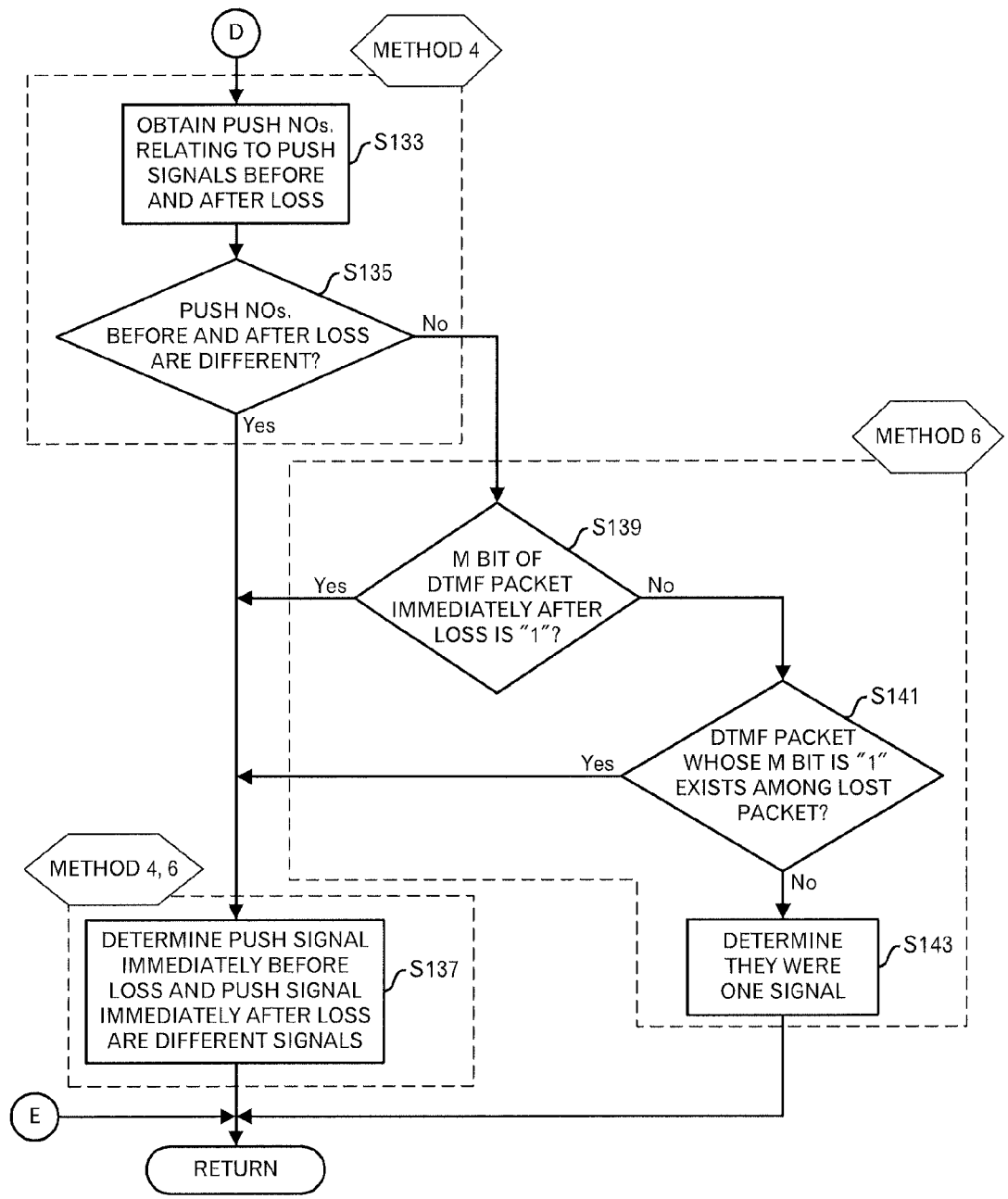
FIG. 35 is a diagram depicting a processing flow (second portion) of the quality judgment processing 1.

The processing flow of the quality judgment processing 1 is illustrated in FIG. 34 and FIG. 35. First, the basic quality judging unit 76 uses the packets stored in the storage device to carry out the processing Q (FIG. 34: step S121). The processing Q is explained above, so the explanation here is omitted. Incidentally, when the processing Q is carried out, the sequence number of the last packet among the DTMF packets relating to the push signal immediately before the loss is calculated. The basic quality judging unit 76 also uses the packets stored in the storage device to carry out the processing R (step S123). The processing R is explained above, so the explanation here is omitted. Incidentally, when the processing R is carried out, the sequence number of the first packet among the DTMF packets relating to the push signal immediately after the loss is calculated. The basic quality judging unit 76 then uses the processing results of the processing Q and processing R to carryout the processing S (step S125). The processing S is explained above, so the explanation here is omitted. Incidentally, when the processing S is carried out, the number of unknown packets among the lost packets is calculated.

The basic quality judging unit 76 then determines whether or not the number of unknown packets is less than the minimum configuration number (step S127). When the number of unknown packets is less than the minimum configuration number (step S127: YES route), the basic quality judging unit 76 determines that there is no push signal loss (OK), and stores the judgment result into the quality data storage unit 78 (step S129). After that, the processing moves to a processing of step S133 (FIG. 35) via a terminal D.

On the other hand, when the number of unknown packets is equal to or greater than the minimum configuration number (step S127: NO route), the basic quality judging unit 76 determines it is unknown whether or not there is a push signal among the lost packets, or in other words, whether or not the push signal loss occurred, and stores the judgment result into the quality data storage unit 78 (step S131). After that, the processing moves to a processing of FIG. 35 via a terminal E and ends, and then returns to the calling source processing.

Shifting to an explanation of FIG. 35, after the terminal D, the detailed quality judging unit 77 acquires the push numbers relating to the push signals before and after the loss from the storage device storing the packets (FIG. 35: step S133). The detailed quality judging unit 77 then determines whether or not the push numbers before and after the loss are different (step S135). When the push numbers before and after the loss are different (step S135: YES route), the detailed quality judging unit 77 determines that the push signal immediately before the loss and the push signal immediately after the loss are different signals, and stores the judgment result into the quality data storage unit 78 (step S137). After that, the processing ends and returns to the calling source processing.

On the other hand, when the push numbers before and after the loss are the same (step S135: NO route), the detailed quality judging unit 77 uses the packets stored in the storage device to determine whether or not the M bit included in the RTP header of the DTMF packet immediately after the loss is "1" (step S139). When the M bit included in the RTP header of the DTMF packet immediately after the loss is "1" (step S139: YES route), the processing moves to the processing of the step S137, and the detailed quality judging unit 77 determines that the push signal immediately before the loss and the push signal immediately after the loss are different signals. After that, the processing ends and returns to the calling source processing.

On the other hand, when the M bit included in the RTP header of the DTMF packet immediately after the loss is not "1" (step S139: NO route), the detailed quality judging unit 77 determines whether or not there is a DTMF packet whose M bit is "1" among the lost packet (step S141). Incidentally, because the processing R (step S123) has already been carried out before this step, the sequence number of the first packet (in other words the packet whose M bit is "1") among the DTMF packets relating to the push signal immediately after the loss has already been calculated. Therefore, at the step S141, the detailed quality judging unit 77 uses the sequence number, which was calculated in the processing R, of the first packet among, the DTMF packets relating to the push signal immediately after the loss, to determine whether or not there is a DTMF packet whose M bit is "1" among the lost packets. When there is a DTMF packet whose M bit is "1" among the lost packets (step S141: YES route), the processing moves to the processing of the step S137, and the detailed quality judging unit 77 determines that the push signal immediately before the loss and the push signal immediately after the loss are different signals. After that, the processing ends and returns to the calling source processing.

On the other hand, when there is no DTMF packet whose M bit is "1" among the lost packets (step S141: NO route), the detailed quality judging unit 77 determines that the push signal immediately before the loss and the push signal immediately after the loss are one signal (the same signal), and stores the judgment result into the quality data storage unit 78 (step S143). After that, the processing ends and returns to the calling source processing.

Figure 36:
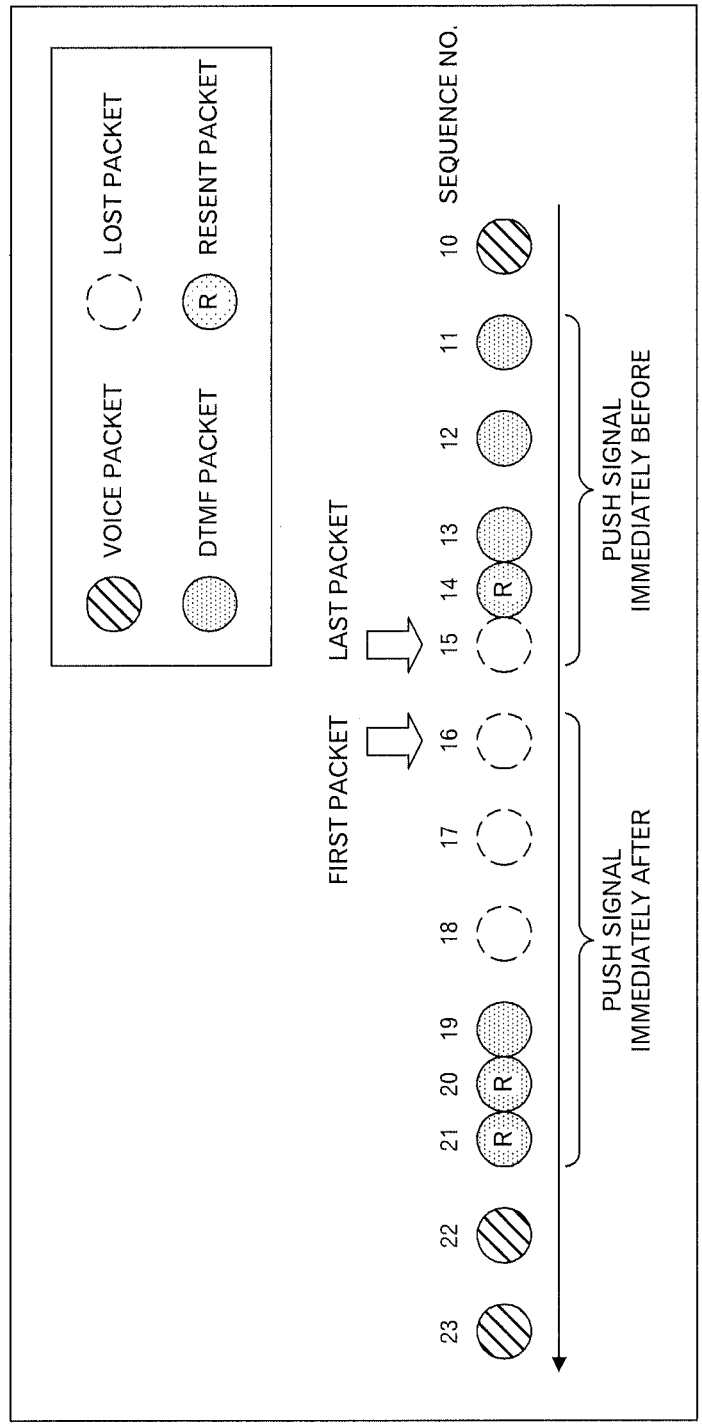
FIG. 36 is a diagram depicting an example of a case where the packet loss has occurred.

For example, when the packet loss occurred as illustrated in FIG. 36, the sequence number of the last packet among the DTMF packets relating to the push signal immediately before the loss is "15", and the sequence number of the first packet among the DTMF packets relating to the push signal immediately after the loss is "16", the number of unknown packets becomes 0 (=16−15−1). Incidentally, it is assumed that the sequence number of the last packet among the DTMF packets relating to the push signal immediately before the loss is calculated to be 15, and the sequence number of the first packet among the DTMF packets relating to the push signal immediately after the loss is calculated to be 16. When the number of unknown packets is 0, then as illustrated in FIG. 36, there is a possibility that the push signals before and after the loss are different signals, and there is also a possibility that the push signals before and after the loss are the same signal, however, by carrying out the judgment of methods 4 or method 6, it is possible to recognize whether the push signals before and after the loss are different signals or the same signals.

Incidentally, FIG. 35 illustrates that the judgment according to method 6 is carried out after the judgment is carried out according to method 4, however, it is not absolutely necessary that the judgment of method 4 be carried out first, and the judgment according to method 6 might be carried out first.

[Quality Judgment Processing 2]

Figure 37:
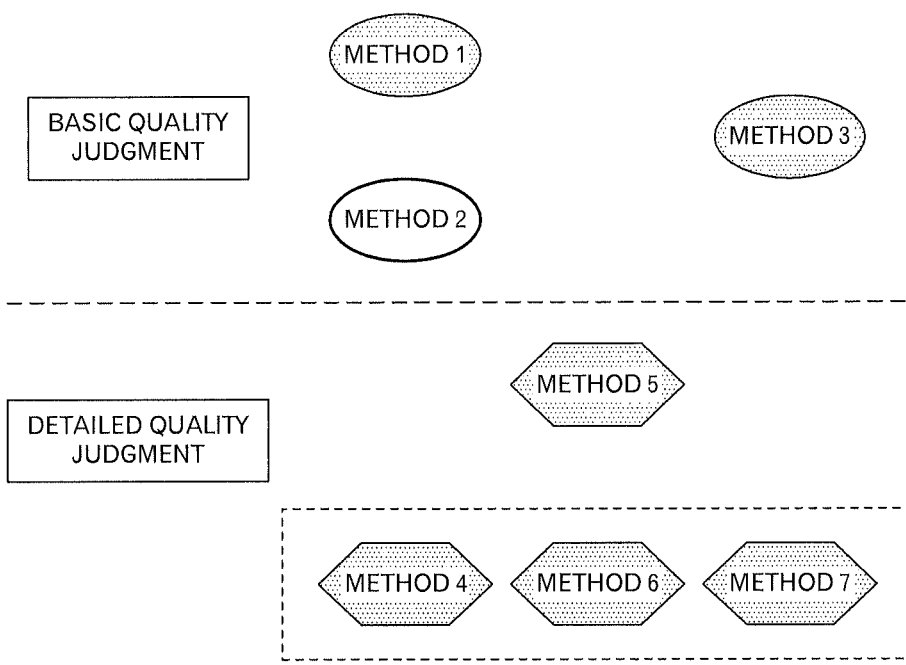
FIG. 37 is a diagram depicting an outline of the quality judgment processing 2.

Next, the quality judgment processing 2 will be explained using FIG. 37 and FIG. 38. FIG. 37 represents a summary of the quality judgment processing 2. As illustrated in FIG. 37, the quality judgment processing 2 is a processing applied when the transmission intervals between voice packets and between DTMF packets are different, the DTMF packets are event-type DTMF packets, and furthermore the packet immediately before the loss is a DTMF packet and the packet immediately after the loss is a voice packet. Then, in the quality judgment processing 2, the basic quality judgment is carried out according to method 2. Incidentally, because the packet immediately after the loss is a voice packet, the detailed judgment is not carried out.

Figure 38:
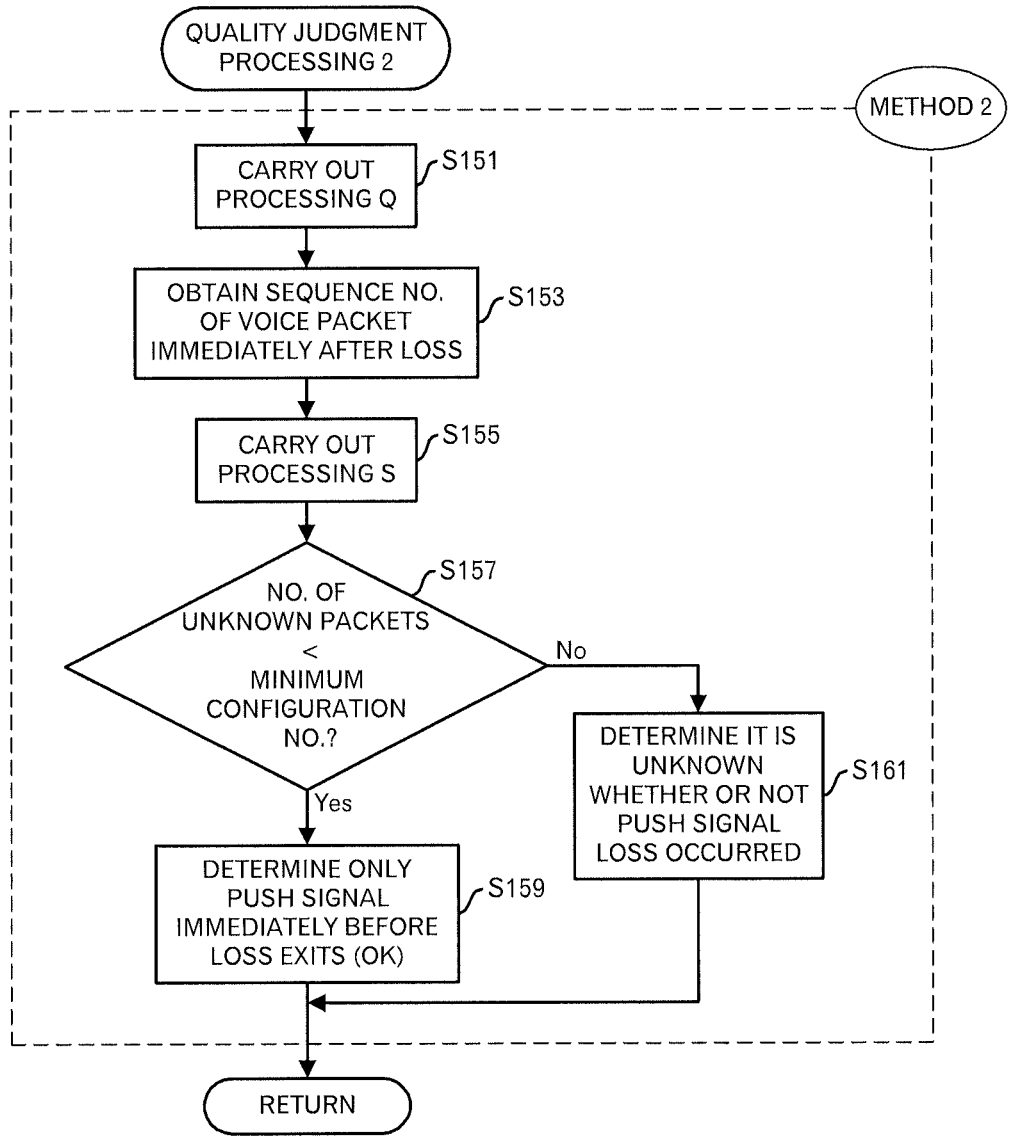
FIG. 38 is a diagram depicting a processing flow of the quality judgment processing 2.

The processing flow of the quality judgment processing 2 is illustrated in FIG. 38. First, the basic quality judging unit 76 uses the packets stored in the storage device to carry out the processing Q (FIG. 38: step S151). Because the processing Q is explained above, the explanation here is omitted. Incidentally, when the processing Q is carried out, the sequence number of the last packet among the DTMF packets relating to the push signal immediately before the loss is calculated. The basic quality judging unit 76 also acquires the sequence number of the voice packet immediately after the loss from the storage device storing the packets (step S153). Incidentally, this processing is the same as the processing of the step S27 (FIG. 14). The basic quality judging unit 76 then uses the processing result of the processing Q and the sequence number of the voice packet immediately after the loss to carry out the processing S (step S155). Because the processing S is explained above, the explanation here is omitted. Incidentally, when the processing S is carried out, the number of unknown packets among the lost packets is calculated.

The basic quality judging unit 76 then determines whether or not the number of unknown packets is less than the minimum configuration number (step S157). When the number of unknown packets is less than the minimum configuration number (step S157: YES route), the basic quality judging unit 76 determines that there is only a push signal immediately before the loss, and stores the judgment result into the quality data storage unit 78 (step S159). In other words, the basic quality judging unit 76 determines that no push signal loss has occurred (OK). After that, the processing ends and returns to the calling source processing.

On the other hand, when the number of unknown packets is equal to or greater than the minimum configuration number (step S157: NO route), the basic quality judging unit 76 determines it is unknown whether or not there is a push signal among the lost packets, or in other words, whether or not the push signal loss occurred, and stores the judgment results into the quality data storage unit 78 (step S161). After that, the processing ends and returns to the calling source processing.

[Quality Judgment Processing 3]

Figure 39:
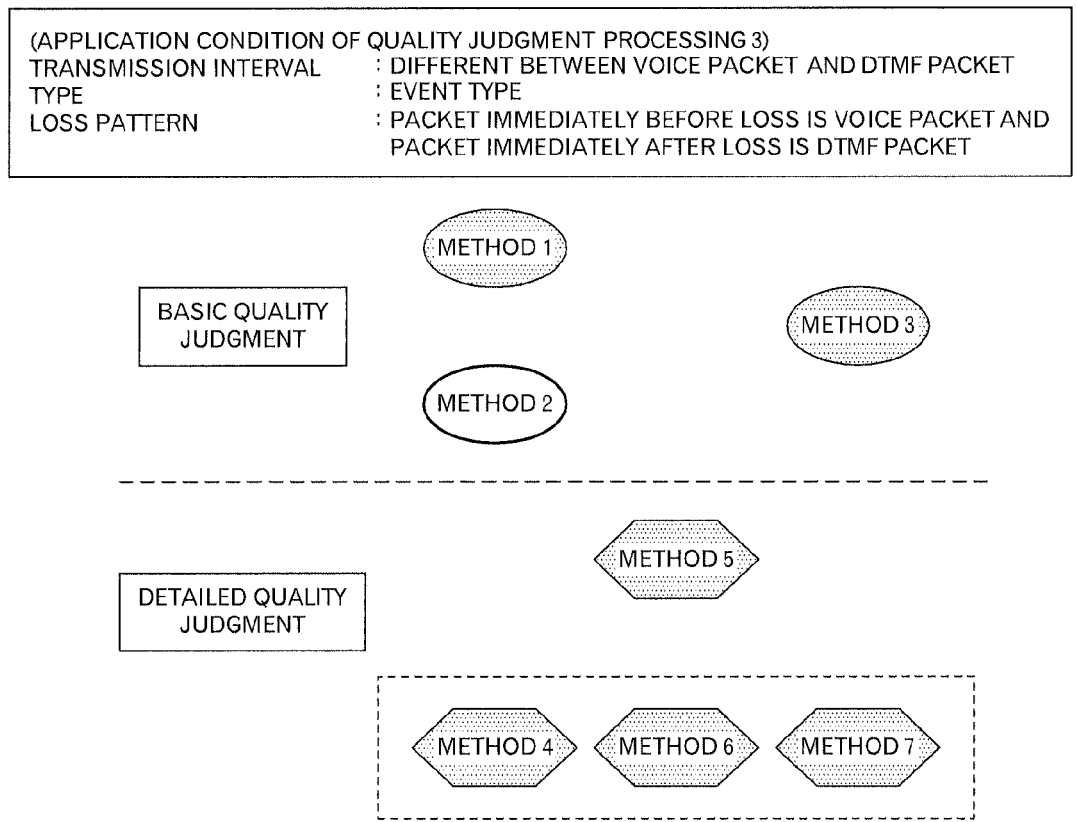
FIG. 39 is a diagram depicting an outline of the quality judgment processing 3.

Next, the quality judgment processing 3 will be explained using FIG. 39 and FIG. 40. FIG. 39 depicts a summary of the quality judgment processing 3. As illustrated in FIG. 39, the quality judgment processing 3 is a processing applied when the transmission intervals of voice packets and between DTMF packets are different, the DTMF packets are event-type DTMF packets and furthermore the packet immediately before the loss is a voice packet and the packet immediately after the loss is a DTMF packet. Then, in the quality judgment processing 3, the basic quality judgment is carried out according to method 2. Incidentally, because the packet immediately before the loss is a voice packet, the detailed quality judgment is not carried out.

Figure 40:
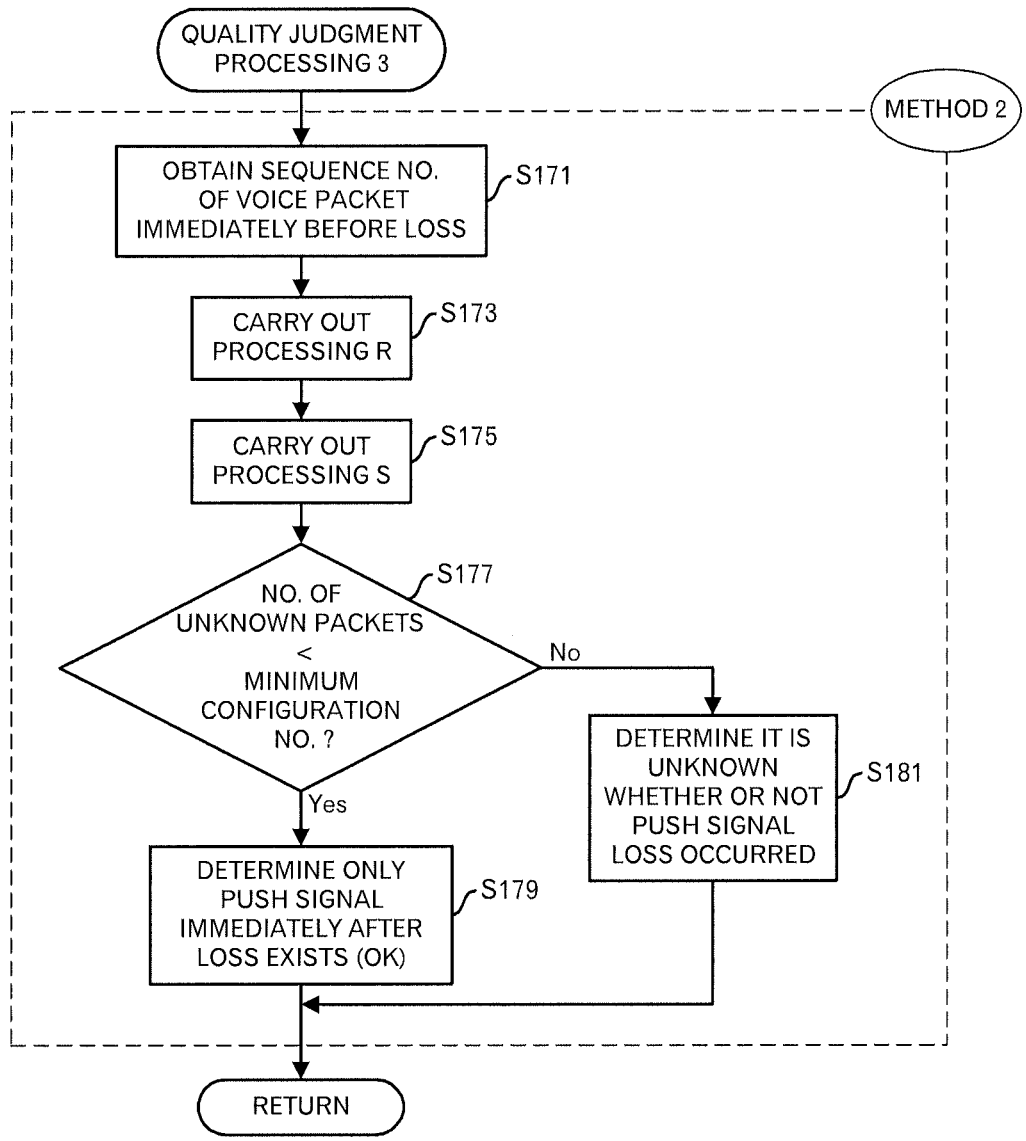
FIG. 40 is a diagram depicting a processing flow of the quality judgment processing 3.

The processing flow of the quality judgment processing 3 is illustrated in FIG. 40. First, the basic quality judging unit 76 acquires the sequence number of the voice packet immediately before the loss from the storage device storing the packets (FIG. 40: step S171). Incidentally, this processing is the same as the processing of the step S17 (FIG. 14). The basic quality judging unit 76 also uses the packets stored in the storage device to carryout the processing R (step S173). Because the processing R has already been explained above, the explanation here is omitted. Incidentally, when the processing R is carried out, the sequence number of the first packet among the DTMF packets relating to the push signal immediately after the loss is calculated. The basic quality judging unit 76 then uses the sequence number of the voice packet immediately before the loss and the processing result of the processing R to carry out the processing S (step S175). Because the processing S has already been explained above, the explanation here is omitted. Incidentally, when the processing S is carried out, the number of unknown packets among the lost packets is calculated.

Then, the basic quality judging unit 76 determines whether or not the number of unknown packets is less than the minimum configuration number (step S177). When the number of unknown packets is less than the minimum configuration number (step S177: YES route), the basic quality judging unit 76 determines that there is only a push signal immediately after the loss, and stores the judgment result into the quality data storage unit 78 (step S179). In other words, the basic quality judging unit 76 determines that the push signal loss did not occur (OK). After that, the processing ends and returns to the calling source processing.

On the other hand, when the number of unknown packets is equal to or greater than the minimum configuration number (step S177: NO route), the basic quality judging unit 76 determines that it is unknown whether or not there is a push signal among the lost packets, or in other words, whether or not the push signal loss occurred, and stores the judgment result into the quality data storage unit 78 (step S181). After that, the processing ends, and returns to the calling source processing.

[Quality Judgment Processing 4]

Figure 41:
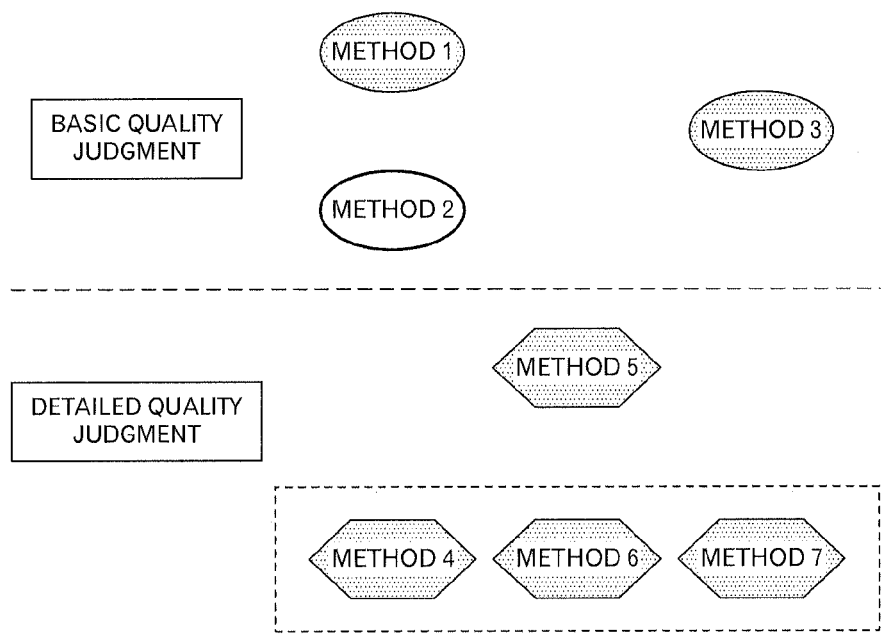
FIG. 41 is a diagram depicting an outline of the quality judgment processing 4.

Next, the quality judgment processing 4 will be explained using FIG. 41 and FIG. 42. FIG. 41 depicts a summary of the quality judgment processing 4. As illustrated in FIG. 41, the quality judgment processing 4 is a processing applied when the transmission intervals between voice packets and between DTMF packets are different, the DTMF packets are event-type DTMF packets, and both of the packets before and after the loss are voice packets. Moreover, in the quality judgment processing 4, the basic quality judgment is carried out according to method 2. Incidentally, because the packets before and after the loss are voice packets, the detailed quality judgment is not carried out.

Figure 42:
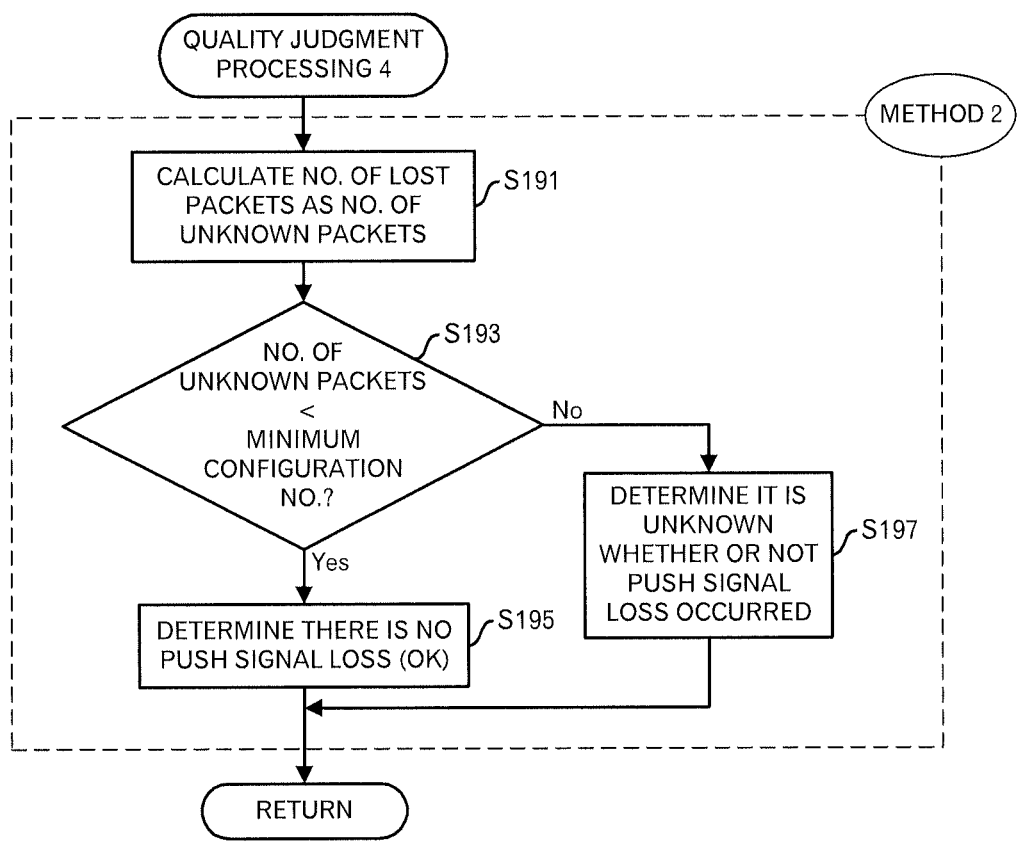
FIG. 42 is a diagram depicting a processing flow of the quality judgment processing 4.

FIG. 42 depicts the processing flow of the quality judgment processing 4. First, the basic quality judging unit 76 uses the packets stored in the storage device to calculate the number of lost packets as the number of unknown packets (FIG. 42: step S191). Incidentally, this processing is the same as the processing of the step S13 (FIG. 14).

The basic quality judging unit 76 then determines whether or not the number of unknown packets is less than the minimum configuration number (step S193). When the number of unknown packets is less than the minimum configuration number (step S193: YES route), the basic quality judging unit 76 determines that there is no push signal loss (OK), and stores the judgment result into the quality data storage unit 78 (step S195). After that, the processing ends, and returns to the calling source processing.

On the other hand, when the number of unknown packets is equal to or greater than the minimum configuration number (step S193: NO route), the basic quality judging unit 76 determines that it is unknown whether or not there is a push signal among the lost packets, or in other words, whether or not the push signal loss occurred, and stores the judgment result into the quality data storage unit 78 (step S197). After that, the processing ends, and returns to the calling source processing.

[Quality Judgment Processing 5]

Figure 43:
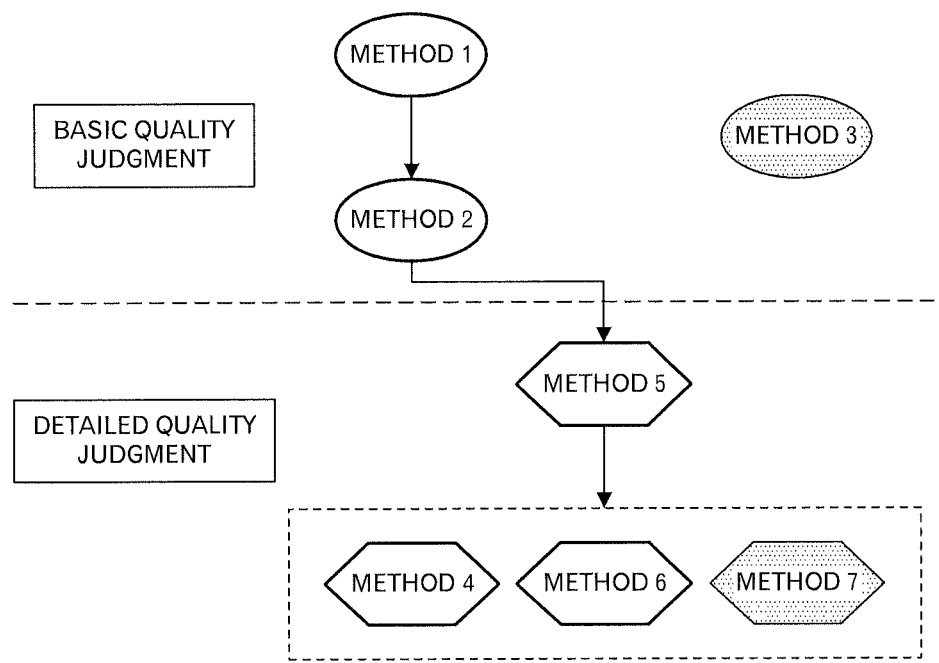
FIG. 43 is a diagram depicting an outline of the quality judgment processing 5.

Next, the quality judgment processing 5 will be explained using FIG. 43 to FIG. 45. FIG. 43 depicts a summary of quality judgment processing 5. As illustrated in FIG. 43, the quality judgment processing 5 is a processing applied when the transmission intervals between voice packets and between DTMF packets are different, the DTMF packets are tone-type DTMF packets, and furthermore both of the packets before and after the loss are DTMF packets. Moreover, in the quality judgment processing 5, the basic quality judgment is carried out according to method 1, and the basic quality judgment is further carried out according to method 2. After that, as necessary, the detailed quality judgment is carried out according to method 5, and the detailed quality judgment is further carried out according to methods 4 and 6.

Figure 44:
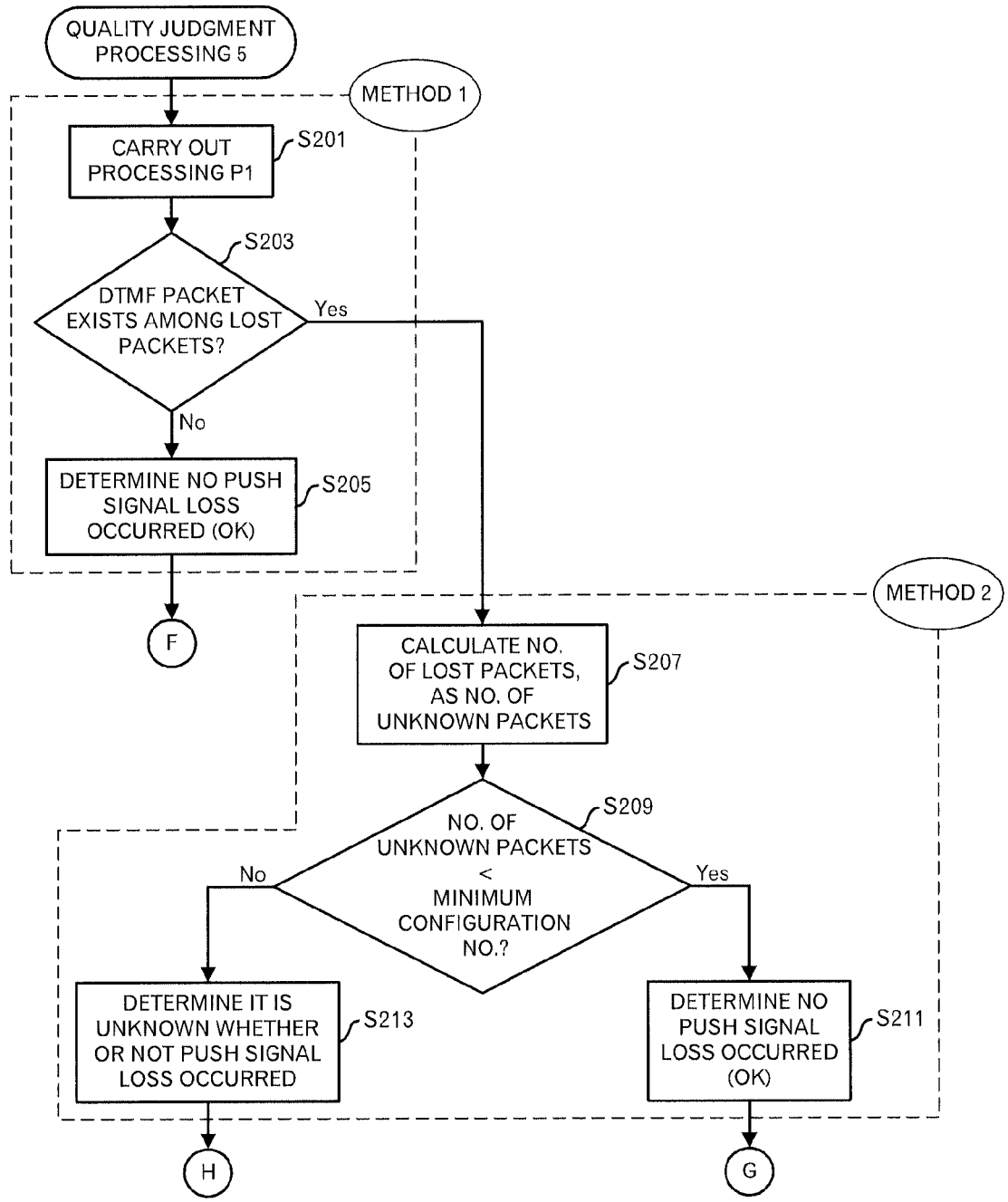
FIG. 44 is a diagram depicting a processing flow (first portion) of the quality judgment processing 5.
Figure 45:
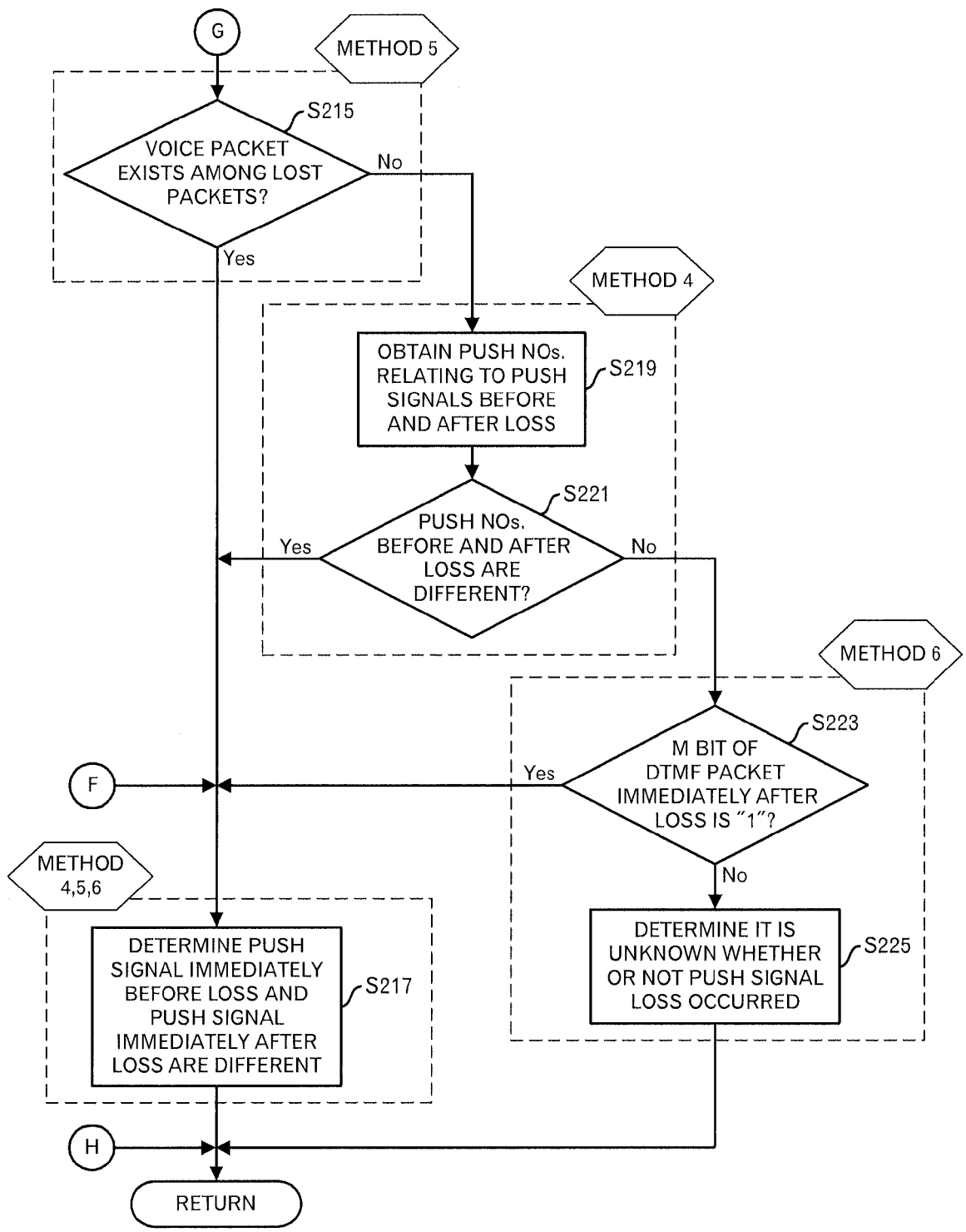
FIG. 45 is a diagram depicting a processing flow (second portion) of the quality judgment processing 5.

The processing flow of the quality judgment processing 5 will be illustrated in FIG. 44 and FIG. 45. First, the basic quality judging unit 76 uses the packets stored in the storage device and data stored in the basic data storage unit 75 to carry out the processing P1 (FIG. 44: step S201). Because the processing P1 has already been explained above, the explanation here is omitted. Incidentally, when the processing P1 is carried out, the breakdown of lost packets is calculated.

Then, the basic quality judging unit 76 uses the processing result of the processing P1 to determine whether or not there is a DTMF packet among the lost packets (step S203). When there is no DTMF packet among the lost packets (step S203: NO route), the basic quality judging unit 76 determines that the push signal loss did not occur (OK), and stores the judgment result into the quality data storage unit 78 (step S205). After that, the processing moves to a processing of step S217 (FIG. 45) via a terminal F.

On the other hand, when there is a DTMF packet among the lost packets (step S203: YES route), the basic quality judging unit 76 uses the packets stored in the storage device to calculate the number of lost packets as the number of unknown packets (step S207). Incidentally, this processing is the same as the processing of the step S13 (FIG. 14) via a terminal G.

Then, the basic quality judging unit 76 determines whether or not the number of unknown packets is less than the minimum configuration number (step S209). When the number of unknown packets is less than the minimum configuration number (step S209: YES route), the basic quality judging unit 76 determines that the push signal loss did not occur (OK), and stores the judgment result into the quality data storage unit 78 (step S211). After that, the processing moves to a processing of the step S215 (FIG. 45).

On the other hand, when the number of unknown packets is equal to or greater than the minimum configuration number (step S209: NO route), the basic quality judging unit 76 determines that it is unknown whether or not there is a push signal among the lost packets, or in other words, whether or not the push signal loss occurred, and stores the judgment result into the quality data storage unit 78 (step S213). After that, the processing moves to a processing in FIG. 45 via a terminal H, ends this processing and returns to the calling source processing.

Moving to an explanation of FIG. 45, after terminal G, the detailed quality judging unit 77 uses the judgment result of the processing P1 (step S201) to determine whether or not there is a voice packet among the lost packets (FIG. 45: step S215). When there is a voice packet among the lost packets (step S215: YES route), the detailed quality judging unit 77 determines that the push signal immediately before the loss and the push signal immediately after the loss are different signals, and stores the judgment result into the quality data storage unit 78 (step S217). After that, the processing ends and returns to the calling source processing. Incidentally, when it is determined at the step S203 that there was no DTMF packet among the lost packets, the processing moves to the processing of the step S217 via the terminal F after the processing of the step S205. Here, when there was no DTMF packet among the lost packets, then it means that all of the lost packets are voice packets. Therefore, even without carrying out judgment such as at the step S215, it can be recognized that the push signal immediately before the loss and the push signal immediately after the loss are different signals.

On the other hand, when there is no voice packet among the lost packets (step S215: NO route), the detailed quality judging unit 77 acquires the push numbers relating to the push signals before and after the loss from the storage device storing the packets (step S219). The detailed quality judging unit 77 then determines whether or not the push numbers before and after the loss are different (step S221). When the push numbers before and after the loss are different (step S221: YES route), the processing moves to the processing of the step S217, and the detailed quality judging unit 77 determines that the push signal immediately before the loss and the push signal immediately after the loss are different signals. After that, the processing ends, and returns to the calling source processing.

On the other hand, when the push numbers before and after the loss are the same (step S221: NO route), the detailed quality judging unit 77 uses the packets stored in the storage device to determine whether or not the M bit included in the RTP header of the DTMF packet immediately after the loss is "1" (step S223). When the M bit included in the RTP header of the DTMF packet immediately after the loss is "1" (step S223: YES route), the processing shifts to the processing of the step S217, and the detailed quality judging unit 77 determines that the push signal immediately before the loss and the push signal immediately after the loss are different signals. After that, the processing ends, and returns to the calling source processing.

On the other hand, when the M bit included in the RTP header of the DTMF packet immediately after the loss is not "1" (step S223: NO route), the detailed quality judging unit 77 determines that it is unknown whether or not there is a push signal among the lost packets, or in other words, whether or not the push signal loss occurred, and stores the judgment result into the quality data storage unit 78 (step S225). After that, the processing ends, and returns to the calling source processing.

Incidentally, although FIG. 45 depicts the processing flow in which judgment is carried out in the order method 5, method 4 and method 6, there is not always need to carry out the judgment in this order, and as long as the same judgment result is obtained, the judgment may be carried out in any order.

[Quality Judgment Processing 6]

Figure 46:
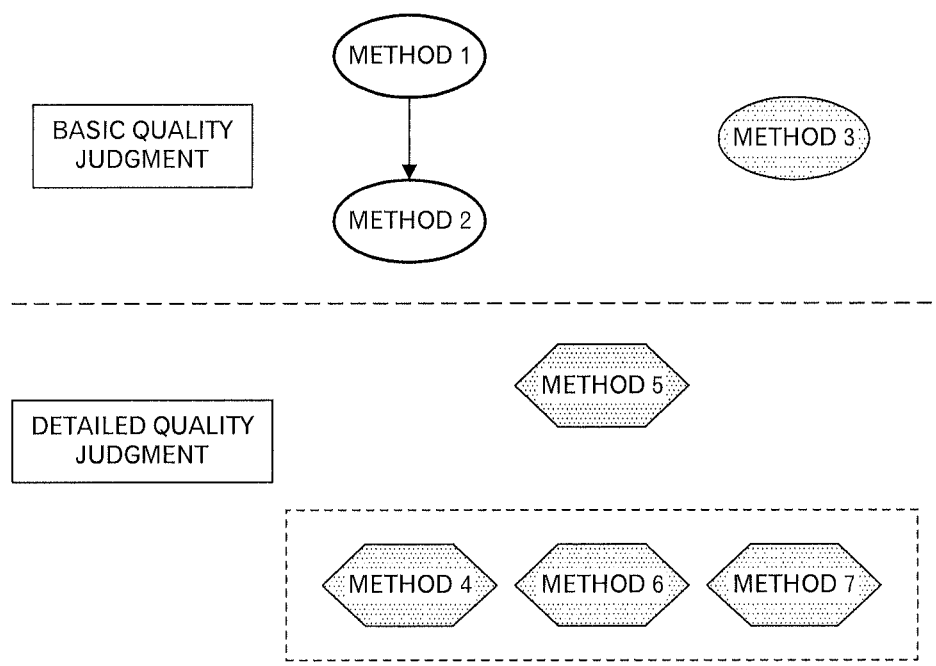
FIG. 46 is a diagram depicting an outline of the quality judgment processing 6.

Next, the quality judgment processing 6 will be explained using FIG. 46 and FIG. 47. FIG. 46 depicts a summary of the quality judgment processing 6. As illustrated in FIG. 46, the quality judgment processing 6 is a processing applied when the transmission intervals between voice packets and between DTMF packets are different, the DTMF packets are tone-type DTMF packets, and furthermore the packet immediately before the loss is a DTMF packet and the packet immediately after the loss is a voice packet. Moreover, in the quality judgment processing 6, the basic quality judgment is carried out according to method 1, and the basic quality judgment is further carried out according to method 2. Incidentally, because the packet immediately after the loss is a voice packet, the detailed quality judgment is not carried out.

Figure 47:
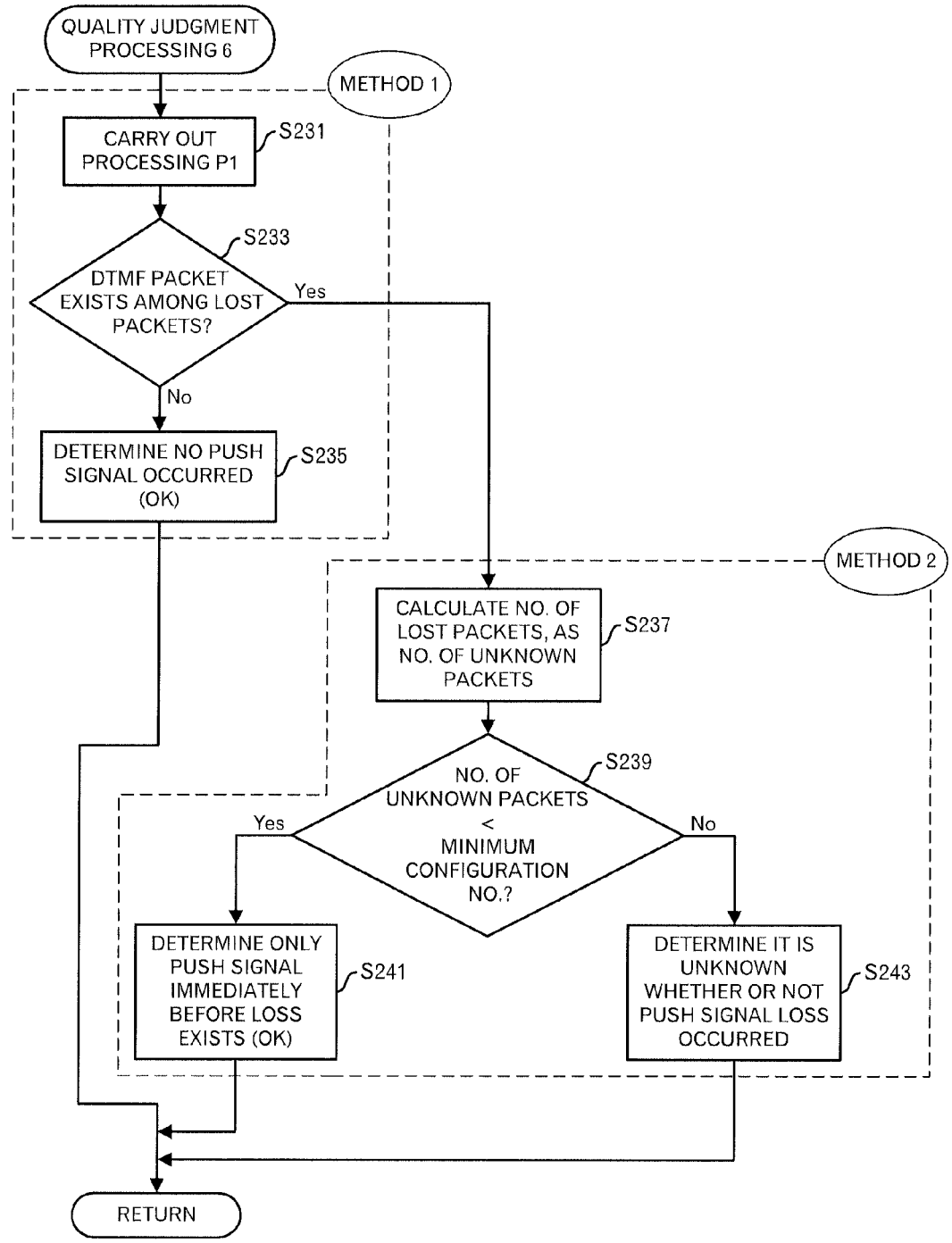
FIG. 47 is a diagram depicting a processing flow of the quality judgment processing 6.

FIG. 47 depicts a processing flow of the quality judgment processing 6. First, the basic quality judging unit 76 uses the packets stored in the storage device to carry out the processing P1 (FIG. 47: step S231). Because the processing P1 has already been explained above, the explanation is omitted, here. Incidentally, when the processing P1 is carried out, the breakdown of the lost packet is calculated.

The basic quality judging unit 76 then uses the judgment result of the processing P1 to determine whether or not there is a DTMF packet among the lost packets (step S233). When there is no DTMF packet among the lost packets (step S233: NO route), the basic quality judging unit 76 determines that the push signal loss did not occur (OK), and stores the judgment result into the quality data storage unit 78 (step S235). After that, the processing ends, and returns to the calling source processing.

On the other hand, when there is a DTMF packet among the lost packets (step S233: YES route), the basic quality judging unit 76 uses the packets stored in the storage device to calculate the number of lost packets as the number of unknown packets (step S237). Incidentally, this processing is the same as the processing at the step S13 (FIG. 14).

Then, the basic quality judging unit 76 determines whether or not the number of unknown packets is less than the minimum configuration number (step S239). When the number of unknown packets is less than the minimum configuration number (step S239: YES route), the basic quality judging unit 76 determines that there is only a push signal immediately before the loss, and stores the judgment result into the quality data storage unit 78 (step S241). In other words, the basic quality judging unit 76 determines that the push signal loss did not occur (OK). After that, the processing ends, and returns to the calling source processing.

On the other hand, when the number of unknown packets is equal to or greater than the minimum configuration number (step S239: NO route), the basic quality judging unit 76 determines that it is unknown whether or not there is a push signal among the lost packet, or in other words, whether or not the push signal loss occurred, and stores the judgment results into the quality data storage unit 78 (step S243). After that, the processing ends, and returns to the calling source processing.

[Quality Judgment Processing 7]

Figure 48:
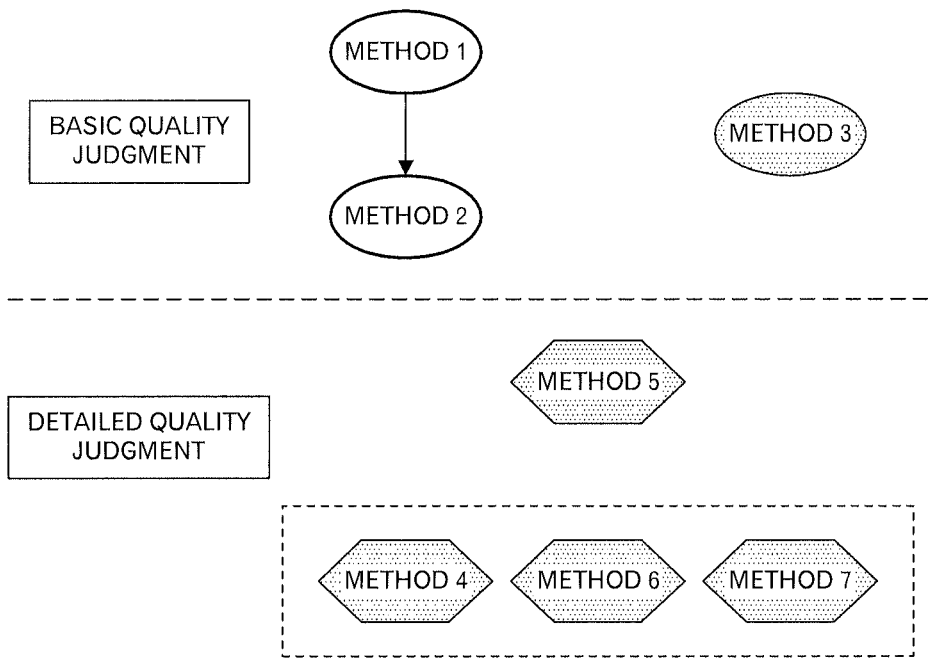
FIG. 48 is a diagram depicting an outline of the quality judgment processing 7.

Next, the quality judgment processing 7 will be explained using FIG. 48 and FIG. 49. FIG. 48 depicts a summary of the quality judgment processing 7. As illustrated in FIG. 48, the quality judgment processing 7 is a processing applied when the transmission intervals between voice packets and between DTMF packets are different, the DTMF packets are tone-type DTMF packets, and furthermore, the packet immediately before the loss is a voice packet, and the packet immediately after the loss is a DTMF packet. Moreover, in the quality judgment process 7, the basic quality judgment is carried out according to method 1, and the basic quality judgment is further carried out according to method 2. Incidentally, because the packet immediately before the loss is a voice packet, the detailed quality judgment is not carried out.

Figure 49:
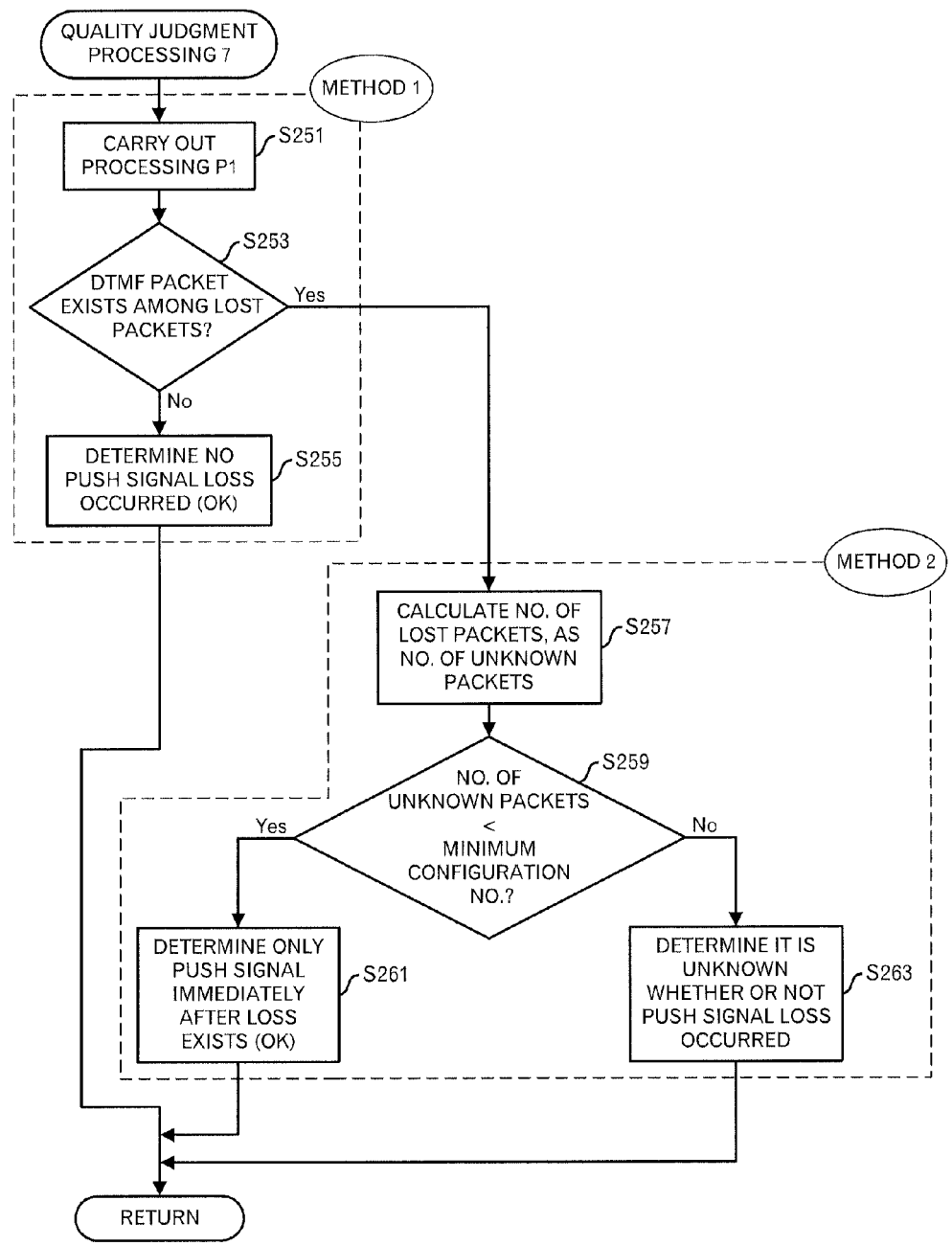
FIG. 49 is a diagram depicting a processing flow of the quality judgment processing 7.

The processing flow of the quality judgment processing 7 is illustrated in FIG. 49. First, the basic quality judging unit 76 uses the packets stored in the storage device to carry out the processing P1 (FIG. 49: step S251). Because the processing P1 has already been explained above, the explanation here is omitted. Incidentally, when the processing P1 is carried out, the breakdown of the lost packets is calculated.

Then, the basic quality judgment unit 76 uses the judgment result of the processing P1 to determine whether or not there is a DTMF packet among the lost packets (step S253). When there is no DTMF packet among the lost packets (step S253: NO route), the basic quality judging unit 76 determines that the push signal loss did not occur (OK), and stores the judgment result into the quality data storage unit 78 (step S255). After that, the processing ends, and returns to the calling source processing.

On the other hand, when there is a DTMF packet among the lost packets (step S253: YES route), the basic quality judging unit 76 uses the packets stored in the storage device to calculate the number of lost packets as the number of unknown packets (step S257). Incidentally, this processing is the same as the processing of the step S13 (FIG. 14).

The basic quality judging unit 76 then determines whether or not the number of unknown packets is less than the minimum configuration number (step S259). When the number of unknown packets is less than the minimum configuration number (step S259: YES route), the basic quality judging unit 76 determines that there is only a push signal immediately after the loss, and stores the judgment result into the quality data storage unit 78 (step S261). In other words, the basic quality judging unit 76 determines that the push signal loss did not occur (OK). After that, the processing ends, and returns to the calling source processing.

On the other hand, when the number of unknown packets is equal to or greater than the minimum configuration number (step S259: NO route), the basic quality judging unit 76 determines that it is unknown whether or not there is a push signal among the lost packets, or in other words, whether or not the push signal loss occurred, and stores the judgment result into the quality data storage unit 78 (step S263). After that, the processing ends, and returns to the calling source processing.

[Quality Judgment Processing 8]

Figure 50:
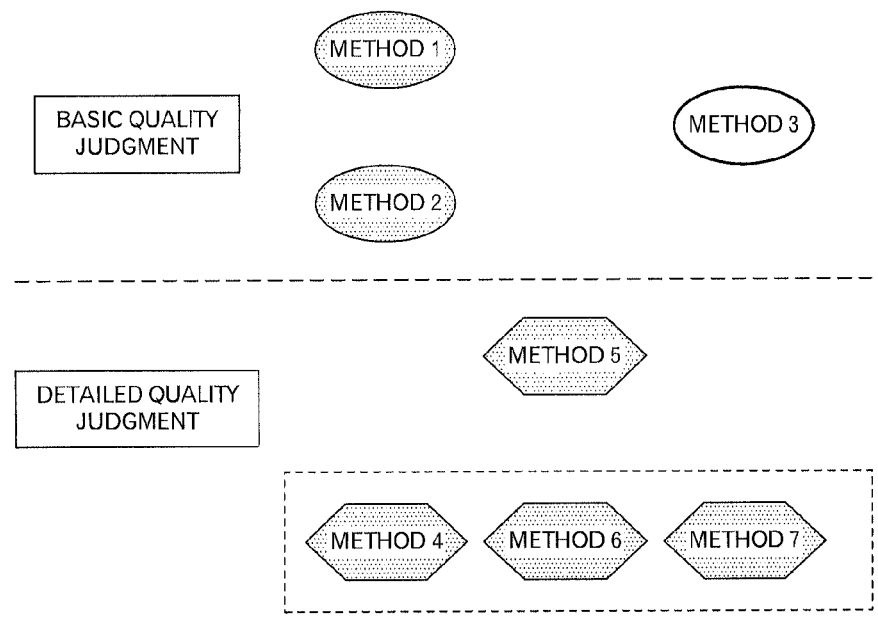
FIG. 50 is a diagram depicting an outline of the quality judgment processing 8.

Next, the quality judgment processing 8 will be explained using FIG. 50 and FIG. 51. FIG. 50 depicts a summary of the quality judgment processing 8. As illustrated in FIG. 50, the quality judgment processing 8 is applied when the transmission intervals between voice packets and between DTMF packets are different, the DTMF packets are tone-type DTMF packets, and furthermore both of the packets before and after the loss are voice packets. Moreover, in the quality judgment processing 8, the basic quality judgment is carried out according to method 3. Incidentally, because the packet immediately before the loss is a voice packet, the detailed quality judgment is not carried out.

Figure 51:
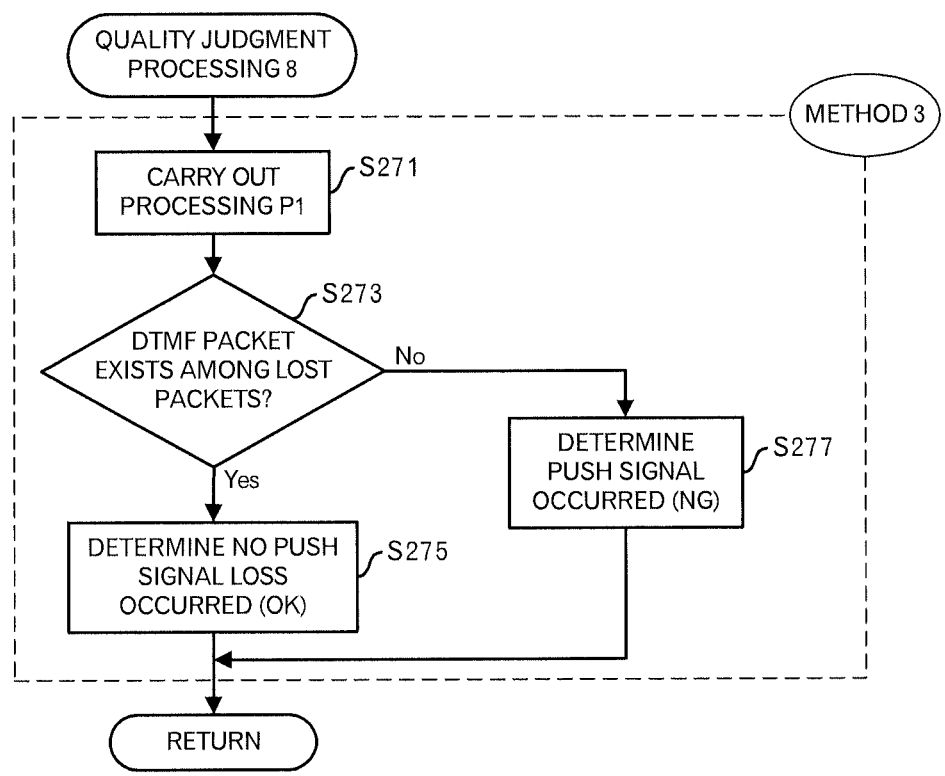
FIG. 51 is a diagram depicting a processing flow of the quality judgment processing 8.

The processing flow of the quality judgment processing 8 is illustrated in FIG. 51. First, the basic quality judging unit 76 uses the packets stored in the storage device to carry out the processing P1 (FIG. 51: step S271). Because the processing P1 has already been explained above, the explanation here is omitted. Incidentally, when the process P1 is carried out, the breakdown of lost packets (the number of lost voice packets and the number of lost DTMF packets) is calculated.

Then, the basic quality judging unit 76 uses the judgment result of the processing P1 to determine whether or not there is no DTMF packet among the lost packets (step S273). When there is no DTMF packet among the lost packets (step S273: YES route), the basic quality judging unit 76 determines that the push signal loss did not occur (OK), and stores the judgment result into the quality data storage unit 78 (step S275). After that, the processing ends, and returns to the calling source processing.

On the other hand, when there is a DTMF packet among the lost packets (step S273: NO route), the basic quality judging unit 76 determines that there is a push signal among the lost packets, or in other words, determines that the push signal loss occurred (NG), and stores the judgment result into the quality data storage unit 78 (step S277). After that, the processing ends, and returns to the calling source processing.

[Quality Judgment Processing 9]

Figure 52:
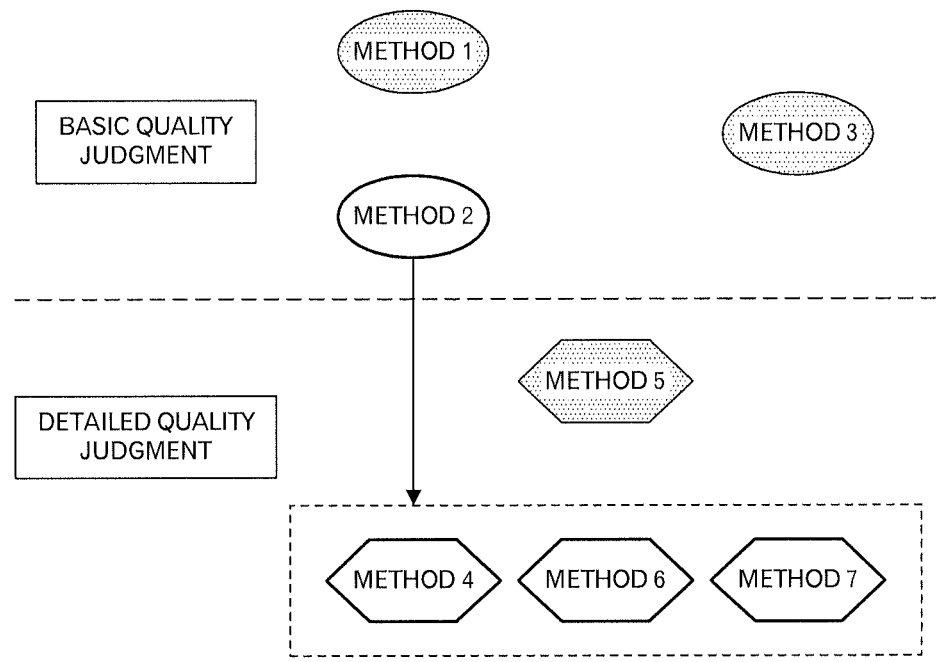
FIG. 52 is a diagram depicting an outline of the quality judgment processing 9.

Next, the quality judgment processing 9 will be explained using FIG. 52 to FIG. 55. FIG. 52 depicts a summary of the quality judgment processing 9. As illustrated in FIG. 52, the quality judgment processing 9 is applied when the transmission intervals between voice packets and between DTMF packets are the same, the DTMF packets are event-type DTMF packets and furthermore both of the packets before and after the loss are DTMF packets. Moreover, in the quality judgment processing 9, the basic quality judgment is carried out according to method 2, and after that, as necessary, the detail quality judgment is carried out according to methods 4, 6 and 7.

Figure 53:
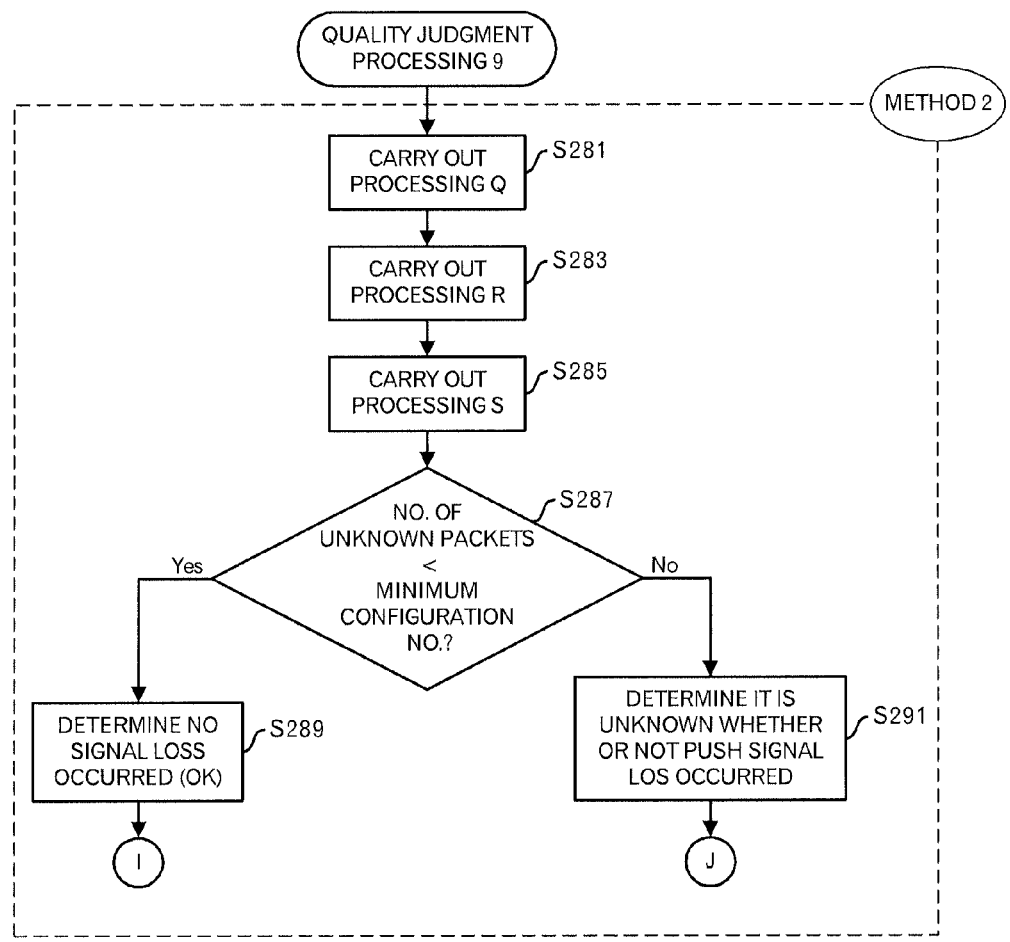
FIG. 53 is a diagram depicting a processing flow (first portion) of the quality judgment processing 9.
Figure 54:
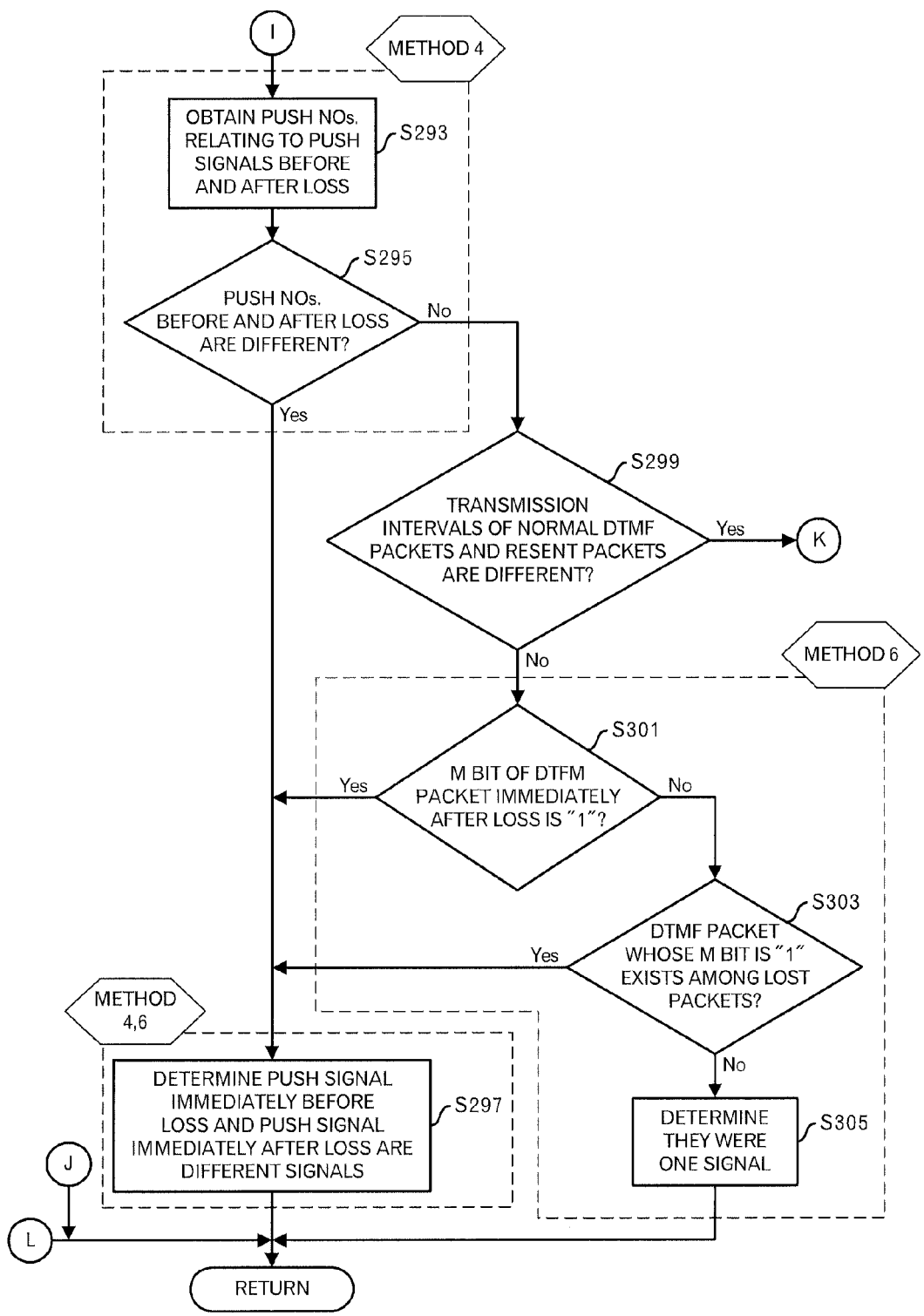
FIG. 54 is a diagram depicting a processing flow (second portion) of the quality judgment processing 9.
Figure 55:
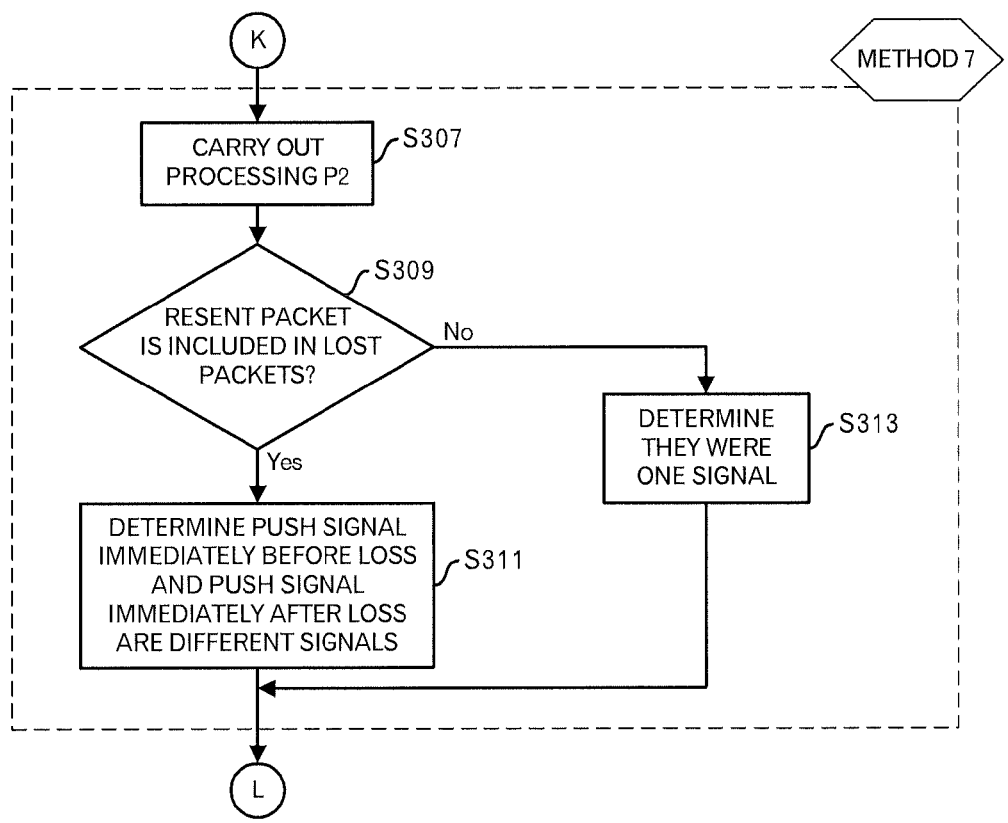
FIG. 55 is a diagram depicting a processing flow (third portion) of the quality judgment processing 9.

The processing flow of the quality judgment processing 9 is illustrated in FIG. 53 to FIG. 55. First, the basic quality judging unit 76 uses the packets stored in the storage device to carry out the processing Q (FIG. 53: step S281). Because the processing Q has already been explained above, the explanation here is omitted. Incidentally, when the processing Q is carried out, the sequence number of the last packet among the DTMF packets relating to the push signal immediately before the loss is calculated. The basic quality judging unit 76 also uses the packets stored in the storage device to carry out the processing R (step S283). Because the processing R has already been explained above, the explanation here is omitted. Incidentally, when the processing R is carried out, the sequence number of the first packet among the DTMF packets relating to the push signal immediately after the loss is calculated. The basic quality judging unit 76 then uses the processing results of the processing Q and processing R to carry out the processing S (step S285). Because the processing S has already been explained above, the explanation here is omitted. Incidentally, when the process S is carried out, the number of unknown packets among the lost packets is calculated.

The basic quality judging unit 76 then determines whether or not the number of unknown packets is less than the minimum configuration number (step S287). When the number of unknown packets is less than the minimum configuration number (step S287: YES route), the basic quality judging unit 76 determines that the push signal loss did not occur (OK), and stores the judgment result into the quality data storage unit 78 (step S289). After that, the processing moves to a processing of step S293 (FIG. 54) via a terminal I.

On the other hand, when the number of unknown packets is equal to or greater than the minimum configuration number (step S287: NO route), the basic quality judgment unit 76 determines that it is unknown whether or not there is a push signal among the lost packets, or in other words, whether or not the push signal loss occurred, and stores the judgment results into the quality data storage unit 78 (step S291). After that, the processing moves to a processing of FIG. 54 via a terminal J, ends and returns to the calling source processing.

Moving to the explanation of FIG. 54, after the terminal I, the detailed quality judging unit 77 acquires the push numbers relating to the push signals before and after the loss from the storage device storing the packets (FIG. 54: step S293). Then, the detailed quality judging unit 77 determines whether or not the push numbers before and after the loss are different (step S295). When the push numbers before and after the loss are different (step S295: YES route), the detailed quality judging unit 77 determines that the push signal immediately before the loss and the push signal immediately after the loss are different signals, and stores the judgment result into the quality data storage unit 78 (step S297). After that, the processing ends, and returns to the calling source processing.

On the other hand, when the push numbers before and after the loss are the same (step S295: NO route), the detailed quality judgment unit 77 determines whether or not the transmission intervals between normal DTMF packets and between resent packets are different (step S299). When the transmission intervals between normal DTMF packets and between resent packets are different (step S299: YES route), the processing moves to a processing of step S307 (FIG. 55) via a terminal K.

On the other hand, when the transmission intervals between normal DTMF packets and between resent packets are the same (step S299: NO route), the detailed quality judging unit 77 uses the packets stored in the storage device to determine whether or not the M bit included in the RTP header of the DTMF packet immediately after the loss is "1" (step S301). When the M bit included in the RTP header of the DTMF packet immediately after the loss is "1" (step S301: YES route), the processing moves to the processing of the step S297 and the detailed quality judging unit 77 determines that the push signal immediately before the loss and the push signal immediately after the loss are different signals. After that, the processing ends, and returns to the calling source processing.

On the other hand, when the M bit included in the RTP header of the DTMF packet immediately after the loss is not "1" (step S301: NO route), the detailed quality judging unit 77 determines whether or not there is a DTMF packet whose M bit is "1" among the lost packets (step S303). Incidentally, because the processing R (step S283) has already been executed before this step, the sequence number of the first packet (or in other words, the packet whose M bit is "1") in the DTMF packets relating to the push signal immediately after the loss is calculated. Therefore, at the step S303, the detailed quality judging unit 77 uses the sequence number (which is calculated by the processing R) of the first packet among the DTMF packets relating to the push signal immediately after the loss to determine whether or not there is a DTMF packet whose M bit is "1" among the lost packets. When there is a DTMF packet whose M bit is "1" among the lost packets (step S303: YES route), the processing moves to the processing of the step S297 and the detailed quality judging unit 77 determines that the push signal immediately before the loss and the push signal immediately after the loss are different signals. After that, the processing ends, and returns to the calling source processing.

On the other hand, when there is no DTMF packet whose M bit is "1" among the lost packets (step S303: NO route), the detailed quality judging unit 77 determines that the push signal immediately before the loss and the push signal immediately after the loss are one signal (the same signal), and stores the judgment result into the quality data storage unit 78 (step S305). After that, the processing ends, and returns to the calling source processing.

Moving to an explanation of FIG. 55, after the terminal K, the detailed quality judging unit 77 uses the packets stored in the storage device and data stored in the basic data storage unit 75 to carry out the processing P2 (FIG. 55: step S307). Because the processing P2 has already been explained above, the explanation here is omitted. Incidentally, when the processing P2 is carried out, the breakdown of lost packets (the number of lost resent packets and the number of lost packets other than resent packets) is calculated.

The detailed quality judging unit 77 then uses the processing result of the processing P2 to determine whether or not there is a resent packet among the lost packets (step S309). When there is a resent packet among the lost packets (step S309: YES route), the detailed quality judging unit 77 determines that the push signal immediately before the loss and the push signal immediately after the loss are different signals, and stores the judgment result into the quality data storage unit 78 (step S311). After that, the processing returns to the processing flow of FIG. 54 via a terminal L, ends and returns to the calling source processing.

On the other hand, when there is no resent packet among the lost packets (step S309: NO route), the detailed quality judging unit 77 determines that the push signal immediately before the loss and the push signal immediately after the loss are one signal (the same signal), and stores the judgment result into the quality data storage unit 78 (step S313). After that, the processing returns to the processing flow of FIG. 54 via the terminal L, ends and returns to the calling source processing.

Incidentally, in FIG. 54 and FIG. 55, the processing flow is illustrated such that after the judgment is carried out according to method 4, the judgment is then carried out according to methods 6 and 7, however, the judgment according to method 4 does not always need to be carried out first, and the judgment according to methods 6 and 7 might be carried out first. Moreover, it was explained that the judgment according to method 7 was carried out when the transmission intervals between normal DTMF packets and between resent packets were different (in other word, the YES route in step S299), however the judgment according to method 7 does not always need to be carried out, and the judgment according to method 6 might be carried out.

[Quality Judgment Processing 10]

Figure 56:
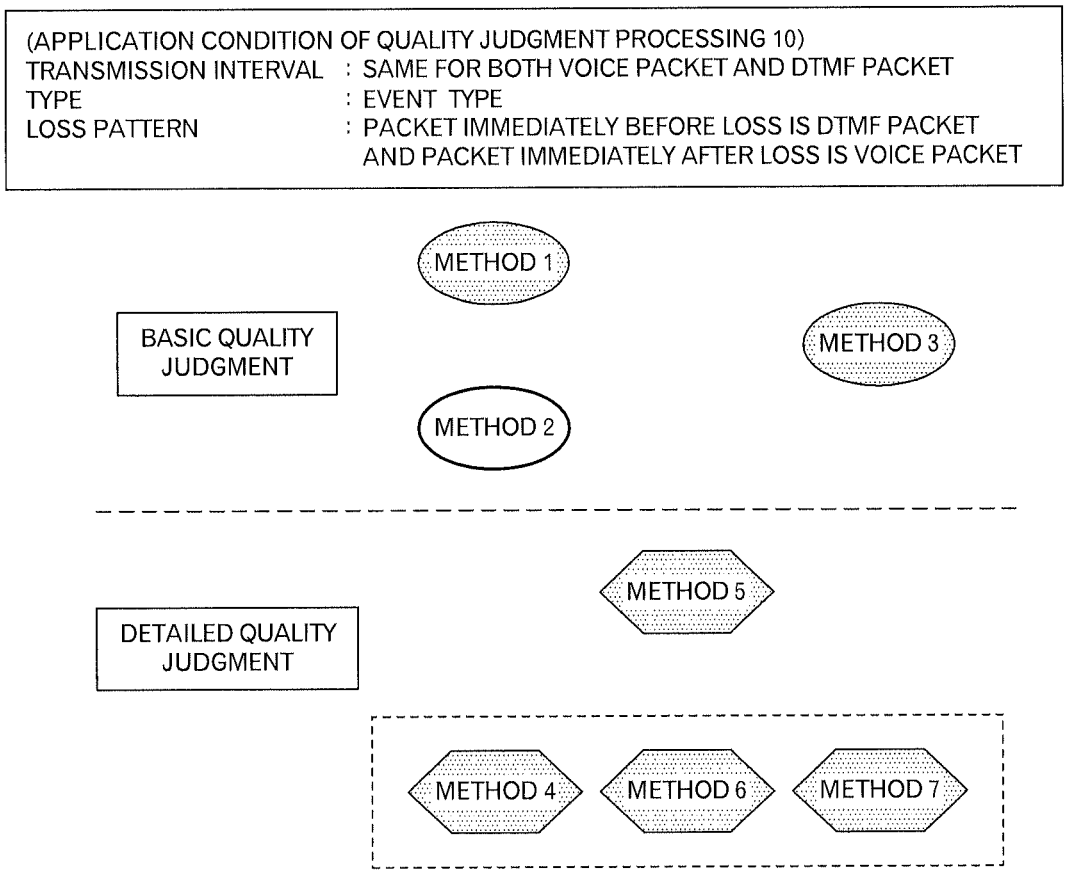
FIG. 56 is a diagram depicting an outline of the quality judgment processing 10.

Next, the quality judgment processing 10 will be explained using FIG. 56 and FIG. 57. FIG. 56 depicts a summary of the quality judgment processing 10. As illustrated in FIG. 56, the quality judgment processing 10 is applied when the transmission intervals between voice packets and between DTMF packets are the same, the DTMF packets are event-type DTMF packets, and furthermore, the packet immediately before the loss is a DTMF packet and the packet immediately after the loss is a voice packet. Moreover, in the quality judgment processing 10, the basic quality judgment is carried out according to method 2. Incidentally, because the packet immediately after the loss is a voice packet, the detailed quality judgment is not carried out.

Figure 57:
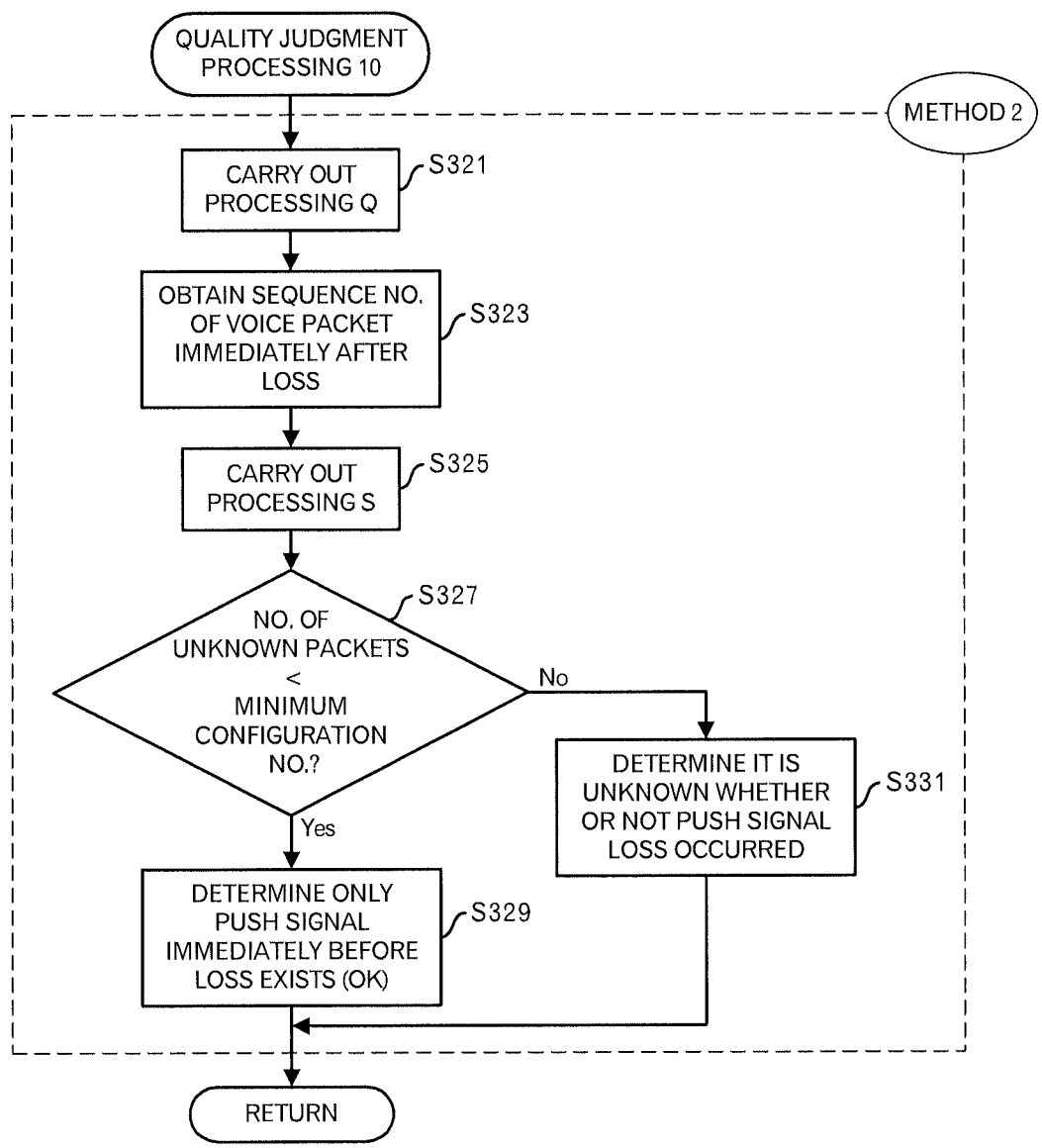
FIG. 57 is a diagram depicting a processing flow of the quality judgment processing 10.

The processing flow of the quality judgment processing 10 is illustrated in FIG. 57. Incidentally, the processing flow of the quality judgment processing 10 is basically the same as the processing flow of the quality judgment processing 2 (FIG. 38). First, the basic quality judging unit 76 uses the packets stored in the storage device to carry out the processing Q (FIG. 57: step S321). Because the processing Q has already been explained above, the explanation here is omitted. Incidentally, when the process Q is carried out, the sequence number of the last packet among the DTMF packets relating to the push signal immediately before the loss is calculated. The basic quality judging unit 76 also acquires the sequence number of the voice packet immediately after the loss from the storage device storing the packets (step S323). Incidentally, this processing is the same as the processing of the step S27 (FIG. 14). The basic quality judging unit 76 then uses the judgment result of the processing Q and the sequence number of the voice packet immediately after the loss to carry out the processing S (step S325). Because the processing S has already been explained above, the explanation here is omitted. Incidentally, when the process S is carried out, the number of unknown packets among the lost packets is calculated.

The basic quality judging unit 76 then determines whether or not the number of unknown packets is less than the minimum configuration number (step S327). When the number of unknown packets is less than the minimum configuration number (step S327: YES route), the basic quality judging unit 76 determines that there is only a push signal immediately before the loss, and stores the judgment result into the quality data storage unit 78 (step S329). In other words, the basic quality judging unit 76 determines that the push signal loss did not occur (OK). After that, the processing ends, and returns to the calling source processing.

On the other hand, when the number of unknown packets is equal to or greater than the minimum configuration number (step S237: NO route), the basic quality judging unit 76 determines that it is unknown whether or not there is a push signal among the lost packets, or in other words, whether or not the push signal loss occurred, and stores the judgment result into the quality data storage unit 78 (step S331). After that, the processing ends, and returns to the calling source processing.

[Quality Judgment Processing 11]

Figure 58:
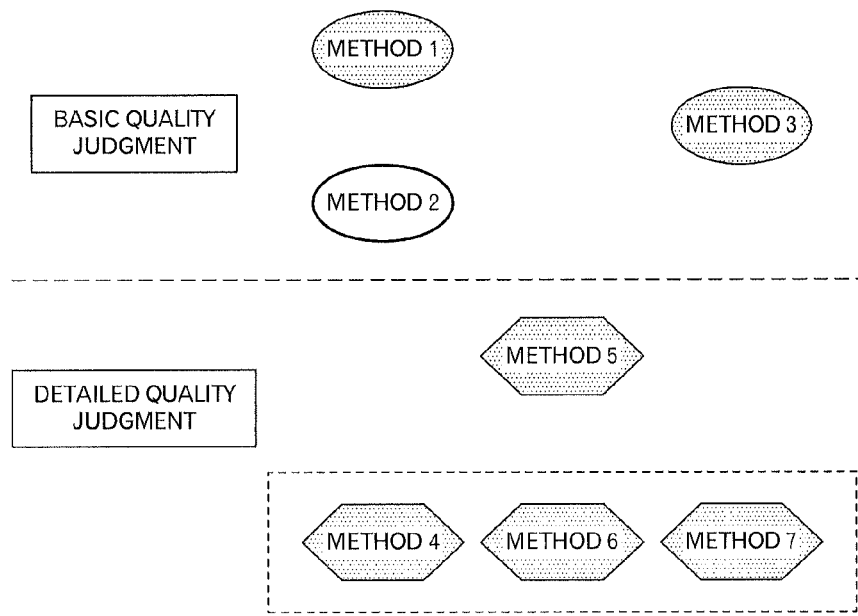
FIG. 58 is a diagram depicting an outline of the quality judgment processing 11.

Next, the quality judgment processing 11 will be explained using FIG. 58 and FIG. 59. FIG. 58 depicts a summary of the quality judgment processing 11. As illustrated in FIG. 58, the quality judgment processing 11 is applied when the transmission intervals between voice packets and between DTMF packets are the same, the DTMF packets are event-type DTMF packets, and furthermore, the packet immediately before the loss is a voice packet and the packet immediately after the loss is a DTMF packet. Moreover, in the quality judgment processing 11, the basic quality judgment is carried out according to method 2. Incidentally, because the packet immediately before the loss is a voice packet, the detailed quality judgment is not carried out.

Figure 59:
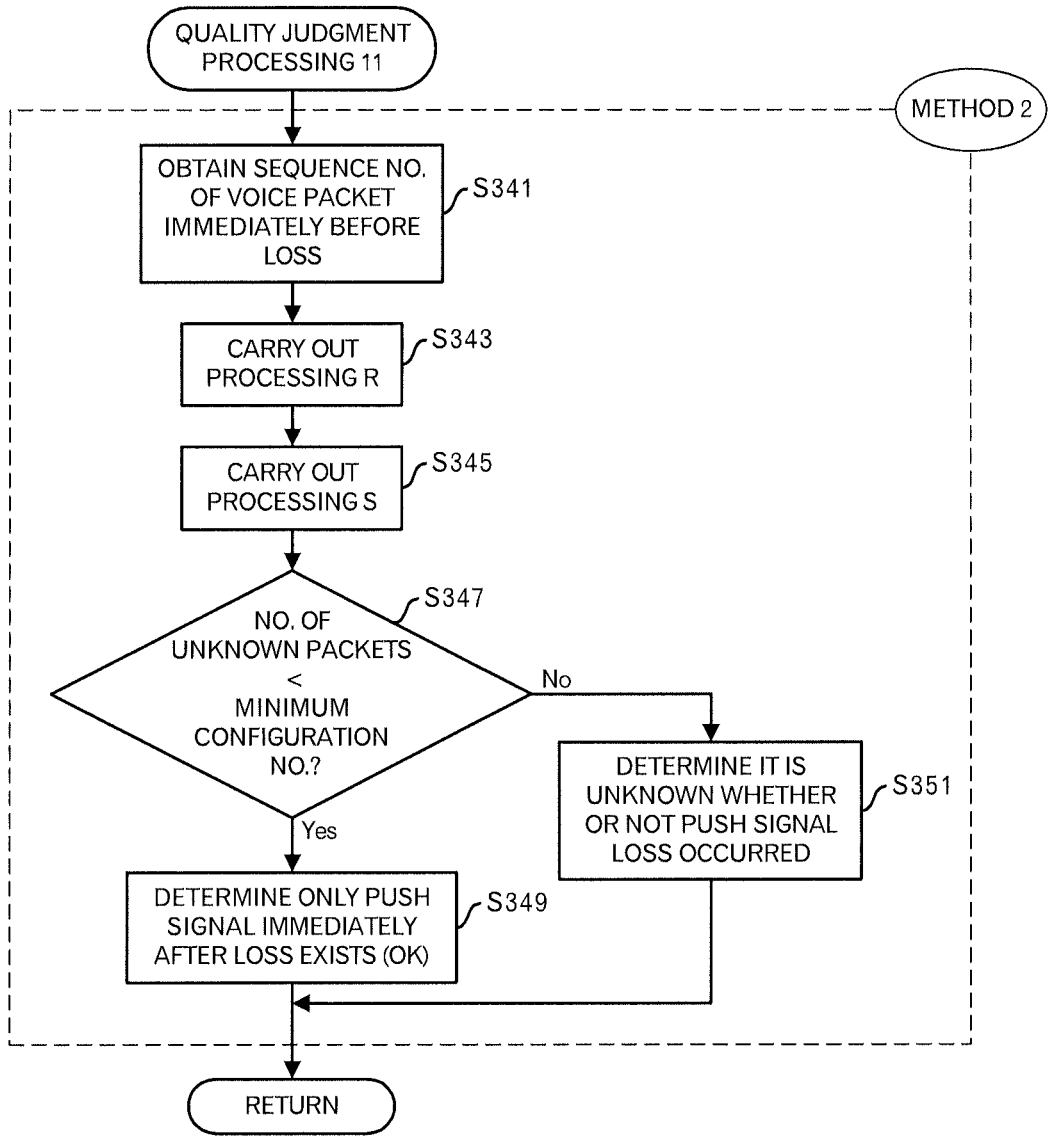
FIG. 59 is a diagram depicting a processing flow of the quality judgment processing 11.

The processing flow of the quality judgment processing 11 is illustrated in FIG. 59. Incidentally, the processing flow of the quality judgment processing 11 is basically the same as the processing flow of the quality judgment processing 3 (FIG. 40). First, the basic quality judging unit 76 acquires the sequence number of the voice packet immediately before the loss from the storage device storing the packets (FIG. 59: step S341). Incidentally, this processing is the same as the processing at the step 17 (FIG. 14). The basic quality judging unit 76 also uses packets stored in the storage device to carry out the processing R (step S343). Because the process R has already been explained above, the explanation here is omitted. Incidentally, when the processing R is carried out, the sequence number of the first packet among the DTMF packets relating to the push signal immediately after the loss is calculated. The basic quality judging unit 76 then uses the sequence number of the voice packet immediately before the loss and the processing result of the processing R to carry out the processing S (step S345). Because the processing S has already been explained above, the explanation here is omitted. Incidentally, when the processing S is carried out, the number of unknown packets among the lost packets is calculated.

The basic quality judgment unit 76 then determines whether or not the number of unknown packets is less than the minimum configuration number (step S347). When the number of unknown packets is less than the minimum configuration number (step S347: YES route), the basic quality judging unit 76 determines that there is only a push signal immediately after the loss, and stores the judgment result into the quality data storage unit 78 (step S349). In other words, the basic quality judging unit 76 determines that the push signal loss did not occur (OK). After that, the processing ends, and returns to the calling source processing.

On the other hand, when the number of unknown packets is equal to or greater than the minimum configuration number (step 347: NO route) the basic quality judging unit 76 determines that it is unknown whether or not there is a push signal among the lost packets, or in other words, whether or not the push signal loss occurred, and stores the judgment result into the quality data storage unit 78 (step S351). After that, the processing ends, and returns to the calling source processing.

[Quality Judgment Processing 12]

Figure 60:
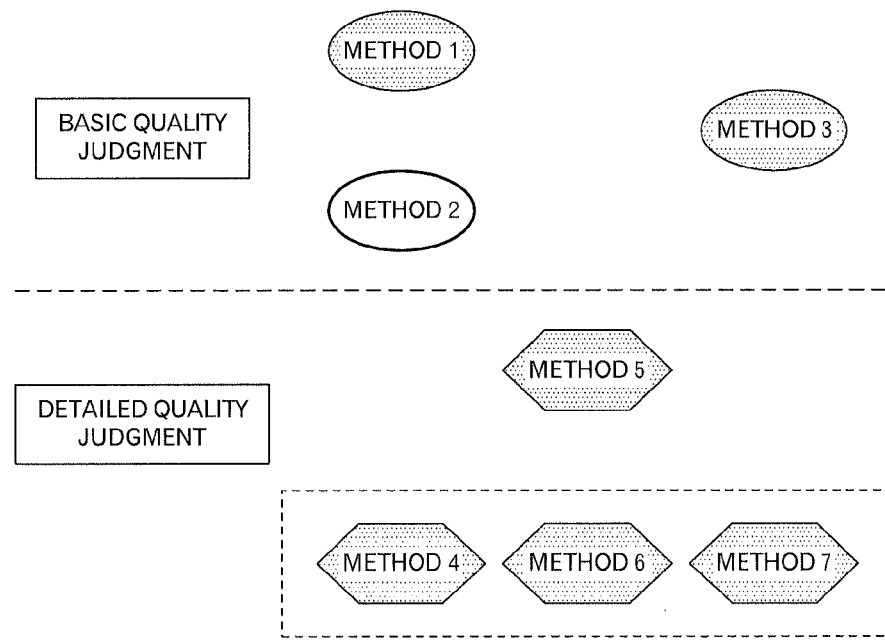
FIG. 60 is a diagram depicting an outline of the quality judgment processing 12.

Next, the quality judgment processing 12 will be explained using FIG. 60 and FIG. 61. FIG. 60 depicts a summary of the quality judgment processing 12. As illustrated in FIG. 60, the quality judgment processing 12 is a processing that is applied when the transmission intervals between voice packets and between DTMF packets are the same, the DTMF packets are event-type DTMF packets and furthermore, both of the packets before and after the loss are voice packets. Moreover, in the quality judgment processing 12, the basic quality judgment is carried out according to method 2. Incidentally, because both of the packets before and after the loss are voice packets, the detail quality judgment is not carried out.

Figure 61:
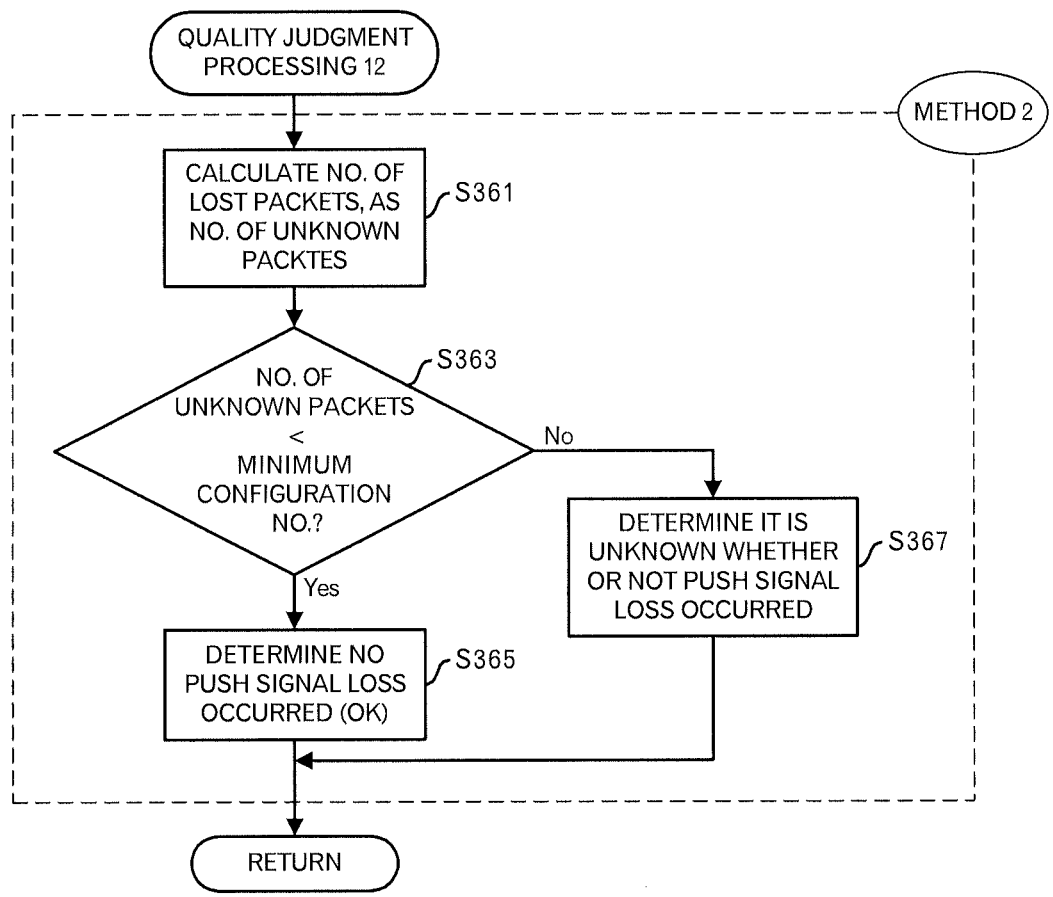
FIG. 61 is a diagram depicting a processing flow of the quality judgment processing 12.

The processing flow of the quality judgment processing 12 is illustrated in FIG. 61. Incidentally, the processing flow of the quality judgment processing 12 is basically the same as the processing flow of the quality judgment processing 4 (FIG. 42). First, the basic quality judging unit 76 uses the packets stored in the storage device to calculate the number of lost packets as the number of unknown packets (FIG. 61: step S361). Incidentally, this processing is the same as the processing of the step 13 (FIG. 14).

The basic quality judging unit 76 then determines whether or not the number of unknown packets is less than the minimum configuration number (step S363). When the number of unknown packets is less than the minimum configuration number (step S363: YES route), the basic quality judging unit 76 determines that the push signal loss did not occur (OK), and stores the judgment result into the quality storage unit 78 (step S365). After that, the processing ends, and returns to the calling source processing.

On the other hand, when the number of unknown packets is equal to or greater than the minimum configuration number (step S363: NO route), the basic quality judging unit 76 determines that it is unknown whether or not there is a push signal among the lost packets, or in other words, whether or not the push signal loss occurred, and stores the judgment result into the quality data storage unit 78 (step S367). After that, the processing ends, and returns to the calling source processing.

[Quality Judgment Processing 13]

Figure 62:
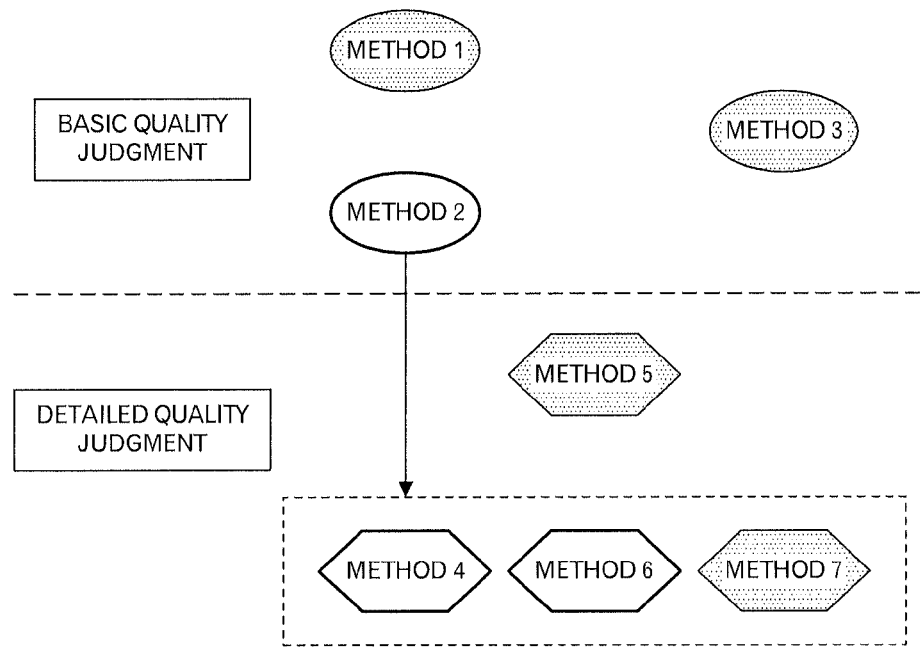
FIG. 62 is a diagram depicting an outline of the quality judgment processing 13.

Next, the quality judgment processing 13 will be explained using FIG. 62 and FIG. 63. FIG. 62 depicts a summary of the quality judgment processing 13. As illustrated in FIG. 62, the quality judgment processing 13 is a processing applied when the transmission intervals between voice packets and between DTMF packets are the same, the DTMF packets are tone-type DTMT packets, and furthermore, both the packets before and after the loss are DTMF packets. Moreover, in the quality judgment processing 13, the basic quality judgment is carried out according to method 2, and after that, as necessary, the detailed quality judgment is carried out according to methods 4 and 6.

Figure 63:
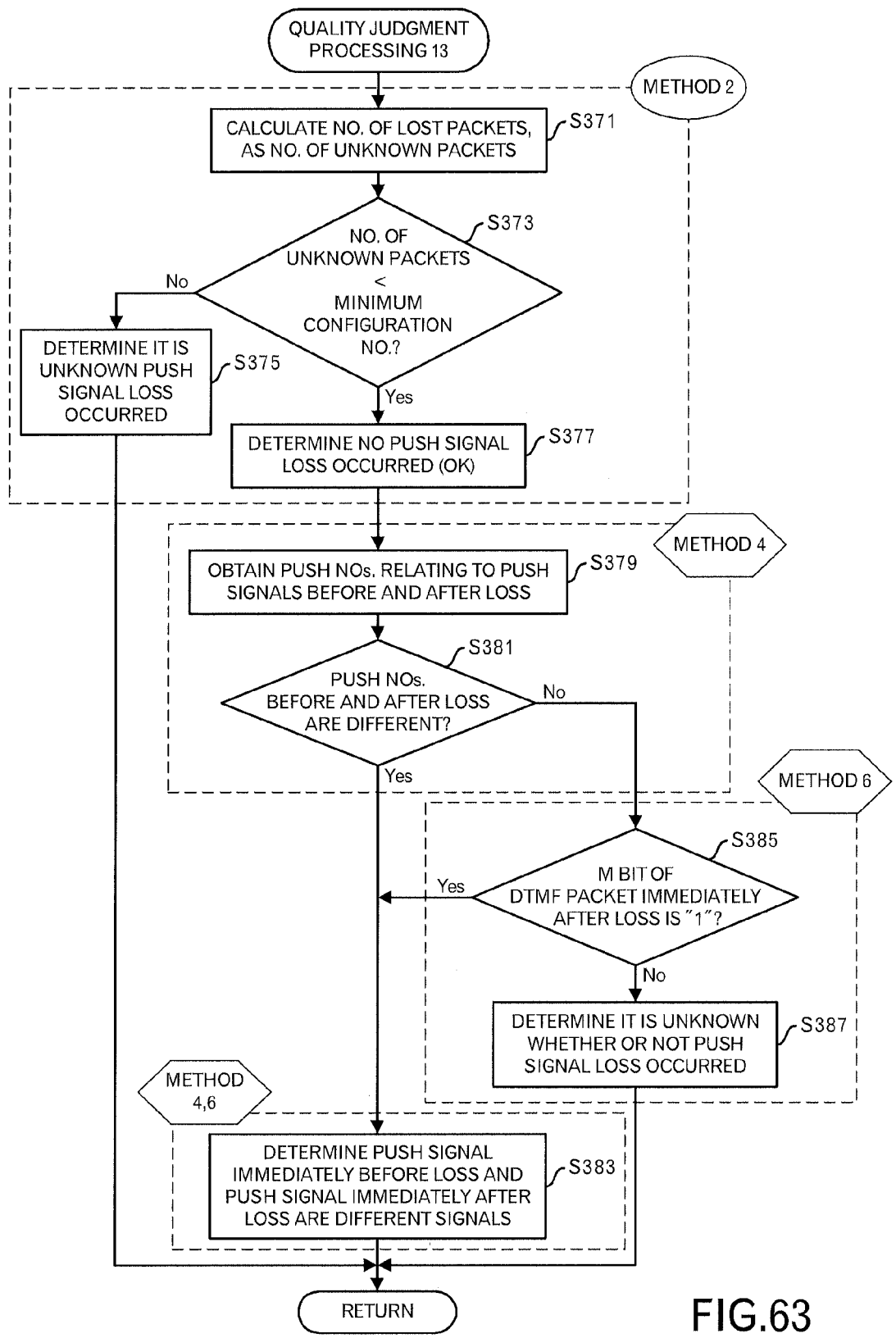
FIG. 63 is a diagram depicting a processing flow of the quality judgment processing 13.

The processing flow of the quality judgment processing 13 is illustrated in FIG. 63. First, the basic quality judging unit 76 uses the packets stored in the storage device to calculate the number of lost packets as the number of unknown packets (FIG. 63: step S371). Incidentally, this processing is the same as the processing of the step S13 (FIG. 14).

The basic quality judging unit 76 then determines whether or not the number of unknown packets is less than the minimum configuration number (step S373). When the number of unknown packets is equal to or greater than the minimum configuration number (step S373: NO route), the basic quality judging unit 76 determines that it is unknown whether or not there is a push signal among the lost packets, or in other words, whether or not the push signal loss occurred, and stores the judgment result into the quality data storage unit 78 (step S375). After that, the processing ends, and returns to the calling source processing.

On the other hand, when the number of unknown packets is less than the minimum configuration number (step S373: YES route), the basic quality judging unit 76 determines that the push signal loss did not occur (OK), and stores the judgment result into the quality data storage unit 78 (step S377).

After that, the detailed quality judging unit 77 acquires the push numbers of the push signals before and after the loss from the storage device storing the packets (step S379). The detailed quality judgment unit 77 then determines whether or not the push numbers before and after the loss are different (step S381). When the push numbers before and after the loss are different (step S381: YES route), the detailed quality judgment unit 77 determines that the push signal immediately before the loss and the push signal immediately after the loss are different signals, and stores the judgment result into the quality data storage unit 78 (step S383). After that, the processing ends, and returns to the calling source processing.

On the other hand, when the push numbers before and after the loss are the same (step S381: NO route), the detailed quality judging unit 77 uses the packets stored in the storage device to determine whether or not the M bit included in the RTP header of the DTMF packet immediately after the loss is "1" (step S385). When the M bit included in the RTP header of the DTMF packet immediately after the loss is "1" (step S385: YES route), the processing moves to a processing of step S383 and the detailed quality judging unit 77 determines that the push signal immediately before the loss and the push signal immediately after the loss are different signals. After that, the processing ends, and returns to the calling source processing.

On the other hand, when the M bit included in the RTP header of the DTMF packet immediately after the loss is not "1" (step S385: NO route), the detailed quality judging unit 77 determines that it is unknown whether or not there is a push signal among the lost packets, or in other words, whether or not the push signal loss occurred, and stores the judgment result into the quality data storage unit 78 (step S387). After that, the processing ends, and returns to the calling source processing.

Incidentally, although FIG. 63 depicts the processing flow in which, after the judgment is carried out according to method 4, the judgment is then carried out according to method 6, it is not always necessary that the judgment according to method 4 be carried out first, and the judgment according to method 6 may be carried out first.

[Quality Judgment Processing 14]

Figure 64:
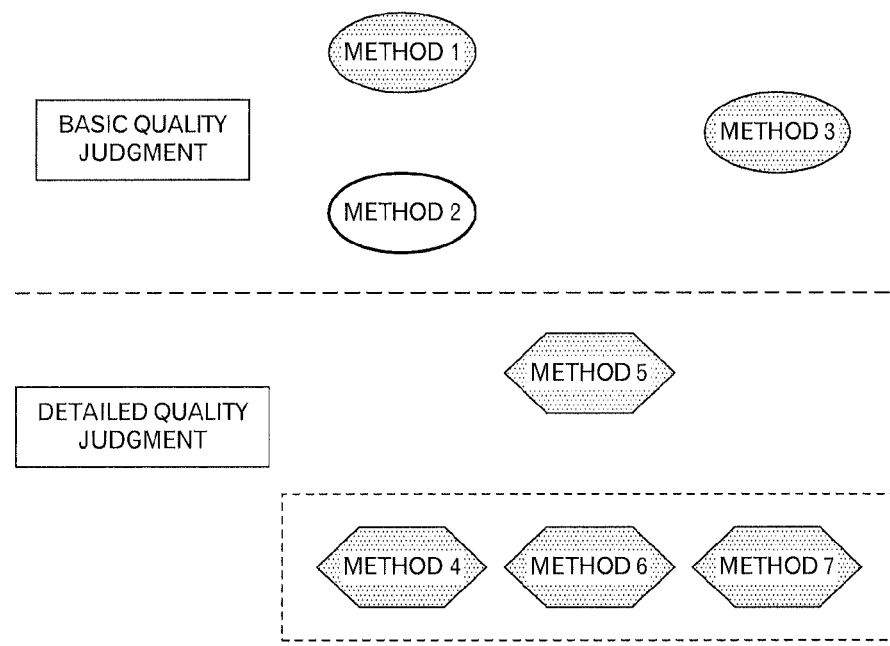
FIG. 64 is a diagram depicting an outline of the quality judgment processing 14.

Next, the quality judgment processing 14 will be explained using FIG. 64 and FIG. 65. FIG. 64 depicts a summary of the quality judgment processing 14. As illustrated in FIG. 64, the quality judgment processing 14 is a processing applied when the transmission intervals between voice packets and between DTMF packets are the same, the DTMF packets are tone-type DTMF packets, and furthermore, the packet immediately before the loss is a DTMF packet and the packet immediately after the loss is a voice packet. Moreover, in the quality judgment processing 14, the basic quality judgment is carried out according to method 2. Incidentally, because the packet immediately after the loss is a voice packet, the detailed judgment is not carried out.

Figure 65:
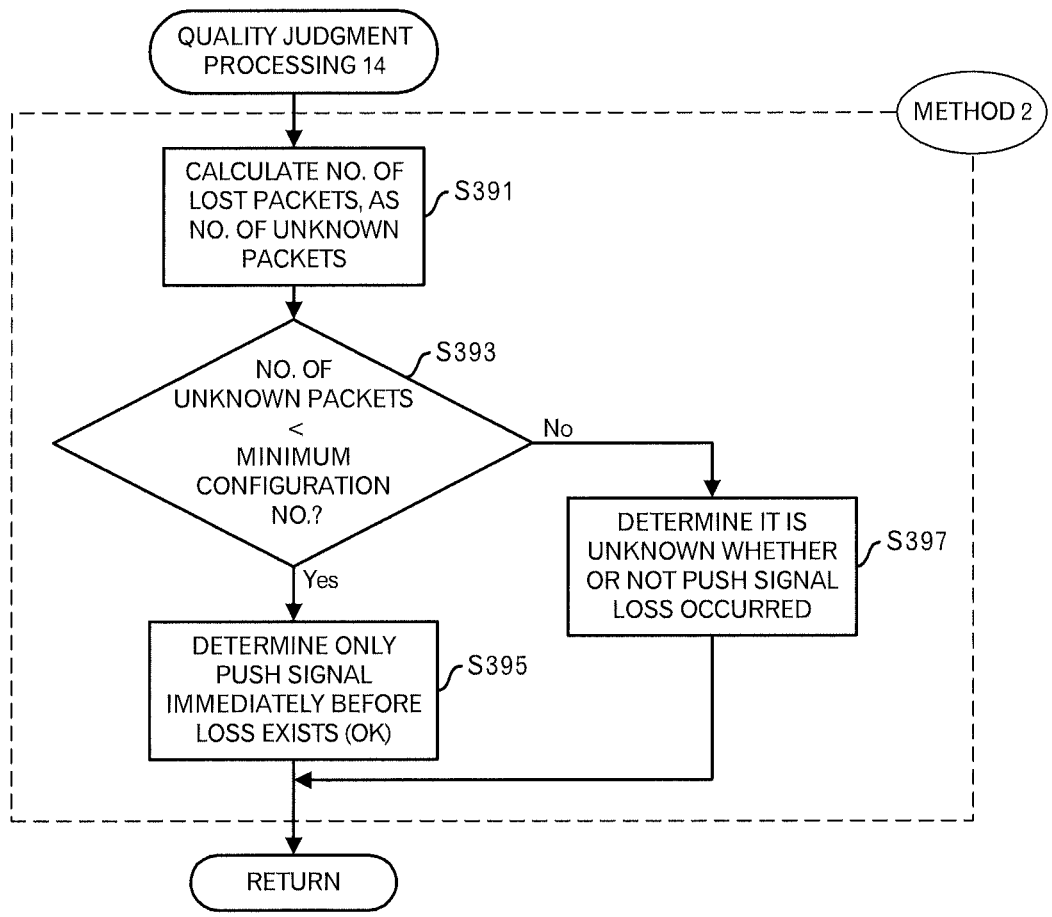
FIG. 65 is a diagram depicting a processing flow of the quality judgment processing 14.

The processing flow of the quality judgment processing 14 is illustrated in FIG. 65. First, the basic quality judging unit 76 uses the packets stored in the storage device to calculate the number of lost packets as the number of unknown packets (FIG. 65: step S391). This processing is the same as the processing of the step S13 (FIG. 14).

The basic quality judging unit 76 then determines whether or not the number of unknown packets is less than the minimum configuration number (step S393). When the number of unknown packets is less than the minimum configuration number (step S393: YES route), the basic quality judging unit 76 determines that there is only a push signal immediately before the loss, and stores the judgment result into the quality data storage unit 78 (step S395). In other words, the basic quality judging unit 76 determines that the push signal loss did not occur (OK). After that, the processing ends, and returns to the calling source processing.

On the other hand, when the number of unknown packets is equal to or greater than the minimum configuration number (step S393: NO route), the basic quality judging unit 76 determines that it is unknown whether or not there is a push signal among the lost packets, or in other words, whether or not the push signal loss occurred, and stores the judgment results into the quality data storage unit 78 (step S397). After that, the processing ends, and returns to the calling source processing.

[Quality Judgment Processing 15]

Figure 66:
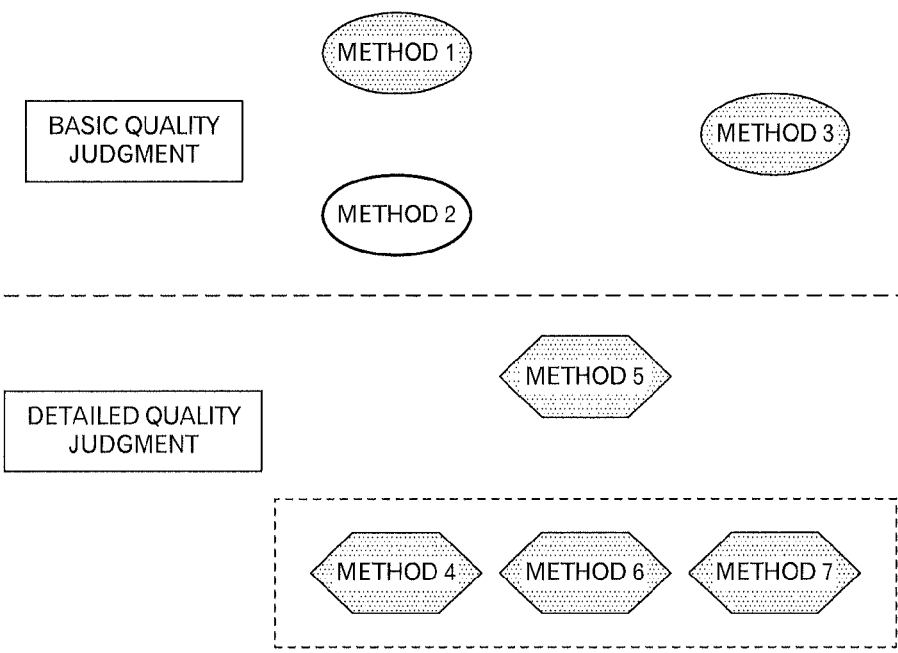
FIG. 66 is a diagram depicting an outline of the quality judgment processing 15.

Next, the quality judgment processing 15 will be explained using FIG. 66 and FIG. 67. FIG. 66 depicts a summary of the quality judgment processing 15. As illustrated in FIG. 66, the quality judgment processing 15 is a processing when the transmission intervals between voice packets and between DTMF packets are the same, the DTMF packets are tone-type DTMF packets, and furthermore, the packet immediately before the loss is a voice packet and the packet immediately after the loss is a DTMF packet. Moreover, in the quality judgment processing 15, the basic quality judgment is carried out according to method 2 Incidentally, because the packet immediately before the loss is a voice packet, the detailed quality judgment is not carried out.

Figure 67:
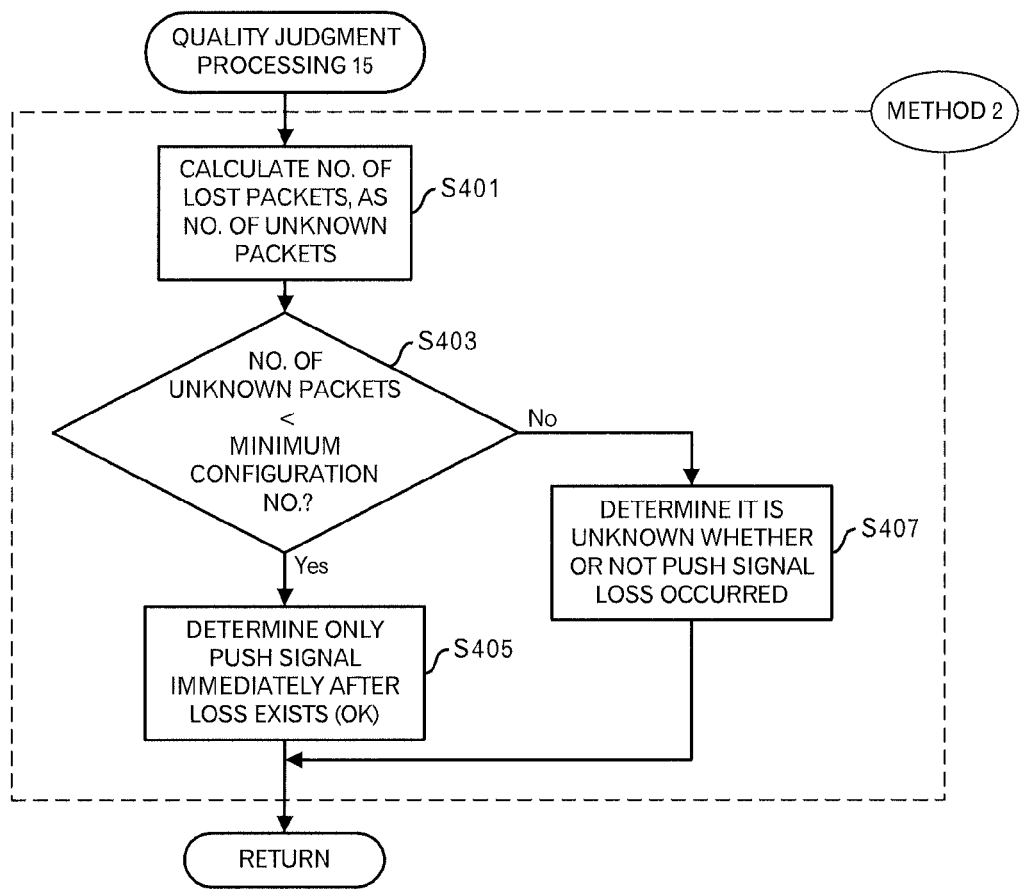
FIG. 67 is a diagram depicting a processing flow of the quality judgment processing 15.

The processing flow of the quality judgment processing 15 is illustrated in FIG. 67. First, the basic quality judging unit 76 uses the packets stored in the storage device to calculate the number of lost packets as the number of unknown packets (FIG. 67: step S401). This processing is the same as the processing of the step S13 (FIG. 14).

Then, the basic quality judging unit 76 determines whether or not the number of unknown packets is less than the minimum configuration number (step S403). When the number of unknown packets is less than the minimum configuration number (step S403: YES route), the basic quality judging unit 76 determines that there is only a push signal immediately after the loss, and stores the judgment result into the quality data storage unit 78 (step S405). In other words, the basic quality judging unit 76 determines that the push signal loss did not occur (OK). After that, the processing ends, and returns to the calling source processing.

On the other hand, when the number of unknown packets is equal to or greater than the minimum configuration number (step S403: NO route), the basic quality judging unit 76 determines that it is unknown whether or not there is a push signal among the lost packets, or in other words, whether or not the push signal loss occurred, and stores the judgment result into the quality data storage unit 78 (step S407). After that, the processing ends, and returns to the calling source processing.

[Quality Judgment Processing 16]

Figure 68:
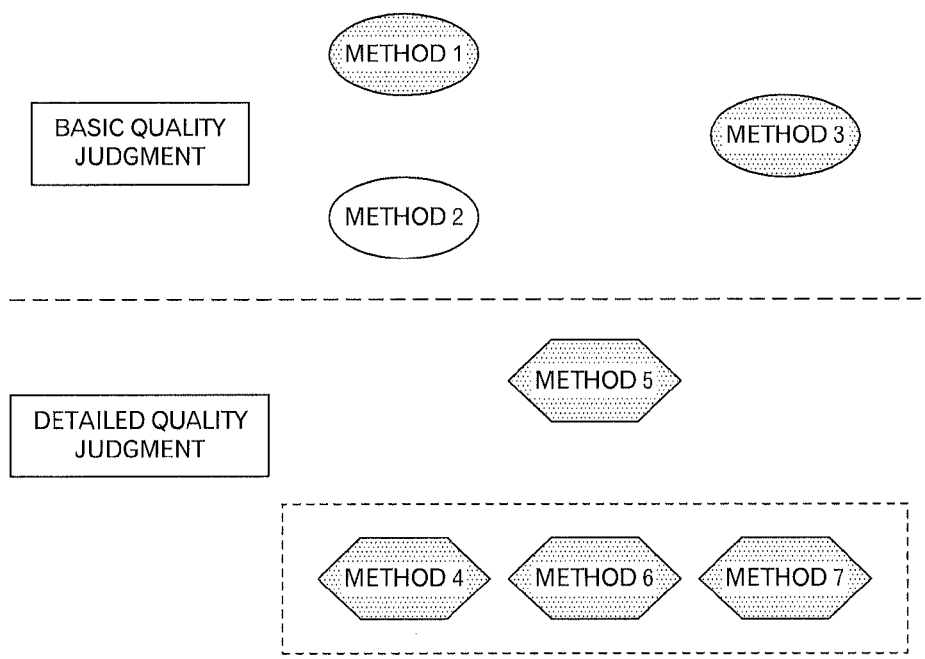
FIG. 68 is a diagram depicting an outline of the quality judgment processing 16.

Next, the quality judgment processing 16 will be explained using FIG. 68 and FIG. 69. FIG. 68 depicts a summary of the quality judgment processing 16. As illustrated in FIG. 68, the quality judgment processing 16 is a processing when the transmission intervals between voice packets and between DTMF packets are the same, the DTMF packets are tone-type DTMF packets, and furthermore, both the packets before and after the loss are voice packets. Moreover, in the quality judgment processing 16, the basic quality judgment is carried out according to method 2. Incidentally, because both of the packets before and after the loss are voice packets, the detailed quality judgment is not carried out.

Figure 69:
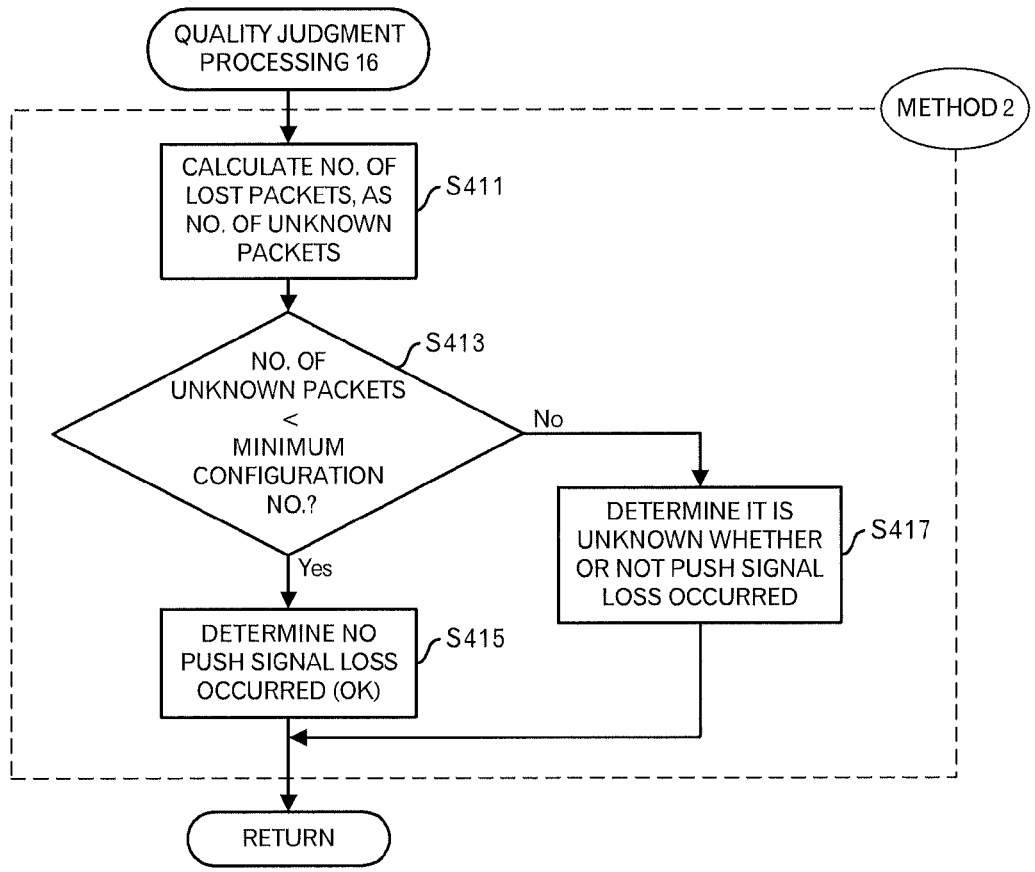
FIG. 69 is a diagram depicting a processing flow of the quality judgment processing 16.

The processing flow of the quality judgment processing 16 is illustrated in FIG. 69. First, the basic quality judging unit 76 uses the packets stored in the storage device to calculate the number of lost packets as the number of unknown packets (FIG. 69: step S411). Incidentally, this processing is the same as the processing of the step S13 (FIG. 14).

The basic quality judging unit 76 then determines whether or not the number of unknown packets is less than the minimum configuration number (step S413). When the number of unknown packets is less than the minimum configuration number (step S413: YES route), the basic quality judging unit 76 determines that the push signal loss did not occur (OK), and stores the judgment result into the quality data storage unit 78 (step S415). After that, the processing ends, and returns to the calling source processing.

On the other hand, when the number of unknown packets is equal to or greater than the minimum configuration number (step S413: NO route), the basic quality judging unit 76 determines that it is unknown whether or not there is a push signal among the lost packets, or in other words, whether or not the push signal loss occurred, and stores the judgment result into the quality data storage unit 78 (step S417). After that, the processing ends, and returns to the calling source processing.

By carrying out the aforementioned quality judgment processing 1 to 16, it becomes possible to accurately recognize whether the push signal loss occurred, and whether the push signals before and after the loss are different signals or the same signal, according to the status of the lost packets and DTMF packet characteristics, when the packet loss occurs. Moreover, from the delivery status of the push signals, the quality of the DTMF service can be accurately determined.

Application Example

In the embodiments described above, the case where the delivery status judging apparatus 7 determines the delivery status of the push signals was explained, however, the functions of the delivery status judging apparatus 7 explained above may be implemented in an IP telephone at the calling destination. In case where the IP telephone at the calling destination carries out the processing described above, when the packet loss occurred, for example, and it is grasped that the push signal immediately before the loss and the push signal immediately after the loss are different signals, the IP telephone at the calling destination can operate as if two push signals were received. In this way, when focusing on the single direction communication, for example, it is possible to carry out the processing described above at an arbitrarily location on the communication path by a terminal other than the calling source.

Although the embodiments of this technique are explained, this technique is not limited to these embodiments. For example, the functional block diagram of the aforementioned delivery status judging apparatus 7 does not always correspond to an actual program module configuration. In addition, the configuration of the data storage units is mere an example, similarly.

Furthermore, as for the processing flow, as long as the processing results do not change, the order of the processing may be exchanged. In addition, the steps may be executed in parallel.

Figure 70:
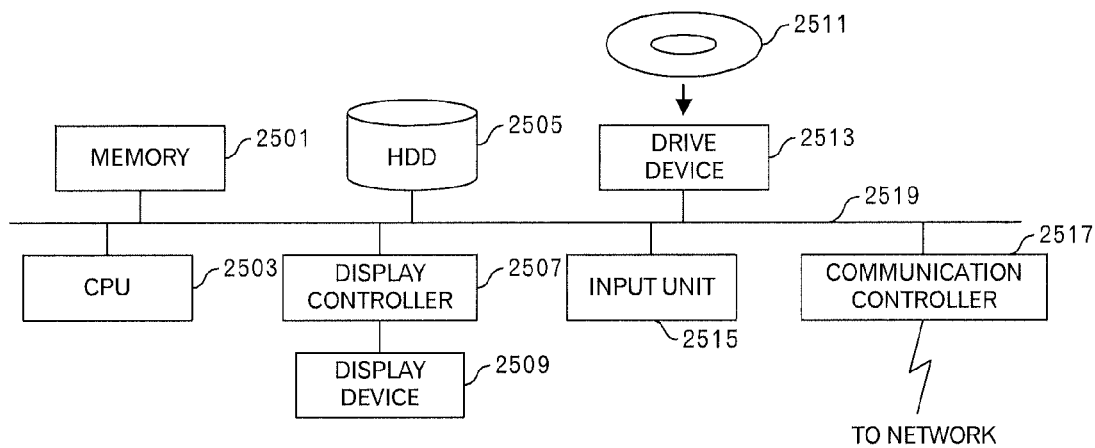
FIG. 70 is a functional block diagram of a computer.

In addition, the delivery status judging apparatus 7 is a computer device as shown in FIG. 70. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 70. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Figure 71:
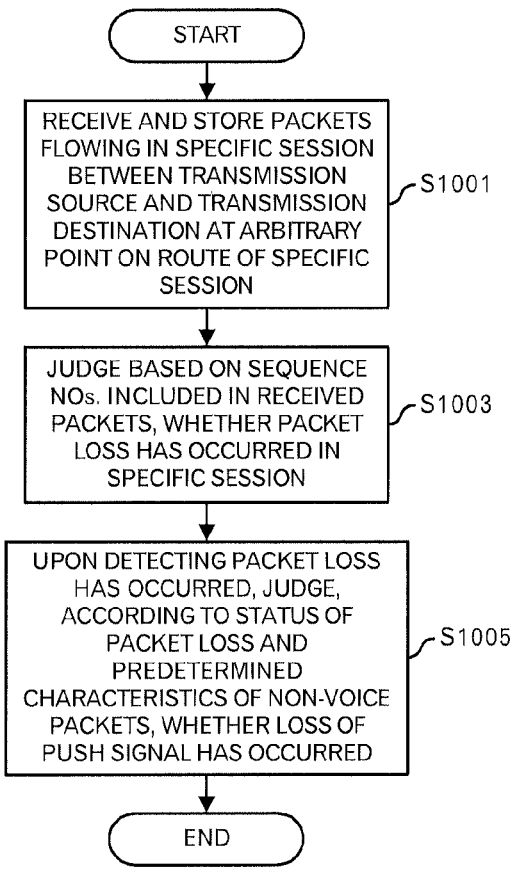
FIG. 71 is a diagram depicting a processing of a push signal delivery status judging method relating to the first aspect of the embodiments.

The aforementioned embodiments of this technique are outlined as follows:

A method, relating to a first aspect of the embodiments, for judging delivery status of a push signal, includes: receiving packets flowing in a specific session between a transmission source and transmission destination at an arbitrary point on a route of the specific session, and storing the received packets into a storage device, wherein the packets include voice packets and non-voice packets representing the push signal (S1001 in FIG. 71); first judging based on sequence numbers included in the received packets stored in the storage device, whether or not packet loss has occurred in the specific session (S1003 in FIG. 71); and upon detecting that the packet loss has occurred, second judging, according to status of the packet loss and predetermined characteristics of the non-voice packets, whether or not loss of the push signal has occurred (S1005 in FIG. 71).

Thus, it becomes possible to determine whether or not the loss of the push signal has occurred according to status of the packet loss (e.g. the number of lost packets, types of packets before and after the lost packets and the like) and predetermined characteristics of the non-voice packets (e.g. transmission interval, the number of transmission times of resent packets, the minimum number of non-voice packets used to represent one push signal and the like). For example, because one push signal is represented by plural non-voice packets, even when part of the non-voice packets is lost, it is determined that the push signal is not lost, if another part of the non-voice packets reached.

Moreover, the aforementioned second judging may include: judging whether or not the non-voice packet has existed among lost packets; and upon judging that the non-voice packet has not existed among the lost packets, determining that loss of the push signal has not occurred. Thus, when the non-voice packet has not existed among the lost packets, it is possible to determine the loss of the push signal has not occurred, because only the voice packets were lost.

Furthermore, the aforementioned second judging may include: comparing a minimum configuration number that is the minimum number of non-voice packets used to represent one push signal with the number of lost packets or the number of remaining packets identified by excluding packets presumed as the non-voice packets from the lost packets; and upon detecting that the number of lost packets or the number of remaining packets is less than the minimum configuration number, determining that loss of the push signal has not occurred. Thus, when the number of lost packet is less than the minimum configuration number, it means, even if the non-voice packets are lost, at least part of the non-voice packets representing the same push signal could be received. Therefore, it is determined that the loss of the push signal has not occurred. In addition, when a packet presumed as the non-voice packet has existed among the lost packets, it is possible to identify unknown packets for which it is unknown whether or not the packet is a voice packet or non-voice packet, by excluding the packet presumed as the non-voice packet. When the number of unknown packets is less than the minimum configuration number, it means the push signal is not included in the unknown packets. Therefore, it is determined that no loss of the push signal has occurred. Incidentally, it is determined from information of the packets immediately before the loss or after the loss, whether or not the packet presumed as the non-voice packet has existed among the lost packets.

In addition, the aforementioned second judging may include: judging whether or not the non-voice packet has existed among lost packets; and upon judging that the non-voice packet has not existed among the lost packets and packets immediately before and after the lost packets is the voice packets, determining that loss of the push signal has occurred. Thus, when the non-voice packet has existed among the lost packet and packets before and after the lost packets are the voice packets, it means all of the non-voice packets representing a certain push signal have been lost. Therefore, it is possible to determine that the loss of the push signal has occurred.

Furthermore, in the first aspect of the embodiments, when a first transmission interval of the voice packets and a second transmission interval of the non-voice packets are different, a processing to solve simultaneous equations represented by variables respectively representing the number of voice packets and the number of non-voice packets among the lost packets, the number of lost packets, the first transmission interval, the second transmission interval and time difference between a packet immediately before the lost packets and a packet immediately after the lost packets may be carried out, and whether or not the non-voice packet has existed among the lost packets may be determined based on solutions of the simultaneous equations. By solving such simultaneous equations, it is possible to calculate the breakdown of the lost packets, and it is also possible to determine whether or not the non-voice packet has existed among the lost packets.

In addition, the method relating to the first aspect of the embodiment may further include: upon judging in the second judging that the loss of the push signal has not occurred and that a packet immediately before the lost packets and a packet immediately after the lost packets are the non-voice packets, third judging whether or not a first push signal immediately before the lost packets and a second push signal immediately after the lost packets are different signals. For example, when no loss of the push signal has occurred and the packets before and after the lost packets are the non-voice packet, it is considered that there are two cases, namely a first case where the push signals before and after the lost packets are different signals and a second case where the push signals before and after the lost packets are the same signal (i.e. one push signal). Thus, by judging whether or not the push signals before and after the lost packets are different signals, it becomes possible to accurately grasp the received push signal.

Furthermore, the aforementioned third judging may include: judging whether or not a first push number of the first push signal and a second push number of the second push signal are different; and upon judging that the first push number and the second push number are different, determining that the first push signal and the second push signal are different signals. When the push numbers before and after the lost packets are different, it can be considered that the push signal immediately before the lost packets and the push signal immediately after the lost packets are different signals.

Moreover, the aforementioned third judging may include: judging whether or not the voice packet has existed among the lost packets; and upon judging that the voice packet has existed among the lost packets, determining that the first push signal and the second push signal are different signals. When the voice packets have existed among the lost packets, it can be considered that the push signal before the voice packets and the push signal after the voice packets are different signals.

Furthermore, the aforementioned third judging may include: judging whether or not the packet immediately after the lost packets is a first non-voice packet among the non-voice packets; and upon judging that the packet immediately after the lost packets is the first non-voice packet, determining that the first push signal and the second push signal are different signals. When the packet immediately before the lost packets is the first non-voice packet, it can be considered that the push signal immediately before the lost packets and the push signal immediately after the lost packets are different signals. Incidentally, whether or not the packet is the first non-voice packet can be determined by M (Marker) bit included in the RTP header of the non-voice packet, for example.

In addition, the aforementioned third judging may include: judging whether or not the first non-voice packet has existed among the lost packets; and upon judging that the first non-voice packet has existed among the lost packets, determining that the first push signal and the second push signal are different signals. When the first non-voice packet has existed among the lost packets, it can be considered that the push signal immediately before the lost packets and the push signal immediately after the push signal are different signals. Incidentally, whether or not the first non-voice packet has existed among the lost packets can be determined by the transmission interval of the non-voice packet, the duration included in the non-voice packet immediately after the lost packets and the sequence numbers.

Furthermore, the aforementioned third judging may include: upon judging that the packet immediately after the lost packets is not the first non-voice packet and the first non-voice packet has not existed among the lost packets, determining that the first push signal and the second push signal are the same signal. Thus, when the packet immediately before the lost packets is not the first non-voice packet and the first non-voice packet has not existed among the lost packets, it can be considered that the push signals before and after the lost packets are one signal (i.e. the same signal).

Moreover, the aforementioned third judging may include: when a first transmission interval of the voice packets and a second transmission interval of the non-voice packets are the same, and a third transmission interval of resent packets and a fourth transmission interval of second non-voice packets other than the resent packets are different, judging whether or not the resent packets have existed among the lost packets; and judging that the resent packets have existed among the lost packets, determining that the first push signal and the second push signal are different signals. When the resent packet has existed among the lost packets, it can be considered that the push signal immediately before the lost packets and the push signal immediately after the lost packets are different signals. Incidentally, by solving the simultaneous equations represented by variables respectively representing the number of resent packets among the lost packets and the number of non-voice packet other than the resent packets, the number of lost packets, the transmission interval of the resent packet, the transmission interval of the non-voice packet other than the resent packet and the time different of the packets before and after the lots packets, it is possible to calculate the breakdown of the lost packets, and it is also possible to determine whether or not the resent packets have existed among the lost packets.

Furthermore, the aforementioned third judging comprises: judging that the resent packets have not existed among the lost packets, determining the first push signal and the second push signal are the same signal. When the resent packet has not existed among the lost packets, it can be considered that the push signals before and after the lost packets are one push signal (i.e. the same signal).

Figure 72:
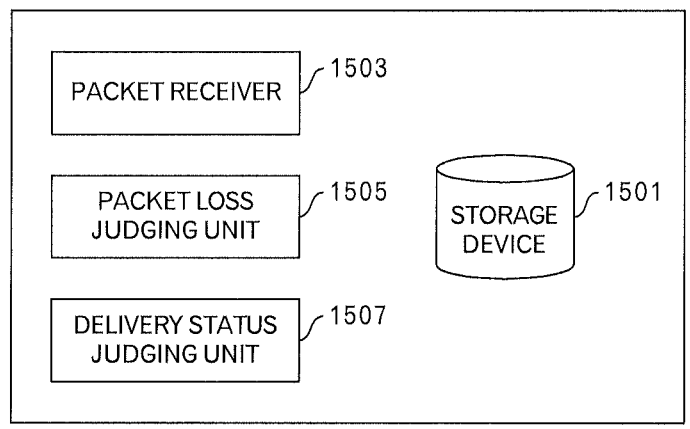
FIG. 72 is a functional block diagram of a push signal delivery status judging apparatus relating to the second aspect of the embodiments.

A delivery status judging apparatus of a push signal, which relates to the second aspect of the embodiments, include: a packet receiver (1503 in FIG. 72) to receive packets flowing in a specific session between a transmission source and transmission destination at an arbitrary point on a route of the specific session, and to store the received packets into a storage device (1501 in FIG. 72), wherein the packets include voice packets and non-voice packets representing the push signal; a packet loss judging unit (1505 in FIG. 72) to judge based on sequence numbers included in the received packets stored in the storage device, whether or not packet loss has occurred in the specific session; and a delivery status judging unit (1507 in FIG. 72) to judge, upon detecting that the packet loss has occurred and according to status of the packet loss and predetermined characteristics of the non-voice packets, whether or not loss of the push signal has occurred.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method for judging delivery status of a push signal, the method comprising:
   receiving packets flowing in a specific session between a transmission source and transmission destination at an arbitrary point on a route of the specific session, and storing the received packets into a storage device, wherein the packets include voice packets and non-voice packets representing the push signal;
   first judging based on sequence numbers included in the received packets stored in the storage device, whether or not packet loss has occurred in the specific session; and
   upon detecting that the packet loss has occurred, second judging, according to at least one of first to third properties, whether or not loss of the push signal has occurred, wherein the first property includes time difference between the packet immediately before the lost packets and the packet immediately after the lost packets, the second property includes transmission intervals of the voice packets and the non-voice packets, and the third property includes the minimum number of non-voice packets used to represent one push signal, and
   the second judging comprises:
   comparing the minimum number of non-voice packets used to represent the one push signal with the number of lost packets or the number of remaining packets identified by excluding packets presumed as the non-voice packets from the lost packets; and
   upon detecting that the number of lost packets or the number of remaining packets is less than the minimum number of non-voice packets used to represent the one push signal, determining that loss of the push signal has not occurred.

2. The method as set forth in claim 1, further comprising:
   upon judging in the second judging that the loss of the push signal has not occurred and that the packet immediately before the lost packets and the packet immediately after the lost packets are the non-voice packets, third judging whether or not a first push signal immediately before the lost packets and a second push signal immediately after the lost packets are different signals.

3. The method as set forth in claim 2, wherein the third judging comprises:
   judging whether or not a first push number of the first push signal and a second push number of the second push signal are different; and
   upon judging that the first push number and the second push number are different, determining that the first push signal and the second push signal are different signals.

4. The method as set forth in claim 2, wherein the third judging comprises:
   judging whether or not the voice packet has existed among the lost packets; and
   upon judging that the voice packet has existed among the lost packets, determining that the first push signal and the second push signal are different signals.

5. The method as set forth in claim 2, wherein the third judging comprises:
   judging whether or not the packet immediately after the lost packets is a first non-voice packet among the non-voice packets; and
   upon judging that the packet immediately after the lost packets is the first non-voice packet, determining that the first push signal and the second push signal are different signals.

6. The method as set forth in claim 5, wherein the third judging comprises:
   judging whether or not the first non-voice packet has existed among the lost packets; and
   upon judging that the first non-voice packet has existed among the lost packets, determining that the first push signal and the second push signal are different signals.

7. The method as set forth in claim 6, wherein the third judging comprises:
   upon judging that the packet immediately after the lost packets is not the first non-voice packet and the first non-voice packet has not existed among the lost packets, determining that the first push signal and the second push signal are the same signal.

8. The method as set forth in claim 2, wherein the third judging comprises:
   when a first transmission interval of the voice packets and a second transmission interval of the non-voice packets are the same, and a third transmission interval of resent packets and a fourth transmission interval of second non-voice packets other than the resent packets are different, judging whether or not the resent packets have existed among the lost packets; and
   judging that the resent packets have existed among the lost packets, determining that the first push signal and the second push signal are different signals.

9. The method as set forth in claim 8, wherein the third judging comprises:
   judging that the resent packets have not existed among the lost packets, determining the first push signal and the second push signal are the same signal.

10. A computer-readable, non-transitory medium storing a program for causing a computer to execute a process for judging delivery status of a push signal, the process comprising:
- receiving packets flowing in a specific session between a transmission source and transmission destination at an arbitrary point on a route of the specific session, and storing the received packets into a storage device, wherein the packets include voice packets and non-voice packets representing the push signal;
- first judging based on sequence numbers included in the received packets stored in the storage device, whether or not packet loss has occurred in the specific session; and
- upon detecting that the packet loss has occurred, second judging, according to at least one of first to third properties, whether or not loss of the push signal has occurred, wherein the first property includes time difference between the packet immediately before the lost packets and the packet immediately after the lost packets, the second property includes transmission intervals of the voice packets and the non-voice packets, and the third property includes the minimum number of non-voice packets used to represent one push signal, and
- the second judging comprises:
- comparing the minimum number of non-voice packets used to represent the one push signal with the number of lost packets or the number of remaining packets identified by excluding packets presumed as the non-voice packets from the lost packets; and
- upon detecting that the number of lost packets or the number of remaining packets is less than the minimum number of non-voice packets used to represent the one push signal, determining that loss of the push signal has not occurred.

11. An apparatus for judging delivery status of a push signal, comprising:
- a packet receiver to receive packets flowing in a specific session between a transmission source and transmission destination at an arbitrary point on a route of the specific session;
- a storage device to store the received packets wherein the packets include voice packets and non-voice packets representing the push signal;
- a processor configured to judge based on sequence numbers included in the received packets stored in the storage device, whether or not packet loss has occurred in the specific session and to judge, upon detecting that the packet loss has occurred and according to at least one of first to third properties, whether or not loss of the push signal has occurred,
- wherein the first property includes time difference between the packet immediately before the lost packets and the packet immediately after the lost packets, the second property includes transmission intervals of the voice packets and the non-voice packets, and the third property includes the minimum number of non-voice packets used to represent one push signal, and
- the processor is configured to compare the minimum number of non-voice packets used to represent the one push signal with the number of lost packets or the number of remaining packets identified by excluding packets presumed as the non-voice packets from the lost packets, and determine that loss of the push signal has not occurred upon detecting that the number of lost packets or the number of remaining packets is less than the minimum number of non-voice packets used to represent the one push signal.

* * * * *